US010839017B2

(12) United States Patent
Shinn et al.

(10) Patent No.: US 10,839,017 B2
(45) Date of Patent: Nov. 17, 2020

(54) ADAPTIVE, INTERACTIVE, AND COGNITIVE REASONER OF AN AUTONOMOUS ROBOTIC SYSTEM UTILIZING AN ADVANCED MEMORY GRAPH STRUCTURE

(71) Applicant: AIBrain Corporation, Seoul (KR)

(72) Inventors: Hong Shik Shinn, Seoul (KR); Eunmi Hong, Seoul (KR); Byoung-Kwon Lim, Seoul (KR); Cheongan Lee, Seoul (KR); Yeongju Kim, Seoul (KR); Inhyuk Lee, Seoul (KR)

(73) Assignee: AIBrain Corporation (KR)

( * ) Notice: Subject to any disclaimer, the term of this patent is extended or adjusted under 35 U.S.C. 154(b) by 0 days.

(21) Appl. No.: 16/118,182

(22) Filed: Aug. 30, 2018

(65) Prior Publication Data
US 2019/0065625 A1    Feb. 28, 2019

Related U.S. Application Data

(63) Continuation-in-part of application No. 15/946,646, filed on Apr. 5, 2018.
(Continued)

(51) Int. Cl.
*G06F 16/9032* (2019.01)
*G06F 40/30* (2020.01)
(Continued)

(52) U.S. Cl.
CPC ...... *G06F 16/90332* (2019.01); *G06F 16/367* (2019.01); *G06F 16/9024* (2019.01);
(Continued)

(58) Field of Classification Search
CPC . G06F 16/90332; G06N 3/0454; G06N 5/022
See application file for complete search history.

(56) References Cited

U.S. PATENT DOCUMENTS

| 4,638,445 A | 1/1987 | Mattaboni |
| 4,815,005 A * | 3/1989 | Oyanagi .................. G06N 5/02 |
| | | 706/55 |

(Continued)

OTHER PUBLICATIONS

Kamel, Mohamed, and Yuri Quintana. "A graph based knowledge retrieval system." 1990 IEEE International Conference on Systems, Man, and Cybernetics Conference Proceedings. IEEE, 1990. (Year: 1990).*

(Continued)

*Primary Examiner* — Daniel C Washburn
*Assistant Examiner* — Oluwadamilola M Ogunbiyi
(74) *Attorney, Agent, or Firm* — Van Pelt, Yi & James LLP

(57) ABSTRACT

An autonomous robotic system using an adaptive, interactive, and cognitive reasoner utilizing an advanced memory graph structure receives a natural language input. The natural language input is processed to identify components. At least a portion of the components of the natural language input is stored in a short-term artificial intelligence memory graph data structure. A long-term artificial intelligence memory graph data structure includes data that was previously stored in the short-term artificial intelligence memory graph data structure but is no longer stored in the short-term artificial intelligence memory graph data structure.

20 Claims, 29 Drawing Sheets

Related U.S. Application Data

(60) Provisional application No. 62/553,632, filed on Sep. 1, 2017, provisional application No. 62/482,631, filed on Apr. 6, 2017.

(51) Int. Cl.

| | | |
|---|---|---|
| *G06F 40/40* | (2020.01) | |
| *G06F 40/211* | (2020.01) | |
| *G06F 40/284* | (2020.01) | |
| *G06F 16/36* | (2019.01) | |
| *G06F 16/901* | (2019.01) | |
| *G06N 3/04* | (2006.01) | |
| *G06N 3/00* | (2006.01) | |
| *G06N 5/00* | (2006.01) | |
| *G06N 5/02* | (2006.01) | |
| *G06N 5/04* | (2006.01) | |

(52) U.S. Cl.
CPC .......... *G06F 40/211* (2020.01); *G06F 40/284* (2020.01); *G06F 40/30* (2020.01); *G06F 40/40* (2020.01); *G06N 3/008* (2013.01); *G06N 3/0427* (2013.01); *G06N 3/0454* (2013.01); *G06N 5/003* (2013.01); *G06N 5/022* (2013.01); *G06N 5/046* (2013.01)

(56) References Cited

U.S. PATENT DOCUMENTS

| | | | |
|---|---|---|---|
| 5,581,664 | A | 12/1996 | Allen |
| 5,761,717 | A * | 6/1998 | Vishlitzky ........... G06F 12/0862 427/249.7 |
| 6,542,242 | B1 | 4/2003 | Yost |
| 6,859,931 | B1 | 2/2005 | Cheyer |
| 7,386,449 | B2 | 6/2008 | Sun |
| 7,426,500 | B2 * | 9/2008 | Dragojlovic ........... G06F 15/76 382/165 |
| 7,545,965 | B2 | 6/2009 | Suzuki |
| 7,925,605 | B1 | 4/2011 | Rubin |
| 8,073,804 | B1 | 12/2011 | Rubin |
| 8,392,921 | B2 | 3/2013 | Song |
| 8,495,002 | B2 | 7/2013 | Nelken |
| 8,924,011 | B2 | 12/2014 | Park |
| 9,239,382 | B2 | 1/2016 | Paglieroni |
| 9,261,978 | B2 | 2/2016 | Liberty |
| 9,373,086 | B1 | 6/2016 | Allen |
| 9,380,017 | B2 | 6/2016 | Gelfenbeyn |
| 9,424,523 | B2 | 8/2016 | Koll |
| 9,471,668 | B1 | 10/2016 | Alupului |
| 9,555,326 | B2 | 1/2017 | Scott |
| 9,564,149 | B2 | 2/2017 | Gelfenbeyn |
| 9,568,909 | B2 | 2/2017 | Lawson |
| 9,569,425 | B2 | 2/2017 | Jackson |
| 9,659,052 | B1 | 5/2017 | Glennon |
| 9,747,901 | B1 | 8/2017 | Gentry |
| 9,792,434 | B1 | 10/2017 | Li |
| 9,801,517 | B2 | 10/2017 | High |
| 10,068,031 | B2 | 9/2018 | Moore |
| 10,297,253 | B2 | 5/2019 | Walker, II |
| 10,318,907 | B1 | 6/2019 | Bergstrom |
| 10,341,304 | B1 | 7/2019 | Boutros |
| 10,395,173 | B1 | 8/2019 | Heidenreich |
| 10,410,328 | B1 | 9/2019 | Liu |
| 10,418,032 | B1 * | 9/2019 | Mohajer ................ G10L 15/22 |
| 10,453,117 | B1 * | 10/2019 | Reavely ............... G06F 17/278 |
| 10,514,776 | B2 | 12/2019 | Liberty |
| 10,613,527 | B2 | 4/2020 | D'Andrea et al. |
| 2003/0130827 | A1 * | 7/2003 | Bentzien ............... G16B 35/00 703/11 |
| 2004/0013295 | A1 | 1/2004 | Sabe |
| 2004/0044657 | A1 | 3/2004 | Lee |
| 2004/0182614 | A1 | 9/2004 | Wakui |
| 2004/0193322 | A1 | 9/2004 | Pirjanian |
| 2004/0228456 | A1 | 11/2004 | Glynn |
| 2005/0005266 | A1 * | 1/2005 | Datig ...................... G06N 5/02 717/136 |
| 2005/0096790 | A1 | 5/2005 | Tamura |
| 2005/0165508 | A1 | 7/2005 | Kanda |
| 2005/0256882 | A1 | 11/2005 | Able |
| 2006/0041722 | A1 * | 2/2006 | Hakura ............... G06F 12/0862 711/137 |
| 2006/0072738 | A1 | 4/2006 | Louis |
| 2006/0150119 | A1 | 7/2006 | Chesnais |
| 2006/0195407 | A1 | 8/2006 | Athelogou |
| 2007/0070069 | A1 | 3/2007 | Samarasekera |
| 2007/0192910 | A1 | 8/2007 | Vu |
| 2007/0200920 | A1 | 8/2007 | Walker |
| 2008/0015418 | A1 * | 1/2008 | Jarrell ...................... G09B 5/00 600/300 |
| 2008/0133052 | A1 | 6/2008 | Jones |
| 2008/0177683 | A1 * | 7/2008 | No .......................... G07C 5/008 706/15 |
| 2008/0222077 | A1 | 9/2008 | Duan |
| 2008/0243305 | A1 | 10/2008 | Lee |
| 2009/0148034 | A1 | 6/2009 | Higaki |
| 2009/0175545 | A1 | 7/2009 | Cancedda |
| 2009/0192968 | A1 | 7/2009 | Tunstall-Pedoe |
| 2010/0013153 | A1 | 1/2010 | Yourlo |
| 2010/0036802 | A1 * | 2/2010 | Tsuruta ............... G06Q 30/0603 707/722 |
| 2010/0082513 | A1 | 4/2010 | Liu |
| 2010/0211340 | A1 | 8/2010 | Lowenthal |
| 2010/0222957 | A1 | 9/2010 | Ohta |
| 2011/0010013 | A1 | 1/2011 | Ruan |
| 2011/0054689 | A1 | 3/2011 | Nielsen |
| 2011/0090787 | A1 | 4/2011 | Smith |
| 2011/0106436 | A1 | 5/2011 | Bill |
| 2011/0224828 | A1 | 9/2011 | Breznak |
| 2011/0288684 | A1 | 11/2011 | Farlow |
| 2011/0307435 | A1 | 12/2011 | Overell |
| 2012/0010900 | A1 | 1/2012 | Kaniadakis |
| 2012/0016678 | A1 | 1/2012 | Gruber |
| 2012/0095619 | A1 | 4/2012 | Pack |
| 2012/0117005 | A1 | 5/2012 | Spivack |
| 2012/0130270 | A1 | 5/2012 | Imamura |
| 2012/0233152 | A1 | 9/2012 | Vanderwende |
| 2012/0238366 | A1 | 9/2012 | Tedder |
| 2013/0103195 | A1 | 4/2013 | Anhalt |
| 2013/0110764 | A1 * | 5/2013 | Wilf ..................... G06F 16/283 707/600 |
| 2013/0138425 | A1 | 5/2013 | Luke |
| 2013/0246430 | A1 | 9/2013 | Szucs |
| 2013/0253977 | A1 * | 9/2013 | Vibhor .............. G06Q 10/06316 705/7.26 |
| 2013/0289984 | A1 | 10/2013 | Hakkani-Tur |
| 2013/0337916 | A1 | 12/2013 | Saretto |
| 2014/0070947 | A1 | 3/2014 | Ionson |
| 2014/0075004 | A1 * | 3/2014 | Van Dusen ....... G06F 16/90335 709/223 |
| 2014/0100012 | A1 | 4/2014 | Miller |
| 2014/0108303 | A1 | 4/2014 | Cheyer |
| 2014/0132767 | A1 | 5/2014 | Sonnabend |
| 2014/0164533 | A1 | 6/2014 | Lynch |
| 2014/0279807 | A1 | 9/2014 | Dimitrijevic |
| 2014/0279971 | A1 | 9/2014 | Bobick |
| 2014/0280210 | A1 * | 9/2014 | Ritchie ................... G06F 40/30 707/748 |
| 2014/0298358 | A1 | 10/2014 | Tian |
| 2014/0316570 | A1 | 10/2014 | Sun |
| 2015/0025708 | A1 | 1/2015 | Anderson |
| 2015/0032254 | A1 | 1/2015 | Ishiguro |
| 2015/0046181 | A1 | 2/2015 | Adjaoute |
| 2015/0066520 | A1 | 3/2015 | Leon |
| 2015/0066836 | A1 * | 3/2015 | Midmore ................ G06N 5/04 706/56 |
| 2015/0106308 | A1 | 4/2015 | Harrison |
| 2015/0142704 | A1 | 5/2015 | London |
| 2015/0168954 | A1 | 6/2015 | Hickerson |
| 2015/0197007 | A1 | 7/2015 | Pack |
| 2015/0248525 | A1 | 9/2015 | Ury |
| 2015/0269139 | A1 | 9/2015 | McAteer |
| 2015/0279348 | A1 | 10/2015 | Cao |

(56) References Cited

U.S. PATENT DOCUMENTS

| | | |
|---|---|---|
| 2015/0285644 A1 | 10/2015 | Pfaff |
| 2015/0290795 A1 | 10/2015 | Oleynik |
| 2015/0310446 A1 | 10/2015 | Tuchman |
| 2015/0326832 A1 | 11/2015 | Zhang |
| 2015/0356144 A1 | 12/2015 | Chawla |
| 2015/0378984 A1 | 12/2015 | Ateya |
| 2016/0004826 A1 | 1/2016 | Van Arkel |
| 2016/0062882 A1* | 3/2016 | Bonwick ............... G06F 3/0604 711/103 |
| 2016/0068267 A1 | 3/2016 | Liu |
| 2016/0103653 A1 | 4/2016 | Jang |
| 2016/0110422 A1 | 4/2016 | Roytman |
| 2016/0117593 A1 | 4/2016 | London |
| 2016/0132789 A1 | 5/2016 | Flinn |
| 2016/0167226 A1 | 6/2016 | Schnittman |
| 2016/0188595 A1 | 6/2016 | Chen |
| 2016/0189035 A1* | 6/2016 | Shakeri ................. G09B 5/00 706/47 |
| 2016/0255969 A1 | 9/2016 | High |
| 2016/0261771 A1 | 9/2016 | Fujii |
| 2016/0271795 A1 | 9/2016 | Vicenti |
| 2016/0303738 A1 | 10/2016 | Laurent |
| 2016/0350685 A1 | 12/2016 | Helbing |
| 2016/0350930 A1 | 12/2016 | Lin |
| 2016/0378752 A1* | 12/2016 | Anderson ............. G06F 16/245 707/747 |
| 2016/0379092 A1 | 12/2016 | Kutliroff |
| 2016/0379106 A1* | 12/2016 | Qi ............................ G06N 5/04 706/11 |
| 2016/0379120 A1 | 12/2016 | Merdivan |
| 2016/0379121 A1 | 12/2016 | Ge |
| 2017/0004199 A1 | 1/2017 | Häusler |
| 2017/0010830 A1* | 1/2017 | Ishikawa ............. G06F 12/0897 |
| 2017/0024392 A1* | 1/2017 | Shah ........................ G06N 7/00 |
| 2017/0038846 A1 | 2/2017 | Minnen |
| 2017/0052905 A1* | 2/2017 | Lin ....................... G06F 12/126 |
| 2017/0061302 A1 | 3/2017 | Subasi |
| 2017/0078224 A1 | 3/2017 | Chander |
| 2017/0099200 A1 | 4/2017 | Ellenbogen |
| 2017/0109355 A1 | 4/2017 | Li |
| 2017/0116187 A1 | 4/2017 | Erickson |
| 2017/0250930 A1 | 8/2017 | Ben-Itzhak |
| 2017/0255884 A1 | 9/2017 | Visvanathan |
| 2017/0277619 A1 | 9/2017 | Liu |
| 2017/0278110 A1 | 9/2017 | Ezry |
| 2017/0293610 A1* | 10/2017 | Tran ................. G06F 16/90332 |
| 2017/0297588 A1 | 10/2017 | Doshi |
| 2017/0307391 A1 | 10/2017 | Mason |
| 2017/0308521 A1 | 10/2017 | Bruno |
| 2017/0311863 A1 | 11/2017 | Matsunaga |
| 2017/0318919 A1 | 11/2017 | Gharabegian |
| 2017/0323285 A1 | 11/2017 | Xing |
| 2017/0323356 A1 | 11/2017 | Gharabegian |
| 2017/0330106 A1 | 11/2017 | Lindsley |
| 2017/0337620 A1 | 11/2017 | Yu |
| 2018/0043532 A1 | 2/2018 | Lection |
| 2018/0052876 A1 | 2/2018 | Liu |
| 2018/0052913 A1* | 2/2018 | Gaskill .................... G06N 5/02 |
| 2018/0053114 A1 | 2/2018 | Adjaoute |
| 2018/0054507 A1 | 2/2018 | Bentitou |
| 2018/0068031 A1* | 3/2018 | Hewavitharana ..... G06F 40/295 |
| 2018/0075403 A1 | 3/2018 | Mascorro Medina |
| 2018/0082230 A1 | 3/2018 | Rosenberg |
| 2018/0092559 A1 | 4/2018 | Wybo |
| 2018/0099846 A1 | 4/2018 | High |
| 2018/0107917 A1* | 4/2018 | Hewavitharana ... G06F 16/2468 |
| 2018/0108443 A1 | 4/2018 | Li |
| 2018/0114111 A1 | 4/2018 | Gill |
| 2018/0121098 A1 | 5/2018 | Gill |
| 2018/0127211 A1 | 5/2018 | Jarvis |
| 2018/0127212 A1 | 5/2018 | Jarvis |
| 2018/0136615 A1 | 5/2018 | Kim |
| 2018/0137155 A1 | 5/2018 | Majumdar |
| 2018/0143634 A1 | 5/2018 | Ott |
| 2018/0143978 A1* | 5/2018 | Chang ..................... G06F 16/93 |
| 2018/0144208 A1 | 5/2018 | Lu ........................... G06N 3/084 |
| 2018/0144248 A1* | 5/2018 | Lu ........................... G06F 17/241 |
| 2018/0144257 A1 | 5/2018 | Ankisettipalli |
| 2018/0150740 A1 | 5/2018 | Wang |
| 2018/0165518 A1 | 6/2018 | Assaf |
| 2018/0165625 A1 | 6/2018 | Modi |
| 2018/0169865 A1 | 6/2018 | Kou |
| 2018/0173459 A1 | 6/2018 | Katarki |
| 2018/0189269 A1* | 7/2018 | Quirk ................. G06F 17/2775 |
| 2018/0197275 A1 | 7/2018 | Price |
| 2018/0218266 A1 | 8/2018 | Halim |
| 2018/0218472 A1 | 8/2018 | Riabov |
| 2018/0225281 A1* | 8/2018 | Song ..................... G06N 3/0445 |
| 2018/0233141 A1* | 8/2018 | Solomon ................. G10L 15/28 |
| 2018/0256989 A1 | 9/2018 | Adekunle |
| 2018/0267540 A1 | 9/2018 | Sonoura |
| 2018/0268699 A1 | 9/2018 | Ohsawa |
| 2018/0275677 A1 | 9/2018 | Hamada |
| 2018/0275913 A1 | 9/2018 | Mitkar |
| 2018/0281191 A1 | 10/2018 | Sinyavskiy |
| 2018/0284735 A1* | 10/2018 | Cella ................. G05B 19/41875 |
| 2018/0285359 A1 | 10/2018 | Bostick |
| 2018/0285595 A1 | 10/2018 | Jessen |
| 2018/0292827 A1 | 10/2018 | Artes |
| 2018/0314603 A1 | 11/2018 | Gibbons, Jr. |
| 2018/0314689 A1 | 11/2018 | Wang |
| 2018/0336271 A1 | 11/2018 | Chandrasekaran |
| 2018/0349485 A1 | 12/2018 | Carlisle |
| 2019/0035083 A1 | 1/2019 | Lin |
| 2019/0053856 A1 | 2/2019 | Weber |
| 2019/0154439 A1 | 5/2019 | Binder |
| 2019/0179329 A1 | 6/2019 | Keivan |
| 2019/0193273 A1 | 6/2019 | Favis |
| 2019/0220774 A1 | 7/2019 | Terry |
| 2019/0255703 A1 | 8/2019 | Izhikevich |
| 2019/0273619 A1* | 9/2019 | Campagna ............ G06F 21/602 |
| 2019/0278769 A1 | 9/2019 | Lellis |
| 2019/0286996 A1 | 9/2019 | Tian |
| 2019/0290209 A1 | 9/2019 | Fu |
| 2019/0347120 A1* | 11/2019 | Kottomtharayil ... G06F 9/45533 |
| 2019/0351558 A1 | 11/2019 | Park |
| 2019/0361457 A1 | 11/2019 | Johnson |
| 2019/0370096 A1 | 12/2019 | Grewal |
| 2019/0378019 A1* | 12/2019 | Scheutz ................... G06N 5/02 |
| 2020/0035110 A1 | 1/2020 | Priest |
| 2020/0061839 A1 | 2/2020 | Deyle |
| 2020/0117187 A1 | 4/2020 | Kothari |
| 2020/0152084 A1 | 5/2020 | Kumar |
| 2020/0215698 A1 | 7/2020 | Bogolea |

OTHER PUBLICATIONS

Agichtein et al., Learning Search Engine Specific Query Transformations for Question Answering, 10th International World Wide Web Conference, World Academy of Science, Engineering and Technology, 2001, pp. 169-178.

Kambhampati et al, "Multiresolution Path Planning for Mobile Robots," IEEE Journal on Robotics and Automation, vol. 2 Issue 3, pp. 135-145. (Year: 1986).

Kangavari et al., Information Retrieval: Improving Question Answering Systems by Query Reformulation and Answer Validation, World Academy of Science, Engineering and Technology, 2008, pp. 303-310, Issue 48.

* cited by examiner

```
1. Initialize state
2. Repeat - Overall works
        1) Get new external events
        2) Sequence for determining plan
                * Repeat to select most proper module
                        1/Select the highest priority module
                        2/Execute Planner or selected module
                            (if planner works)
                                >> Generate Domain & Problem
                                >> Set a goal
                                >> Run planner to get a plan
                            (If other module works)
                                >> Execute each module's work
                                >> Set a plan for module
                        3/Investigate if plan is proper
                * Repeat end (if plan is proper)
        3) Execute plan with executor
        4) Generate natural language
        5) Output generated response
3. End Repeat - Overall works
```

FIG. 18

```
1:  parse & process the input sentence
2:  if input sentence requires past memory
3 :   if there is high probability that the information is in long-term memory
4:      search the information in long-term memory
5:   endif
6:   else if
7:      search the information in short-term memory
8:   if the retrieved information is null
9:      search the information in long-term memory
10:   endif
11:  endif
12: endif
```

ADAPTIVE, INTERACTIVE, AND COGNITIVE REASONER OF AN AUTONOMOUS ROBOTIC SYSTEM UTILIZING AN ADVANCED MEMORY GRAPH STRUCTURE

CROSS REFERENCE TO OTHER APPLICATIONS

This application claims priority to U.S. Provisional Patent Application No. 62/553,632 entitled ADAPTIVE, INTERACTIVE, AND COGNITIVE REASONER OF AN AUTONOMOUS ROBOTIC SYSTEM UTILIZING AN ADVANCED MEMORY GRAPH STRUCTURE filed Sep. 1, 2017 which is incorporated herein by reference for all purposes.

This application is a continuation-in-part of co-pending U.S. patent application Ser. No. 15/946,646 entitled ADAPTIVE, INTERACTIVE, AND COGNITIVE REASONER OF AN AUTONOMOUS ROBOTIC SYSTEM filed Apr. 5, 2018, which claims priority to U.S. Provisional Patent Application No. 62/482,631 entitled ADAPTIVE, INTERACTIVE, AND COGNITIVE REASONER OF AN AUTONOMOUS ROBOTIC SYSTEM filed Apr. 6, 2017, both of which are incorporated herein by reference for all purposes.

BACKGROUND OF THE INVENTION

Traditional robotic systems such as a voice artificial intelligence (AI) robot agent are capable of responding to generic queries. Examples of a query and response include asking and receiving a response for the current weather or movie show times. These queries typically rely on backend databases, such as weather or movie show times databases, to retrieve general knowledge information. However, a user often desires to query local information that the user has previously shared with the AI agent and to interact with the agent across multiple back-and-forth exchanges. Therefore, there exists a need for an autonomous robotic system with a memory structure that can utilize general knowledge, such as facts, meanings, and/or concepts, and local knowledge from interactions with the robot agent to generate a response to a query. A user can participate in an interactive conversation that spans multiple queries and responses where the responses are adapted to the context of previous conversations and incorporate facts, meaning, and concepts from general knowledge sources.

BRIEF DESCRIPTION OF THE DRAWINGS

Various embodiments of the invention are disclosed in the following detailed description and the accompanying drawings.

FIG. 18 is a pseudo-code description illustrating an embodiment of a process for solving an artificial intelligence problem using adaptive, interactive, and cognitive reasoning.

FIG. 22 is a pseudo-code description illustrating an embodiment of a process for accessing a memory graph data structure.

DETAILED DESCRIPTION

Figure 1:
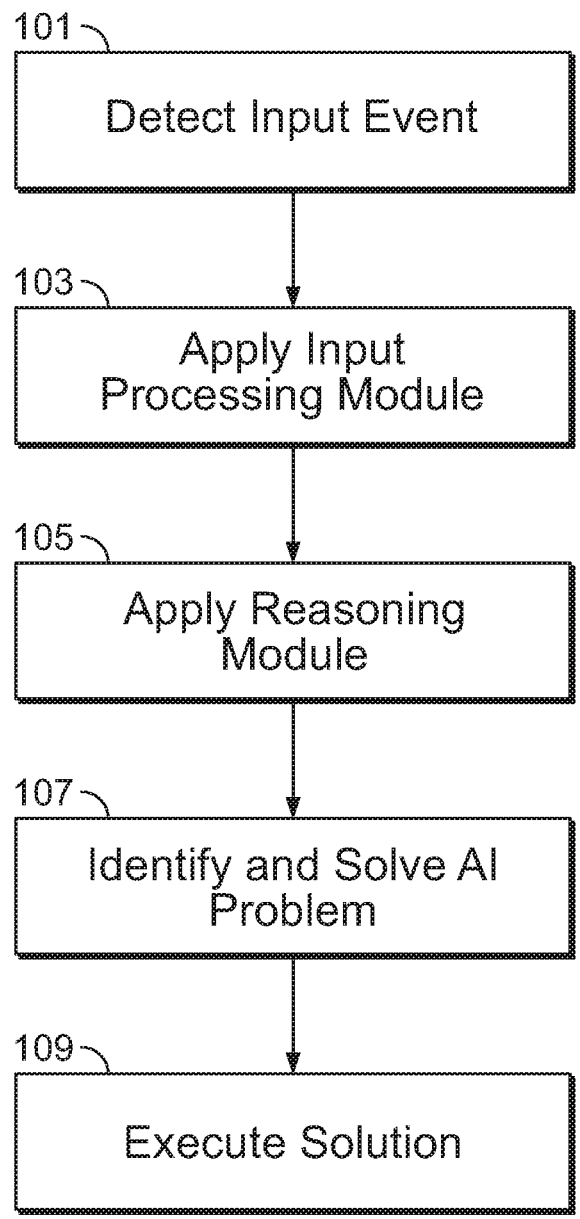
FIG. 1 is a flow diagram illustrating an embodiment of a process for responding to an input event using an adaptive, interactive, and cognitive reasoner.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An autonomous robotic system for responding to conversational voice input using an adaptive, interactive, and cognitive reasoner is disclosed. For example, a voice artificial intelligence (AI) robot agent is capable of storing previous conservations with a user and using the stored knowledge in responses to new queries. In addition, a conversation between a user and an autonomous robotic system can include multiple back-and-forth exchanges where the responses of the autonomous robotic system rely on the context of what the user speaks. The user's voice input is processed using speech recognition and natural language understanding. The processed input is then compared to a knowledge store, such as a memory graph, that stores historical knowledge shared by the user with the agent. The memory graph data structure can include both short term and long term episodic memory used to capture localized knowledge that is personalized to the user and AI robot agent. The memory graph data structure can also include semantic memory such as external ontology memory. An external ontology memory may utilize a remote database for semantic information. In response to a query, the appropriate episodic memory (e.g., short term and/or long term memory) and/or semantic memory is used to retrieve supporting knowledge relevant to the query. The episodic memory may include facts learned from past interactions between the AI robot agent and user(s). The supporting knowledge from short-term memory may be more quickly accessed than long-term memory. Semantic information may be retrieved from an external ontology database to help define the meaning of words or phrases used in a query. Using the retrieved supporting knowledge and the user's input, an AI planning problem is constructed. The AI problem is solved using an AI planner such as an automated planner and/or by referencing previous solutions to similar problems. The resulting solution is executed using natural language generation to provide the user with a voice response. The result is a conversation between a user and an AI agent that spans multiple back-and-forth exchanges and where the content of the conversation includes responses that rely on past conversations. The responses generated by the AI agent are much more interactive and adaptive to the user's responses than possible with traditional voice AI response techniques.

In some embodiments, a natural language artificial intelligence (AI) problem is solved. For example, a user asks a voice AI agent a query and the voice AI agent solves the natural language AI problem and provides a vocal response. Initially, a natural language input is received. For example, a user speaks a query to a robotic system such as a voice AI agent. The natural language input is processed to classify components of the natural language input. For example, the voice is processed into a structured format that identifies a subject, object, and predicate. In some embodiments, one or more lemma are identified as well as a performative classification, a sender of the input, and a receiver of the input. A starting node of an artificial intelligence memory graph data structure is selected to begin a search for one or more supporting knowledge data nodes associated with the classified components, wherein the artificial intelligence memory graph comprises one or more data nodes. For example, an artificial intelligence memory graph is made up of one or more nodes including root nodes that are each associated with a different user that has interacted with the robotic system. The speaker of the natural language input is identified and the user root node associated with the speaker is selected as a starting node. Starting at the starting node, the artificial intelligence memory graph data structure is searched using a lexical database to identify the one or more supporting knowledge data nodes. For example, the starting nodes may serve as a starting node to begin a search for data nodes relevant to the classified components. In some embodiments, one or more nodes based on previous input are identified as supporting knowledge and are associated with the example query. In some embodiments, a lexical database is used to identify words and/or nodes that are related to the input. In some embodiments, a lexical database is utilized for co-referencing. An artificial intelligence problem is identified. For example, a query is identified as an AI problem that is different from a declaration. In one scenario, a user may ask "What is my name?" and in the other scenario a user makes the assertion "My name is Alice." In various embodiments, the identified AI problem is generated using the processed natural language input and identified supporting knowledge data nodes. The artificial intelligence problem is solved using the one or more identified supporting knowledge nodes of the artificial intelligence memory graph data structure. For example, using the identified nodes as supporting knowledge, an AI planning problem is created and solved. In some embodiments, the AI problem is an AI planning problem solved using an AI planner.

In some embodiments, the classified components of the natural language input are recorded in one or more nodes of an artificial intelligence memory graph data structure. As an example, certain words or variations of words of an input sentence are classified into word components and recorded as nodes in a memory graph data structure for processing and retrieval at a later date. The nodes may identify the part of speech of the word and its relation to the sentence as well as previously received input. In some embodiments, the solution to the identified artificial intelligence problem is also stored in the artificial intelligence memory graph data structure.

In some embodiments, an artificial intelligence memory graph data structure is used to store relevant knowledge for queries. For example, a natural language input such as a query from a user is received. The natural language input is processed to identify components of the natural language input. As an example, a natural language input sentence may be classified into word components. In some embodiments, at least a portion of the components of the natural language input is stored in a short-term artificial intelligence (AI) memory graph data structure. In some embodiments, a long-term AI memory graph data structure includes data that was previously stored in the short-term artificial intelligence memory graph data structure. For example, the identified components of the natural language input are stored in both the short-term and long-term AI memory graph structures and may be removed from the short-term memory when it becomes less relevant. In some embodiments, data stored in the long-term AI memory graph structure may no longer be stored in the short-term AI memory graph data structure. In various embodiments, the data stored may not be modified once stored. In some embodiments, the data may not be modified but may be deleted. For example, the data represents a memory of a natural language input and does not change once stored in the short-term or long-term memory of an advanced AI memory graph data structure.

In some embodiments, an artificial intelligence memory graph data structure is used to retrieve relevant knowledge to create a response to a query. For example, a natural language query is received. The natural language query is analyzed to classify components of the natural language query. For example, certain words or variations of words of a query are classified into word components. In various embodiments, a short-term artificial intelligence (AI) memory graph data structure is searched for one or more supporting knowledge data nodes associated with the classified components. For example, supporting knowledge data nodes that match the input word components are searched for in short-term memory. In some embodiments, based on the determination of whether the search was successful, a determination is made whether to search the long-term AI memory graph data structure for supporting knowledge data nodes associated with the classified components. For example, in the event supporting knowledge data nodes are not found in the short-term AI memory graph data structure, the long-term AI memory graph data structure is searched.

Cognitive Science and other related fields have brought us closer to the understanding of the human mind and brain and how they work. True AI has the very purpose of mapping the human knowledge and how it is acquired, processed, and used into artificial intelligent agents. The adaptive interactive cognitive reasoning engine (AICoRE) is an agent reasoner that is meant to be the encapsulation of the components of the human mind in any agent with a robot body. The integration of the human knowledge traits from language, memory, visual perception, thinking and reasoning to decision making and social cognition can be shown in a practical implementation of the general conversational agent.

In various embodiments, a memory graph in the adaptive interactive cognitive reasoning engine (AICoRE) behaves in a manner similar to the way human memory supports functions of the human brain, enabling human-like interactions via AICoRE. In some embodiments, a memory graph can be divided into long-term memory and short-term memory. For example, long-term memory can be used to store all episodic information and semantic information (e.g., without limitation of capacity). Meanwhile, short-term memory can be configured to support sudden associations. In various embodiments, information may be stored in main memory to guarantee responsiveness.

In various embodiments, the adaptive interactive cognitive reasoning engine (AICoRE) is a cognitive reasoning engine that unifies problem solving and learning. It may fully automate the reasoning process from end to end. In some embodiments, the AICoRE is an incremental holistic human-like reasoner, covering the full spectrum of reasoning from sensing, reasoning, discovering, planning, learning and remembering until responding and performing.

In order to have such a significant improvement over the general conversation agent (GCA), the depth and breadth of the research that was undertaken includes fields like audio-visual sensory techniques, natural language understanding (NLU), reasoning, planning, natural language generation (NLG), case based reasoning (CBR), inter-agent communication (iAC) and memory graph (MG). In some embodiments, these modules constitute the AICoRE, and are closely related to each other.

In some embodiment, the NLU module tries to find triples from a sentence using a natural language processing tool and co-reference modules. In some embodiments, the NLU module parses sentences based on constituency first, and then adds more information such as the subject, verb, and object of the sentence. It not only parses the grammatical structure of the sentence, but also analyzes the performative and language of the sentence. In addition, the co-reference module checks not only objects in sentences, but also the relationships between the speaker and the object.

In some embodiments, the output of NLU is transferred into a reasoner module to retrieve information that will help the next module, the planner, generate a response fit for general conversation. Using a supporting knowledge retriever sub-function, the reasoner gathers a list of resources from the memory graph corresponding to knowledge that are related to the given input, and ranks these resources in order of importance. After that, an open-ended conversation generator sub-module determines possible response types that will serve as templates for generating more various natural responses.

In some embodiments, using the output of the reasoner module, the problem generator generates an artificial intelligence problem and the planner solves the problem. For example, in some embodiments, the problem generator generates a PDDL domain/problem description, and the planner module solves the PDDL problem specified by the description. In various embodiments, the planner module is capable of dealing with both physical and cognitive (speech) actions, and also dealing with real world problems while interacting with multiple agents and humans. Unlike traditional conversation agents, the disclosure autonomous robotic system can use the planner module itself to get solutions.

In various embodiments, the generated solution is used in a NLG module for generating answers in a natural language format. For example, a NLG module is utilized to generate natural language from a machine-based representation such as a knowledge base or a logical form.

In some embodiments, all of the generated data is saved in memory. The AICoRE can manage and use the saved data efficiently, for example, by using its memory structure. In various embodiments, the CBR is the process of solving new problems based on the solutions of similar past problems. The CBR compares the current case against previous ones based on a description of the problem, such as a PDDL problem description, and the action plan made by the planner module. In the event the CBR module determines a previously solved problem is similar to the current one, a previous case may be reused.

In various embodiments, inter-agent communication (iAC) is utilized for communication between different agents. The iAC may include two modules, an iACManager and an iAC Server. The iACManager module represents the client side of the iAC. The iACManager module generates ACLMessages and sends the messages via an inter-agent communication platform. In some embodiments, the ACLMessages are based on the FIPA-ACL standard. In some embodiments, the inter-agent communication platform is the JADE Platform. In some embodiments, the iACServer module runs on the same inter-agent communication platform as the iACManager and can send and receive ACLMessages. In various embodiments, messages are sent based on whether the appropriate receiver exists.

In various embodiments, a memory graph in the adaptive interactive cognitive reasoning engine (AICoRE) is structured in a manner similar to the human memory. For example, a memory graph may be classified into episodic memory and semantic memory. In various embodiments, a memory graph enables AICoRE to utilize interaction history when interacting with users. For example, AICoRE may store what a user has said in episodic memory and may store facts, meanings, and/or concepts in semantic memory.

In some embodiments, episodic memory is divided into long-term and short-term memory. For example, in some embodiments, short-term memory may be utilized as a working memory for holding a partial subset of long-term memory. Short-term memory may be utilized for storing information that is highly likely to be accessed in the future and is configured to provide a fast response time to a user. In some embodiments, short-term memory may be managed on main memory to provide negligible latency. In various embodiments, long-term memory may effectively provide unlimited capacity in storing all information experienced with users. For example, long-term memory may be managed on storage for satisfying persistency. In some embodiments, long-term memory and short-term memory closely interact with each other to provide a fluid and consistent experience.

An example process of the AICoRE is as follows: the chosen event, represented in natural language format, gets put into the natural language understanding module of the AICoRE. Next, the planner module of the AICoRE uses a set of internal rules to set the most proper goal and plan to get the best solution for the given event. The AICoRE relies on rules of the planner module as well as rules from other modules within the system. In some embodiments, an iterative sequence is required within the main repeat sequence in order to account for all the various rules. Examples of rules not from the planner module include rules from the reasoner module that are used to map data to the event, based on various characteristics of the event. Once a plan is set for executing a solution for a given event, the AICoRE executes the plan with an executor module. Using the steps generated by the execution of the plan, the AICoRE can generate responses in a natural language form that satisfies the actions required to accomplish the goal set by the input event.

FIG. 1 is a flow diagram illustrating an embodiment of a process for responding to an input event using an adaptive, interactive, and cognitive reasoner. In the example shown, the process of FIG. 1 may be used by an autonomous robotic system to create and execute a voice response to a received query, such as a voice query. As another example, the result of FIG. 1 may be movement performed by an autonomous robotic system in response to a movement command. In various embodiments, the process of FIG. 1 may be implemented on a computer programmed system including a mobile device. In some embodiments, portions of the process of FIG. 1 are performed across one or more computer programmed systems including remote servers such as cloud computing servers. In some embodiments, the process of FIG. 1 is implemented by an autonomous robotic system in response to an input event.

At 101, an input event is detected. In various embodiments, the input event is a triggering event that initiates the processing of FIG. 1. In some embodiments, the input detected is voice input from a human user such as a spoken sentence. In some embodiments, the input detected includes not only voice input but also visual input. In various embodiments, the input detected may be voice input, visual input (e.g., gestures, the presentation of a face, an object moving, etc.), and network communication, among others. In some embodiments, the input detected is received from an autonomous agent and/or autonomous robot.

At 103, an input processing module is applied to the input detected at 101. In various embodiments, an autonomous robotic system includes one or more input processing modules. In various embodiments, a conversation module is used to process voice input. In some embodiments, visual input such as a gesture is processed by a vision module, remote communication is processed using a remote communication module, movement instructions are processed by a plan & move module, etc. In the example shown, the appropriate input processing module is determined and applied. For example, a conversation module is selected and applied when the input detected at 101 is determined to be a voice sentence that initiates or continues a conversation.

At 105, a reasoning module is applied. For example, an autonomous robotic system includes a reasoning module that identifies and retrieves supporting knowledge related to the input event detected at 101. In some embodiments, the knowledge is retrieved from a knowledge store such as a memory graph data structure that captures and organizes data previously learned including data from sources such as conversations, actions, and/or observations, etc. In some embodiments, a reasoning module determines which data of the knowledge store is supporting knowledge in part by utilizing a lexical database. For example, a remote lexical database may be utilized for co-referencing to identify data as relevant to the received input. In various embodiments, a reasoning module may access remote data stores for supporting knowledge in addition to the knowledge store of the system. In various embodiments, the knowledge store may be local and/or remote to the system. In some embodiments, the knowledge store may be partitioned by the entity that generates, creates, and/or receives the knowledge. For example, a knowledge store may contain a separate partition of the data associated with each different user that interacts with the system. In some embodiments, the knowledge store may contain a separate partition of data for the autonomous system. In various embodiments, the knowledge store may be located on a server system and/or in the cloud. In some embodiments, the knowledge store is maintained on the local system and/or device and may be encrypted to limit access to only processes local the knowledge store. In various embodiments, the knowledge store may reside in one or more locations. In some embodiments, the reasoning modules updates the knowledge store based on the input event.

At 107, an artificial intelligence (AI) problem is identified and solved. In some embodiments, the supporting knowledge retrieved at 105 is used to identify and construct an AI planning problem. In various embodiments, the AI planning problem is solved using an AI planner. In some embodiments, once solved, the solution is saved for potential reuse if the same problem is encountered again. In some embodiments, previously solved problems are analyzed to determine the appropriate solution for the current problem. For example, previous solved problems may be matched using a case based reasoning module and the solution re-used for a subsequently generated AI planning problem. In various embodiments, case based reasoning improves the performance of the system compared to a solution that relies solely on an AI planner. In various embodiments, the solution is used to create a response to the input received at 101.

At 109, a solution is executed. For example, in response to a voice input at 101, the solution solved at 107 is executed by generating a voice response that is played to the user. In various embodiments, a voice response is generated using natural language generation. In some embodiments, the executed solution and/or output are added to the knowledge store of the system. As another example, in response to input that is a movement request, an autonomous robotic system will move based on its understanding of the received movement instruction. For example, an autonomous robot may determine to move to a certain location, at a certain speed, using a certain movement pattern (walking, running, crawling, 4-wheel drive, 2-wheel drive, slithering, etc.). In various embodiments, the execution of the solution is performed by an executor module. In some embodiments, the executor module relies on one or more different sub-modules depending on type of input event detected at 101. For example, in the case of a movement request input event, the executor module executes a solution that physically moves the autonomous robotic system and may engage different mechanical control systems including those configured to manipulate motor and steering functionality.

Figure 2:
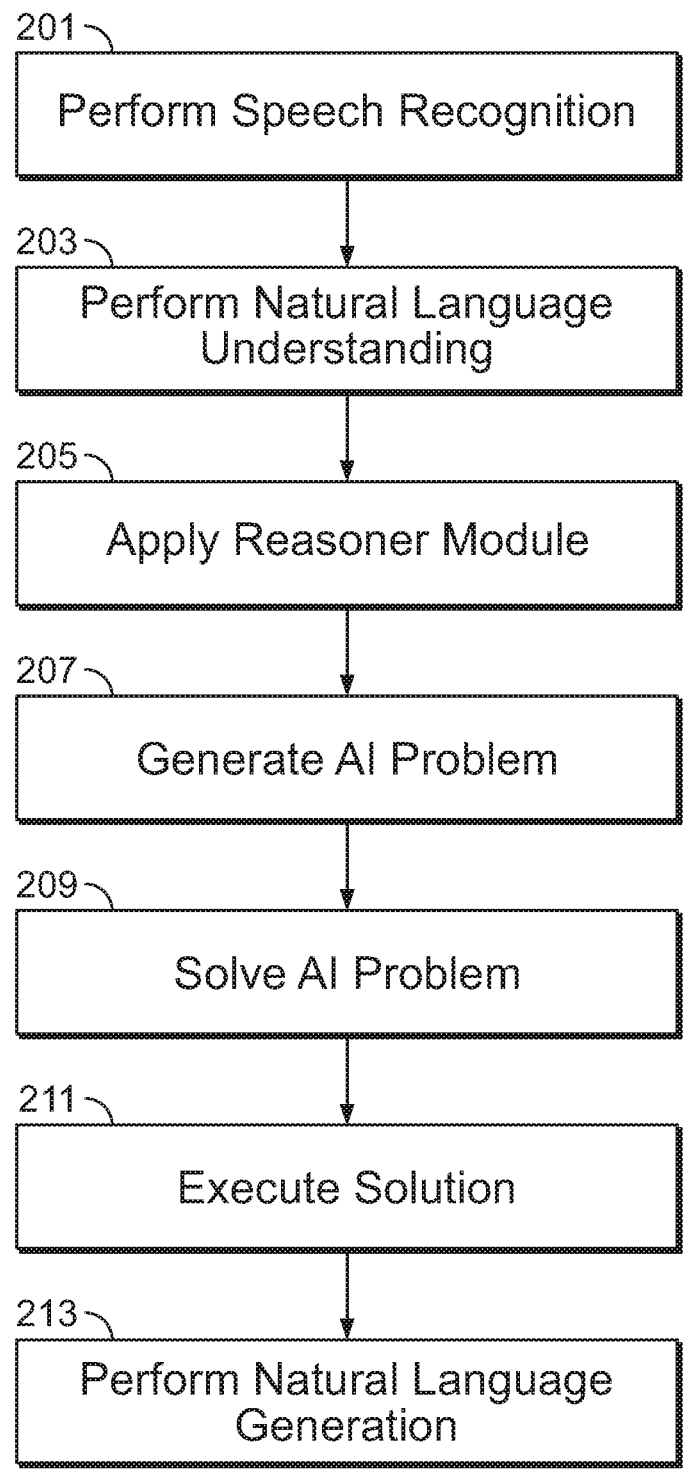
FIG. 2 is a flow diagram illustrating an embodiment of a process for responding to voice input using an adaptive, interactive, and cognitive reasoner with a voice response.

FIG. 2 is a flow diagram illustrating an embodiment of a process for responding to voice input using an adaptive, interactive, and cognitive reasoner with a voice response. In the example shown, the process of FIG. 2 may be used by an autonomous robotic system to create and execute a voice response to a received voice query. For example, a voice artificial intelligence (AI) agent can generate a response to the voice query "What fruit do I like?" that answers the fruit the user previously told the agent that she or he likes. In some embodiments, the process of FIG. 2 is performed using the process of FIG. 1.

At 201, speech recognition is performed. In various embodiments, speech recognition is performed on detected voice input. For example, an input event associated with a spoken sentence is detected as a sound and recognized as human speech. In some embodiments, the speech recognition identifies the beginning and end of a voice input. In some embodiments, the step of 201 is performed as part of the step of 101 and/or 103 of FIG. 1.

At 203, natural language understanding is performed. For example, a natural language understanding process is performed by a natural language understanding module on the speech recognized at 201 to derive meaning from the received human or natural language input. In some embodiments, the natural language understanding functionality is performed by a conversation input processing module. In some embodiments, the step of 203 is performed at 103 of FIG. 1 in response to applying a conversation input processing module to detected voice input.

In some embodiments, the natural language understanding module attempts to identify triples from a sentence. For example, a sentence recognized as speech at 201 is parsed and triples are extracted. In some embodiments, triples are extracted using a parse tree. In some embodiments, reified triples are extracted from the sentence. In some embodiments, the system uses labeled-links to find appropriate modifiers from an element. In various embodiments, reification is utilized to further annotate the recognized sentence.

In some embodiments, the natural language understanding processing includes adding missing punctuation to improve the accuracy of the syntactic parsing. For example, a first set of words of the sentence and corresponding parts of speech tags are analyzed and punctuation may be added. In some embodiments, co-referencing is performed to identify referents prior to creating a parse tree. In some embodiments, the initial parse tree is corrected using a set of pre-defined rules. In various embodiments, the sentence's performative classification is determined and may be utilized to determine the appropriate response. Examples of performative classifications include inform, query-ref, query-if, and request types and may be used to denote the type of communicative act. In various embodiments, fewer or more performatives types may be supported. In some embodiments, the performatives are based on the Foundation for Intelligent Physical Agents-Agent Communication Language (FIPA-ACL) specification. For example, a query-if performative denotes a query (e.g., "Do you like apples?" and "Am I a student?") that expects a true or false response. A query-ref performative denotes a query (e.g., "What fruit do I like?" and "How is the weather today?") that expects a response using an object answer. A request performative is a request directed to the autonomous robotic system. Examples include: "Move forward" and "Turn the light on."

In various embodiments, the natural language understanding process parses the received sentence based on constituency and then added additional information such as the identified subject, verb, and/or object. The module identifies the grammatical structure of the sentence and determines the sentence's performative classification and language.

At 205, a reasoner module is applied. In various embodiments, the reasoner module is implemented using an adaptive, interactive, and cognitive reasoner. For example, an adaptive, interactive, and cognitive reasoner is applied to the voice input processed at 201 and 203. In some embodiments, the reasoner provides data for creating an artificial intelligence (AI) planning problem. For example, the reasoner may retrieve data used to generate an AI problem based on the relevance of stored data to the input to the reasoner. In some embodiments, the data is retrieved from a memory graph data structure that stores episodic memory relevant to each user the robotic system interacts with. In some embodiments, the step of 205 is performed at 105 of FIG. 1.

At 207, an artificial intelligence (AI) problem is generated. In some embodiments, the problem is generated by an AI problem generator using the information provided by applying a reasoner module at 205. In some embodiments, the planning problem is described using an artificial intelligence planning language such as the language described by the Planning Domain Definition Language (PDDL) specification and/or a multi-agent extension of PDDL. In some embodiments, the specifications are Multi-Agent PDDL (MA-PDDL) descriptions that include a domain description and a problem description. In various embodiments, the problem generation includes converting the extracted triple at 203 to an artificial intelligence planning language. The generated problem includes a description of the current status and/or state of the system and one or more goals to achieve. In some embodiments, the step of 207 is performed as part of 107 of FIG. 1.

In some embodiments, the generated artificial intelligence (AI) problem uses a predefined problem domain and includes one or more actions appropriate for the domain. In various embodiments, the actions are defined based on the performative of the input sentence. For example, in some embodiments, the performative classifications include inform, query-ref, query-if, and request to denote the type of communicative act. In various embodiments, fewer or more performative types may be supported. In some embodiments, the performatives are based on the Foundation for Intelligent Physical Agents-Agent Communication Language (FIPA-ACL) specification.

At 209, an artificial intelligence (AI) problem is solved. In various embodiments, the solution is solved using an AI planner. In some embodiments, the AI planner utilizes a machine learning model such as a deep convolutional neural network (DCNN). In various embodiments, a traditional AI planner is utilized to solve the AI planning problem. For example, the planner determines a sequence of actions based on an AI planning problem generated at 207. In some embodiments, once solved, the solution is saved for potential reuse in the event the same or a similar problem is encountered again. For example, the problem, the solution, and the context related to the two are saved in a knowledge store such as a memory graph data structure. In some embodiments, the step of 209 is performed as part of 107 of FIG. 1.

In some embodiments, a case based reasoning (CBR) module is used in addition to an AI planner. For example, a CBR module is utilized to increase the performance of AI problem solving by relying on previously solved AI problems and their solutions. Previous solutions are stored as case data using the CBR module. In some embodiments, the data for a case includes at least the problem and an associated sequence of actions determined to solve the problem. In response to a new AI planning problem that matches a previous case, the previously solved solution is utilized instead of re-solving the same problem. In various embodiments, utilizing the CBR module reduces the response time for solving an AI problem.

In some embodiments, case data are stored in a knowledge store such as a memory graph data structure. For example, case data stored may include sender, receiver, time, planner, problem, and solution information. In various embodiments, the sender information identifies the speaker, the receiver information identifies the listener, the time information is the time associated with the conversation, the planner information includes the type of planner used for generating the solution, and the solution information is the action plan of the selected planner.

At 211, the solved artificial intelligence (AI) problem solution is executed. In some embodiments, an executor module executes the solution plan to the AI problem. In various embodiments, the executor module uses one or more different sub-modules to execute the solution based on the input event. For an input event requiring a voice response, the executor module utilizes a natural language generation sub-module and processing continues to 213 where a voice response is generated. In some embodiments, the step of 211 is performed as part of 109 of FIG. 1

At 213, natural language generation (NLG) is performed. In various embodiments, a NLG module performs NLG processing to generate a voice response based on the AI solution solved at 209. In some embodiments, the NLG module performs reconstruction, fixes grammatical errors, and corrects person discrepancies detected in the AI solution to create a more accurate natural language response before converting the solved solution to a voice response. In some embodiments, the step of 213 is performed as part of 109 of FIG. 1.

In some embodiments, the natural language generation (NLG) processing includes parsing string of triples and making a graph of the solution solved at 209. A parsed tree is created using the graph to determine the ordering of the sentence and the subject, predicate, and object(s) of the sentence. In some embodiments, the data is coreferenced. For example, names may be replaced with personal pronouns. In some embodiments, the NLG module utilizes the entire (i.e. whole) sentence without omission of words or changes in grammatical structure to generate a natural language response.

Figure 3:
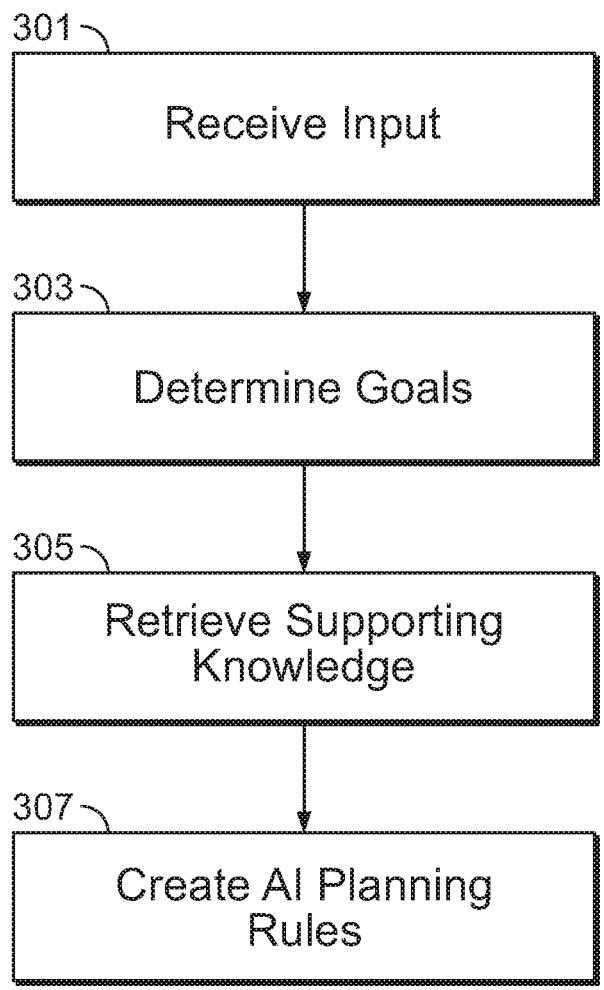
FIG. 3 is a flow diagram illustrating an embodiment of a process for performing reasoning by an adaptive, interactive, and cognitive reasoner.

FIG. 3 is a flow diagram illustrating an embodiment of a process for performing reasoning by an adaptive, interactive, and cognitive reasoner. In various embodiments, the process of FIG. 3 identifies and retrieves supporting knowledge and goals and creates artificial intelligence (AI) planning rules based on the determined information. In some embodiments, AI planning rules are utilized to create an AI planning problem. In some embodiments, the process of FIG. 3 is performed at 105 of FIG. 1 and/or 205 of FIG. 2.

At 301, input is received. For example, a reasoner module receives input such as the input sentence. In some embodiments, an input sentence and a talk mode is received. Examples of talk mode include a query mode and a quiz mode. In some embodiments, a query mode is used for retrieving information from a robotic system. In some embodiments, a query talk mode is also referred to as a conversation and/or normal talk mode. In some embodiments, a quiz mode is used for testing the user on a particular subject, such as a language, using the robotic system. For example, in quiz mode, the robotic system may quiz the user on a subject matter that the user is learning. In some embodiments, the input is received by a reasoner module and the reasoner module invokes one or more sub-functions to retrieve information that is appended to the processed input. In some embodiments, a data structure such as an IntentInformation object is used to encapsulate the retrieved information.

At 303, one or more goals are determined. In some embodiments, each goal represents a goal of the speaker and the reasoner module will attempt to achieve one or more of the determined goals. For example, a basic and common goal may be to make the speaker happy. In some embodiments, a goal predicate is determined based on the one or more goals. In various embodiments, the determined goal is based on the needs of the speaker and determined using the input sentence and goal hierarchy. For example, a goal hierarchy may be represented as a goal hierarchy tree where nodes in the tree correspond to the speaker's needs. The goals may be ranked. For example, each goal within the sub-tree may be assigned a score based on how urgent the goal needs to be satisfied. Using the goal rankings, one or more goals may be selected and the selected goals may be prioritized.

At 305, supporting knowledge is retrieved. In various embodiments, the supporting knowledge retrieved is based on the talk mode of the input received at 301. For example, a query and/or conversation talk mode retrieves supporting knowledge based at least on previous conversations. In various embodiments, the retrieved supporting knowledge is provided to a subsequent module, such as a planner module for artificial intelligence (AI) planning to generate a response appropriate for the received input. In various embodiments, the retrieved supporting knowledge is ranked. For example, the ranking is used to prioritize the knowledge.

In some embodiments, the supporting knowledge retrieved is based on a quiz talk mode. For example, in a quiz talk mode, supporting knowledge is retrieved based on the quiz subject. In some embodiments, the supporting knowledge retrieved is information for administering an IQ quiz session. In some embodiments, the retrieved information is based on the current IQ quiz state.

At 307, artificial intelligence (AI) planning rules are created. For example, based on the supporting knowledge retrieved at 305, planning rules are created that may be utilized for AI planning problem creation. In some embodiments, the created rules are based on the priority assigned to each set of data of the retrieved supporting knowledge. For example, in some embodiments, each set of data retrieved is assigned a rank. The supporting knowledge is then prioritized using AI planning rules. In some embodiments, the rules created are used to map retrieved supporting data to an event, such as a user's voice query. In some embodiments, the rules are based on the characteristics of the event. In various embodiments, the resulting rules are provided to an AI planning problem generator step such as step 207 of FIG. 2.

Figure 4:
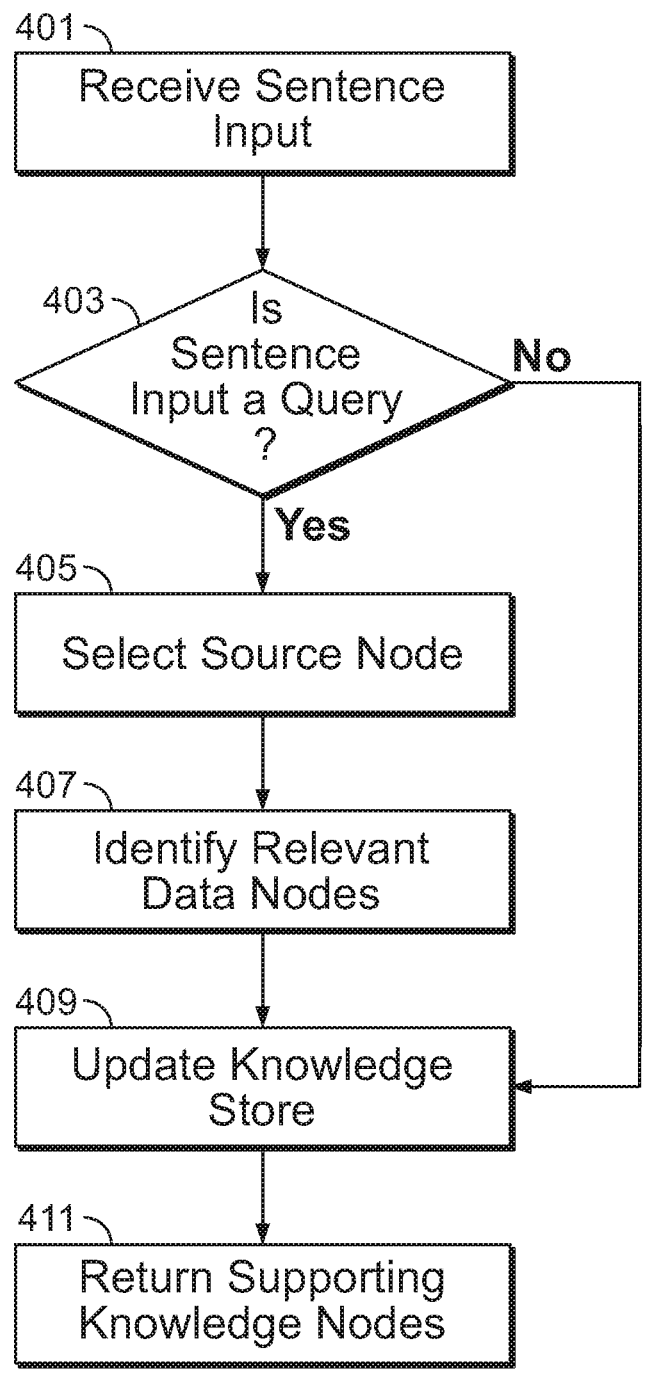
FIG. 4 is a flow diagram illustrating an embodiment of a process for identifying supporting knowledge.

FIG. 4 is a flow diagram illustrating an embodiment of a process for identifying supporting knowledge. In various embodiments, the process of FIG. 4 is performed by an adaptive, interactive, and cognitive reasoner to identify supporting knowledge from a memory graph data structure. For example, an adaptive, interactive, and cognitive reasoner performs the process of FIG. 4 using a knowledge store to help generate a voice response to a voice input event. In some embodiments, the process of FIG. 4 is performed at 305 of FIG. 3.

At 401, a sentence input is received. In some embodiments, the sentence input is a sentenced processed using a natural language understanding module. In various embodiments, the received sentence input includes component information such as identified parts of speech, lemmas (e.g., subject, predicate, and/or object lemma), coreference relationships, and performative classification, among others.

At 403, a determination is made whether the sentence input is a query. For example, the input sentence received at 401 is evaluated to determine whether the input is a query such as a question to the autonomous robotic system. In some embodiments, the determination utilizes the performative classification of the input sentence. For example, a sentence input includes a performative classification that identifies the sentence as a type of query performative (e.g., query-if, query-ref, etc.) or as an inform performative. In some embodiments, the performative classification utilizes the Foundation for Intelligent Physical Agents-Agent Communication Language (FIPA-ACL) for performative classification. In response to a sentence input that is a query, processing continues to 405. In response to a sentence that is not a query, such as an informative sentence, processing continues to 409.

At 405, a source node is selected from a knowledge store. In various embodiments, a source node is selected from a knowledge store such as a memory graph data structure based on the identified speaker. For example, a speaker related to the sentence input is identified and the source node corresponding to the speaker is selected. In various embodiments, a knowledge store is partitioned by speakers such that knowledge data can be accessed by speaker identity. For example, for an autonomous robotic system that has interacted with two different users, Alice and Bob, at 405, the source node for Alice is selected in response to a query initiated by Alice and the source node for Bob is selected in response to a query initiated by Bob. In various embodiments, a source node is selected since an autonomous robotic system partitions stored knowledge data by user and/or agent. For example, the knowledge data associated with each user includes user information related to that user's conversation history with the autonomous robotic system. In some embodiments, agents include the autonomous robotic system itself and may include other robotic agents acting autonomously.

In various embodiments, the knowledge store stores a history of conversations that the system has engaged in. In some embodiments, the knowledge store includes information captured by sensors such as location, time, weather, etc. In some embodiments, a declarative memory holds the system's knowledge about the world and itself. In various embodiments, the knowledge store is implemented using a memory graph data structure.

At 407, relevant data nodes are identified. For example, data nodes of a knowledge store, such as a memory graph data structure, are identified and made candidates for retrieval. In various embodiments, the nodes are either (1) filtered and removed because they are not relevant or (2) selected as relevant to the sentence input. In some embodiments, the selected data nodes are ranked to determine a priority.

In some embodiments, the identification of the data nodes includes several filtering and data retention steps. In some embodiments, the nodes of a memory graph data structure are traversed to identify relevant data nodes. Relevant nodes are retained and irrelevant nodes are filtered from consideration. In various embodiments, the identified nodes are collected and utilized as supporting knowledge.

In various embodiments, the knowledge store is implemented using a memory graph data structure. In some embodiments, each user's sentences are saved in the memory graph under a user identifier. In some embodiments, a root node exists for each user identifier. For example, Alice's sentences are saved under a node tree identified by Alice's user identifier and Bob's sentences are saved under a separate node tree identified by Bob's user identifier. In some embodiments, nodes corresponding to word components of sentences may reference one another. For example, two sentences containing the word "Charles" may reference the same word node. In various embodiments, sentences are saved using a triple format. For example, a triple format may identity a subject, object, and predicate.

In some embodiments, data stating negative facts are removed as candidates for supporting knowledge. For example, a recorded sentence "I am not Tom" is removed as a candidate and is not supporting knowledge. As another example, "He is not hungry" is removed as a candidate and is not supporting knowledge because it states a negative fact. In some embodiments, negatives are preserved for later use. For example, in some embodiments, the negative fact is converted into a positive fact. The positive fact is then utilized as a candidate for matching.

In some embodiments, certain special cases are identified and the associated knowledge node is retained as a candidate for supporting knowledge. In some embodiments, these nodes contain data that cannot be initially dismissed as not supporting knowledge and that is not an immediate match (e.g., a subject-verb-object and/or part of speech match). By preemptively retaining these nodes, their relationship to the sentence input can be determined after additional filtering is performed. For example, in some embodiments, informative statements and/or fact statements are preemptively retained.

In some embodiments, data that is negated by a negative fact is removed from consideration as relevant knowledge data. For example, a user makes the statement "My hobby is programming" followed by the statement "My hobby is not programming." The later negative fact statement negates the first statement and the first statement is removed. In various embodiments, in response to a more recent statement that negates an initial statement, the initial statement is removed as possible relevant knowledge.

In some embodiments, subject-verb-object (SVO) matching is performed to identify relevant supporting knowledge nodes. For example, subjects, verbs, and objects of sentences that match the sentence input are identified and retained as candidate supporting knowledge nodes. Conversely, subjects, verbs, and objects of sentences that do not match the sentence input are discarded from consideration as supporting knowledge nodes. For example, the input sentence "I like fruit" contains the SVO triple "I, like, fruit" and an exemplary sentence "I like skiing" stored in a node of an exemplary knowledge store contains the SVO triple "I, like, skiing." In the example, the subjects and verbs match since both use the subject "I" and the verb "like." However, the candidate node is discarded as supporting knowledge because the objects do not match (i.e., "fruit" and "skiing" are different objects). In various embodiments, Subject-predicate-object (SPO) matching is performed on the lemmas of the words. In some embodiments, parts of speech (POS) matching is utilized. For example, the same parts of speech are analyzed to determine whether a match exists.

In some embodiments, after two sentences are compared, for example, using subject-verb-object (SVO) matching, any non-matching pairs are analyzed for co-reference relationships. Co-reference analysis is performed on the non-matching pair(s) to determine whether they have a particular semantic relationship. For example, in the event that the subjects of two sentences do not initially match, the subject components are candidates for co-reference analysis. In various embodiments, a lexical database, including a remote database, is used to determine whether a co-reference relationship exists. For example, in some scenarios, a synonym relationship exists between two words. As another example, the sentence input word is a hypernym of a word referenced by a knowledge node. In some embodiments, the lexical database is WordNet.

In some embodiments, the sentence input is analyzed and matches are made using synonym relationships. For example, using a lexical database such as WordNet, words that are synonyms, such as "right" and "correct," are matched. As another example, the words "nice" and "good" are matched. By identifying synonyms, synonyms are matched using the techniques described herein such as subject-verb-object (SVO) and parts of speech (POS) matching to select candidate relevant knowledge nodes.

In various embodiments, the sentence input is analyzed and matches are made using a hypernym relation. For example, using a lexical database such as WordNet, a word with a broader meaning (e.g., fruit) is related to one or more words that are more specific (e.g., apples, oranges, and pineapples, etc.). In some embodiments, a hypernym is a word that is a generic term that is used to designate a whole class of specific instances. In various embodiments, hypernyms are identified based on a lexical database and used to identify relevant supporting knowledge nodes. For example, a node with the object "fruit" matches a stored knowledge node with the object "apples" (as long as the subject and verb parts also match) because the input sentence object "fruit" is a hypernym of "apples." As another example, the word "animal" is a hypernym of the word "mammal" and may be used to identify matches for a particular subject or object.

In some embodiments, hypernyms are utilized to derive hypernym relationships. In some embodiments, a derived hypernym relationship is identified by determining whether a word has the same or equivalent meaning of the hypernym of a word. For example, an analysis for a derived hypernym determines that the hypernym of the word "red" has the same meaning as the word "color." Nodes using the word "red" are candidates for matching "color." In an example scenario, a knowledge store includes a node corresponding to the sentence "My hair is red." The sentence input "What color is your hair?" returns supporting knowledge that the correct answer for the color is "red." The analysis for a derived hypernym determines that the hypernym of the word "red" has the same meaning as the word "color."

In some embodiments, the lexical database utilized is the WordNet or similar database. For example, synonyms relationships may be based on synset relationships defined using WordNet. In some embodiments, a synonym matches only if the synonym is within a configured synset range. Words outside the synset range are not considered matches. For example, a synonym relationship is determined in the event a word is within a configured synset range (e.g., a range of 5). Words outside the range are considered obscure forms and are not match material for determining supporting knowledge. In various embodiments, synonyms match only if the parts of speech match as well. In various embodiments, an additional check may be made to require that a fact adjective is derivationally contained in the query noun.

In various embodiments, relevant knowledge nodes can be constructed from information retrieved from a remote lexical database. For example, the answers to questions based on what, where, who, and is queries utilize information from a lexical database such as WordNet. In various embodiments, a query modifier (e.g., what, where, who, and is) is identified and a query structure is compared to determine the query type. For example, in some embodiments, a question initiated with a "What" query modifier is checked to determine that it is composed of "what," "is," and an object (e.g., "What is a lion?"). The definition from a lexical database is retrieved and used as supporting knowledge. In some embodiments, a question initiated with a "Where" query modifier is checked to determine that it is composed of "where," "is," and an object (e.g., "Where is Seoul?"). The part holonym (e.g., South Korea) of the object is determined from a lexical database and used as supporting knowledge. In some embodiments, a question initiated with a "Who" query modifier is checked to determine that it is composed of "who," "is," and an object (e.g., "Who is Obama?"). The definition of the object is determined from a lexical database and analyzed to determine if the definition is about a person. In the event the response is about a person, the definition is used as supporting knowledge. In some embodiments, a question initiated with an "Is" query modifier is checked to determine that it is composed of "is," a subject, and an object (e.g., "Is a lion an animal?"). A lexical database is used to determine whether the object is a hypernym of the subject and the result is used as supporting knowledge.

In some embodiments, the candidate relevant supporting knowledge nodes are prioritized based on a rank. For example, a first sentence contains the words "I like red" and a second sentence contains the words "I like blue." Both sentences are relevant to the query sentence "What is my favorite color?" and their respective knowledge nodes are relevant supporting knowledge. In various embodiments, the relevant nodes are ranked. In some embodiments, the nodes are ranked based on date. For example, in one configuration, earlier nodes are ranked lower than later nodes. In another configuration, earlier nodes are ranked higher than later nodes. As an example, by configuring later nodes to have higher priority, a response to the query sentence "What is my favorite color?" prioritizes the knowledge node with the color blue since that node has a higher priority due to its more recent date. In various embodiments, only the most recent data node (i.e. the most fresh) is retained as a candidate relevant knowledge. In various embodiments, the priority assigned to the nodes may be configurable and/or trained based on expected results.

In various embodiments, additional filtering and/or selecting technique may be implemented to improve the accuracy and/or performance of retrieving supporting knowledge nodes. In some embodiments, one or more of the above techniques may be implemented together in the sequence described or in another appropriate sequence.

At 409, the knowledge store is updated. In various embodiments, the knowledge store is updated based on the retrieved relevant data. For example, one or more additional nodes are added and/or linked based on the input sentence. In some embodiments, the input sentence is inserted into the knowledge store. For example, nodes corresponding to the input sentence are inserted into a memory graph. In various embodiments, related nodes are associated and/or shared. For example, a node corresponding to a person's name from an input sentence is linked to a node associated with a second sentence that utilizes a pronoun (e.g., "I") in place of the same person's name.

At 411, supporting knowledge nodes are returned as output. In various embodiments, the supporting knowledge nodes are references to nodes in a memory graph and include relevance ranking information. In some embodiments, a reference to the nodes of a memory graph is returned. For example, a reference to the data nodes corresponding to supporting knowledge are returned and no copies of the nodes are made. In some embodiments, the relevant knowledge nodes are selected by a unique identifier of the data node. In various embodiments, data nodes of a knowledge store, such as a memory graph, are accessible using the unique identifiers. For example, an artificial intelligence planner can access the relevant knowledge nodes using the set of unique identifiers for the relevant nodes. In some embodiments, a relevant sentence is identified using a node number of the node containing the relevant sentence.

Figure 5A:
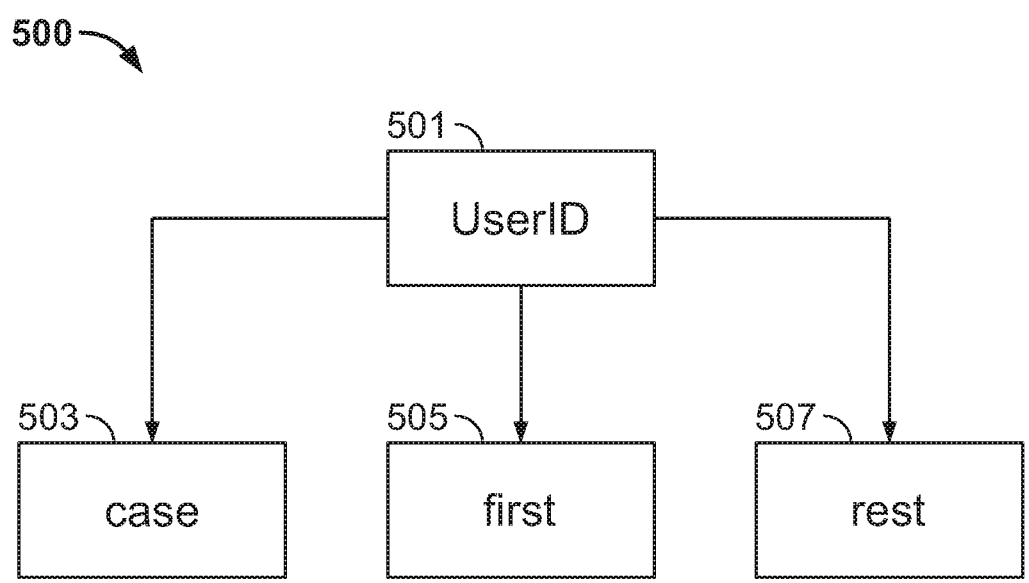
FIG. 5A is a diagram illustrating an example of a memory graph data structure.

FIG. 5A is a diagram illustrating an example of a memory graph data structure. In the example shown, memory graph data structure 500 is an empty memory graph. For example, memory graph data structure 500 represents an initialized memory graph of an autonomous robotic system. In some embodiments, a memory graph data structure includes UserID node 501, case node 503, first node 505, and rest node 507. In various embodiments, UserID node 501 is the root node for a particular user. In some embodiments, UserID node 501 includes a unique user identifier for the referenced user and supporting knowledge associated with the user is stored under UserID node 501. In the example shown, case node 503 is a node associated with cases for previously saved problems and their respective solutions along with additional context. In the example show, there are no solved cases saved in memory graph data structure 500. First node 505 and rest node 507 are nodes for storing new input sentences when they are received. In some embodiments, data associated with first node 505 corresponds to a single input sentence.

In some embodiments, a rest node such as rest node 507 is used to reference additional nodes. For example, a first sentence is recorded under a free first node such as first node 505 and subsequent sentences are recorded under its corresponding rest node such as rest node 507. In various embodiments when no free first node is available, a new sentence is inserted into a memory graph data structure by creating a new first node and a new rest node under an empty rest node. The new sentence is then inserted using the newly created first node. Subsequent new sentences utilize a similar process using the newly created rest node.

In some embodiments, a different root node for each user that interfaces with the autonomous robotic system exists in the memory graph structure. In some embodiments, the autonomous robotic system has its own root node for storing supporting knowledge including output responses by the system. In various embodiments, the root nodes are identified using a unique user identifier. In some embodiments, the sub-trees of each root node can share and/or reference the same nodes. For example, different sub-trees can reference the same supporting knowledge node.

Figure 5B:
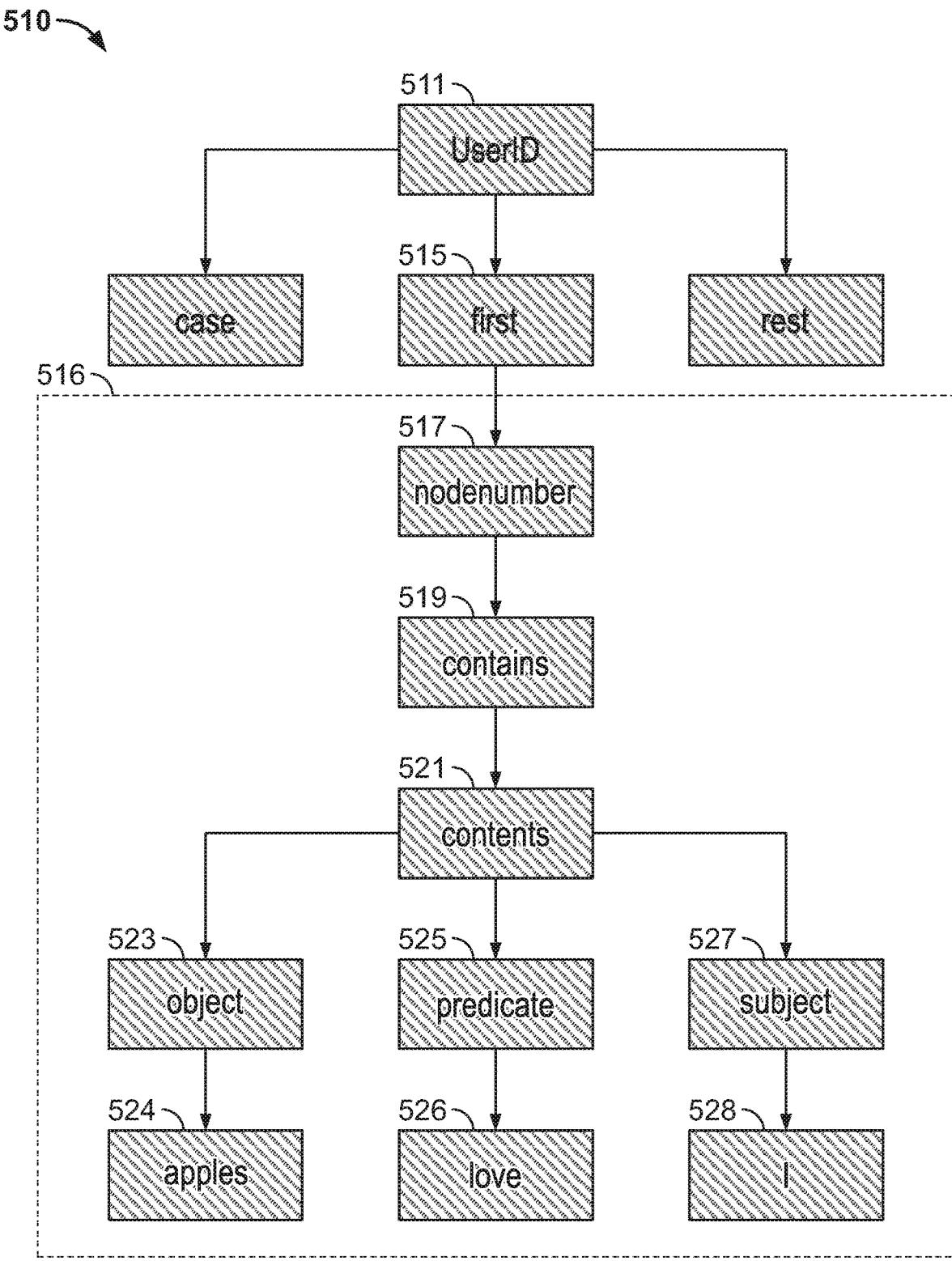
FIG. 5B is a diagram illustrating an example of a memory graph data structure.

FIG. 5B is a diagram illustrating an example of a memory graph data structure. In the example shown, memory graph data structure 510 is memory graph data structure 500 of FIG. 5A after the sentence "I love apples" is spoken by a user and processed by a reasoner. In the example, the input sentence is an informative sentence and not a query. Memory graph data structure 510 includes at least the nodes UserID node 511, first node 515, node-number node 517, contains node 519, contents nodes 521, object node 523, "apples" node 524, predicate node 525, "love" node 526, subject node 527, and "I" node 528. The sentence "I love apples" is converted to a triple using the processes described herein and represented by input sentence tree 516. Input sentence tree 516 includes the nodes shown within the dotted boundary lines. Input sentence tree 516 includes the nodes node-number node 517, contains node 519, contents nodes 521, object node 523, "apples" node 524, predicate node 525, "love" node 526, subject node 527, and "I" node 528. In some embodiments, UserID node 511 is UserID Node 501 of FIG. 5A.

In various embodiments, a new input sentence tree is inserted into a memory graph data structure at a first node. In the example shown, input sentence tree 516 is inserted into memory graph data structure 510 using first node 515. In various embodiments, a new sentence tree is inserted into a memory graph data structure at the first available first node. In some embodiments, a first node is nested under a rest node. In some embodiments, a first node is created under a free rest node.

In the example shown, node-number node 517 includes a node number that uniquely identifies the input sentence represented by input sentence tree 516. Contains node 519 is a container node that encapsulates the contents associated with input sentence tree 516. Contents node 521 is a contents nodes that may be used to reference the contents associated with the sentence. For example, a reference (such as a pointer) to contents node 521 may be used to retrieve the contents of the sentence. Under contents node 521, subject, object, and predicate nodes point to classified components of the input sentence. Contents node 521 references object node 523, predicate node 525, and subject node 527. Object node 523 references the object of the sentence, the word "apples," by referencing "apples" node 524. Predicate node 525 references the predicate of the sentence, the word "love," by referencing "love" node 526. Subject node 527 references the subject of the sentence, the word "I," by referencing "I" node 528. In various embodiments, each sentence tree inserted into a memory graph data structure utilize a structure similar to the one described above with respect to input sentence tree 516.

Figure 5C:
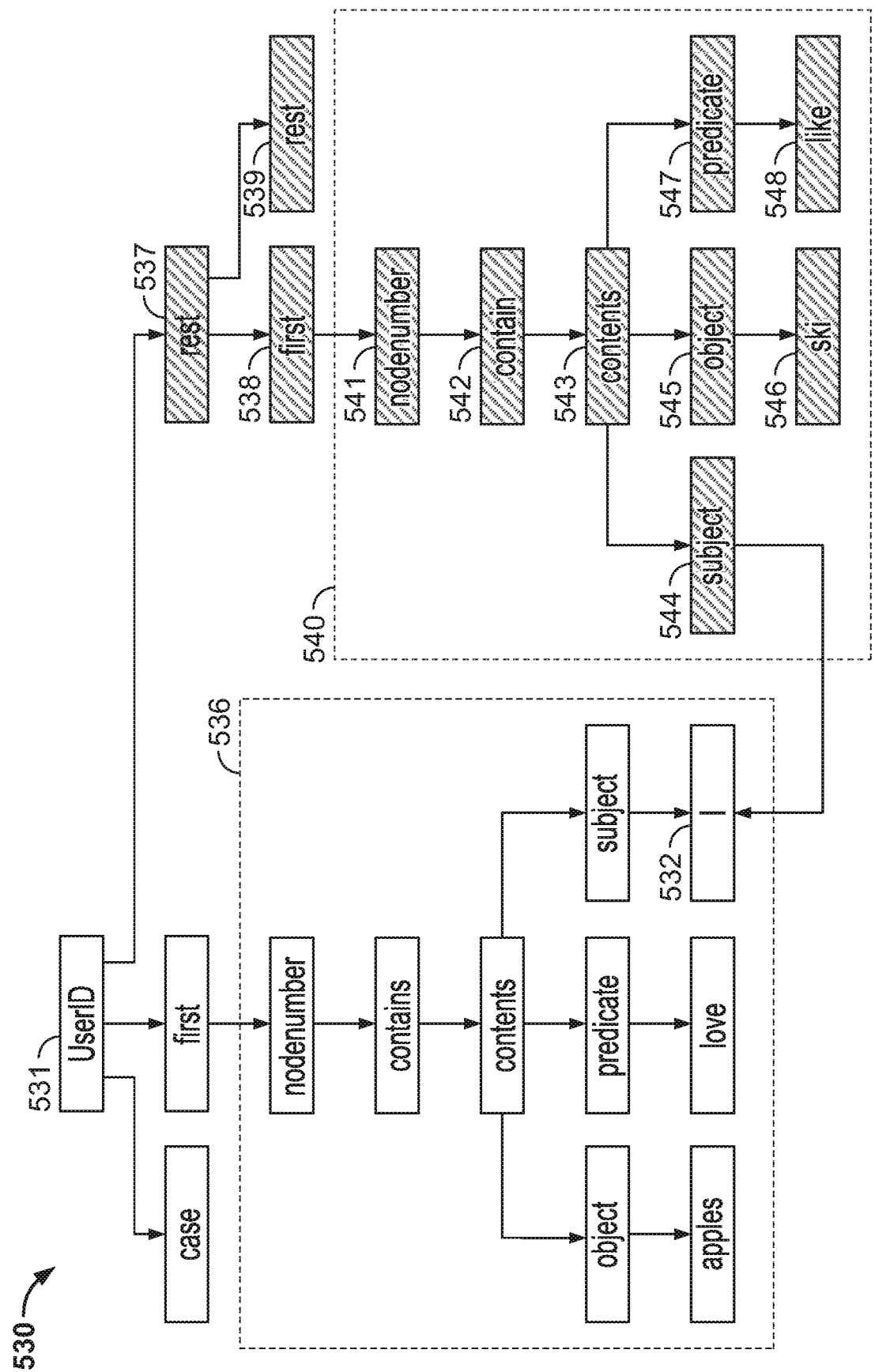
FIG. 5C is a diagram illustrating an example of a memory graph data structure.

FIG. 5C is a diagram illustrating an example of a memory graph data structure. In the example shown, memory graph data structure 530 is memory graph data structure 510 of FIG. 5B after the sentence "I like skiing" is spoken by the user and processed by a reasoner. In the example, the input sentence is an informative sentence and not a query. Memory graph data structure 530 includes previously inserted input sentence tree 536 corresponding to the sentence "I love apples" and newly inserted input sentence tree 540 corresponding to the sentence "I like skiing." Input sentence tree 540 is identified by a unique node number that is associated with node-number node 541. First node 538 and rest node 539 are new nodes appended to rest node 537 as a location for inserting additional sentences. Input sentence tree 540 is inserted at first node 538 and a future input sentence can be inserted at rest node 539. In various embodiments, at each rest node a new first node and rest node are added for saving new input sentences.

In the example shown, inserted sentence tree 540 includes node-number node 541, contains node 542, contents nodes 543, subject node 544, "I" node 532, object node 545, "ski" node 546, predicate node 547, and "like" node 548. The sentence "I like skiing" is converted to a triple using the processes described herein and represented by input sentence tree 540. Subject node 544 references the subject of the sentence, the word "I," by referencing "I" node 532. Object node 545 references the object of the sentence, the word "skiing," by referencing "ski" node 546. In various embodiments, the lemma of a word is used. For example, "ski" node 546 contains the lemma of the word "skiing." Predicate node 547 references the predicate of the sentence, the word "like," by referencing "like" node 548.

In the example shown, input sentence trees 536 and 540 both contain a reference to "I" node 532. Input sentence tree 536 includes the nodes shown within its dotted boundary lines. Input sentence tree 540 includes the nodes shown within its dotted boundary lines and in addition includes "I" node 532. In some embodiments, the "I" from input sentence tree 536 (for the sentence "I love apples") and the "I" from input sentence tree 540 (for the sentence "I like skiing") are matches and a reference to the same node is used instead of duplicating nodes. In some embodiments, this matching is performed by a reasoning module.

In some embodiments, UserID node 531 is 501 of FIG. 5A and 511 of FIG. 5B. In some embodiments, first input sentence tree 536 is input sentence tree 516 of FIG. 5B. In some embodiments, "I" node 532 is "I" node 528 of FIG. 5B.

Figure 5D:
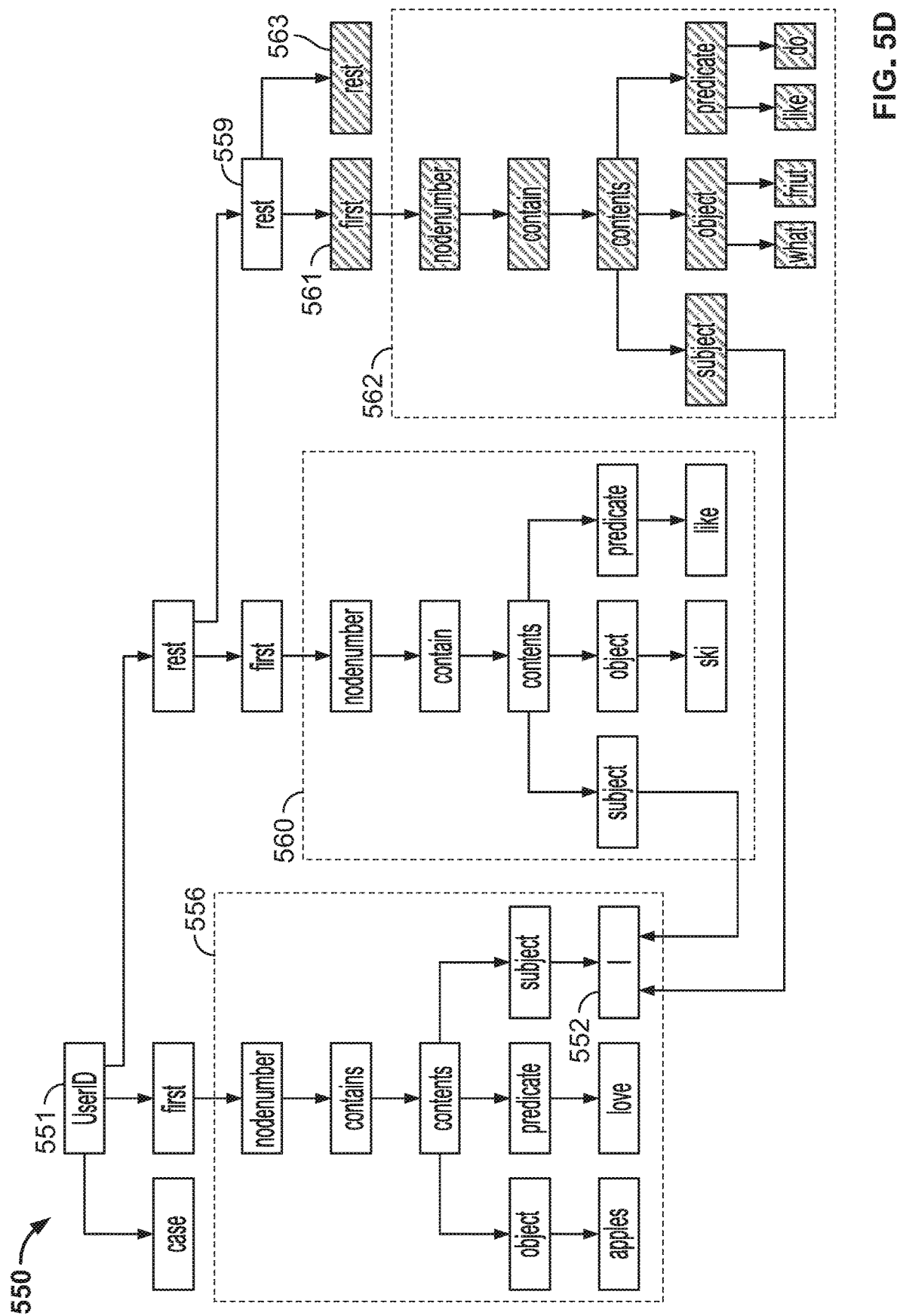
FIG. 5D is a diagram illustrating an example of a memory graph data structure.

FIG. 5D is a diagram illustrating an example of a memory graph data structure. In the example shown, memory graph data structure 550 is memory graph data structure 530 of FIG. 5C after the sentence "What fruit do I like?" is asked as a query by the user and processed by a reasoner. In some embodiments, the input sentence is associated with a query-ref performative. Memory graph data structure 550 includes previously inserted input sentence tree 556 corresponding to the sentence "I love apples," previously inserted input sentence tree 560 corresponding to the sentence "I like skiing," and newly inserted input sentence tree 562 corresponding to the query sentence "What fruit do I like?." First node 561 and rest node 563 are new nodes added to rest node 559 as a location for saving additional sentences. Input sentence tree 562 is inserted at first node 561 and a future input sentence can be inserted under newly created rest node 563. In various embodiments, at each rest node a new first node and rest node are added for saving new input sentences.

Using the processes described herein, the query sentence "What fruit do I like?" is converted to a triple and represented by the input sentence tree 562. Input sentence trees 556, 560, and 562 each include the nodes shown within their respective dotted boundary lines and in addition each includes "I" node 552. In some embodiments, UserID node 551 is 501 of FIG. 5A, 511 of FIG. 5B, and 531 of FIG. 5C. In some embodiments, input sentence tree 556 is input sentence tree 516 of FIG. 5B and 536 of FIG. 5C. In some embodiments, input sentence tree 560 is input sentence tree 540 of FIG. 5C. In some embodiments, "I" node 552 is "I" node 528 of FIG. 5B and 532 of FIG. 5C.

Figure 5E:
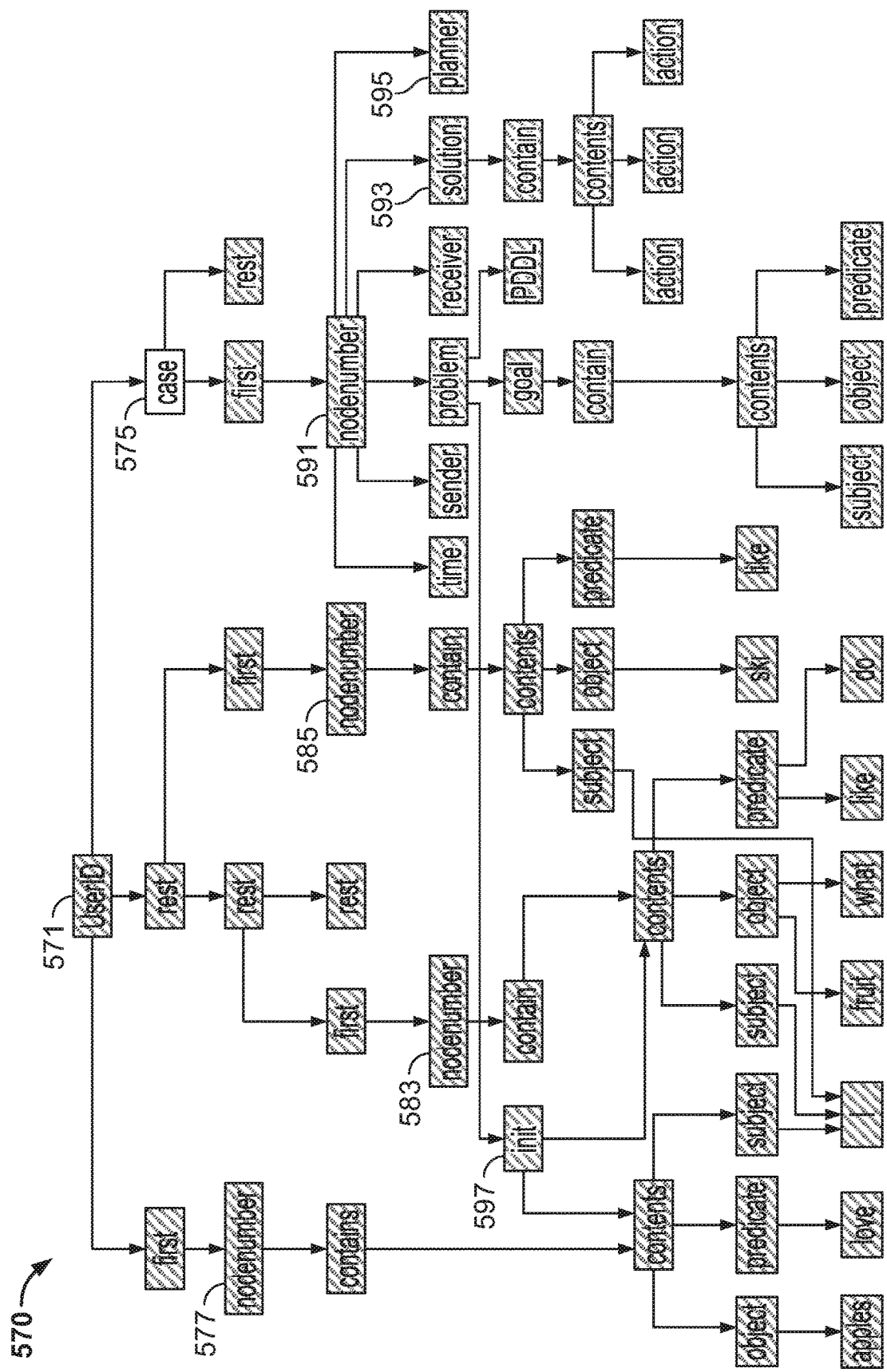
FIG. 5E is a diagram illustrating an example of a memory graph data structure.

FIG. 5E is a diagram illustrating an example of a memory graph data structure. In the example shown, memory graph data structure 570 is memory graph data structure 550 of FIG. 5D after the solution to the query sentence "What fruit do I like?" is solved and stored as a case in memory graph data structure 570. Memory graph data structure 570 includes a previously inserted input sentence tree corresponding to the sentence "I love apples" with root node-number node 577, a previously inserted input sentence tree corresponding to the sentence "I like skiing" with root node-number node 583, a previously inserted query input sentence tree corresponding to the query sentence "What fruit do I like?" with root node-number node 585, and case node 591 that corresponds to the solution of the query input sentence.

In various embodiments, user problems that are solved are saved in a memory graph data structure as cases. In various embodiments, the cases are reused when similar and/or identical problems are encountered. In the example, node-number node 591 is inserted into memory graph data structure 570 at case node 575. Node-number node 591 references a particular case that corresponds to a problem, solution, and context. In various embodiments, cases are inserted using a node-number node under the case node of the relevant user. Node-number node 591 includes multiple nodes. The nodes include at least solution node 593, planner node 595, and init node 597, among others. In some embodiments, solution node 593 is a solution sub-tree that includes a sequence of actions for solving the artificial intelligence (AI) planning problem associated with the case. In some embodiments, planner node 595 is associated with the planner used to solve the AI planning problem. In the example shown, init node 597 is linked to a parent node (not numbered) labeled as "problem" that represents the AI planning problem. Init node 597 contains links to supporting knowledge nodes that include the contents corresponding to the sentences "I love apples" and "What fruit do I like?" Init node 597 does not contain a link to the sentence "I like skiing" because it is not relevant to the problem. The lemma object "ski" and "fruit" do not match and are not determined to be related.

In some embodiments, a case includes at least the problem and the sequence of actions that was used to solve the problem. In some embodiments, the case includes time, sender, problem, receiver, solution, and planner information. In some embodiments, the problem includes a goal expressed using a subject, object, and predicate. In some embodiments, the problem includes supporting knowledge nodes. In some embodiments, the problem is described using an artificial intelligence (AI) planning language. In some embodiments, the solution includes a sequence of actions to solve the AI planning problem. In some embodiments, a case based reasoning (CBR) module is utilized to identify the appropriate case saved in memory graph data structure 570. In some embodiments, the identification of the case is performed at 107 of FIG. 1.

In various embodiments, more or fewer nodes may be used to represent the described data structures of FIGS.

5A-E. For example, in some embodiments (not shown), a contents node may contain a field that stores an object reference that points to a node that stores the object instead of using an intermediary object node.

Figure 6:
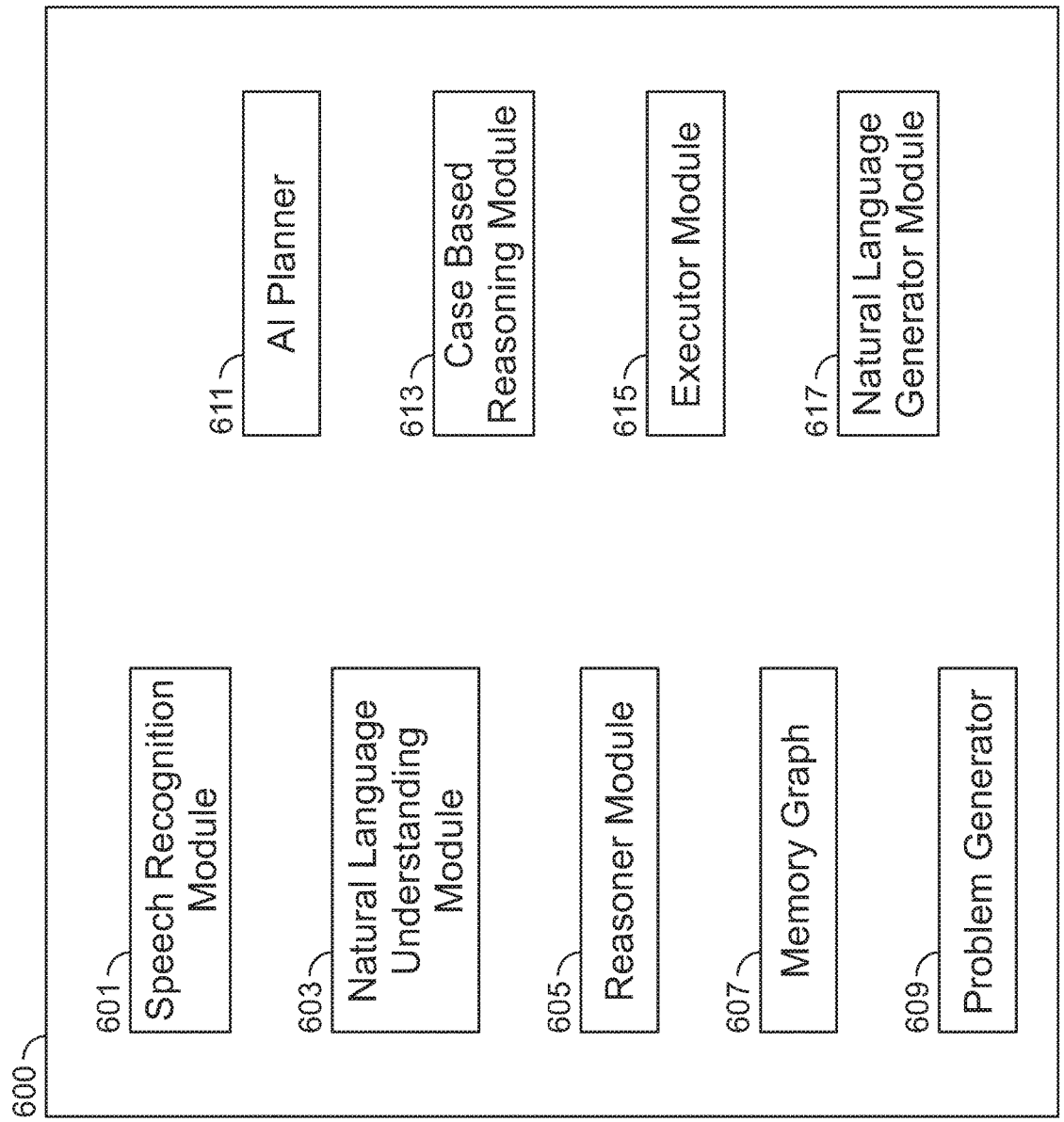
FIG. 6 is a functional block diagram illustrating an embodiment of an autonomous robotic system for responding to voice input using an adaptive, interactive, and cognitive reasoner.

FIG. 6 is a functional block diagram illustrating an embodiment of an autonomous robotic system for responding to voice input using an adaptive, interactive, and cognitive reasoner. In the example shown, autonomous robotic system 600 includes speech recognition (SR) module 601, natural language understanding (NLG) module 603, reasoner module 605, memory graph 607, problem generator 609, artificial intelligence (AI) planner 611, case based reasoning (CBR) module 613, executor module 615, and natural language generator (NLG) module 617. In various embodiments, the functional components shown may be used to implement the processes of FIGS. 1-4. Additional functionality, such as connectivity between functional components is not shown. In some embodiments, the functional components may be implemented using one or more programmed computer systems. For example, the processes of FIGS. 1-4 may be performed using one or more computer processors of one or more programming computer systems. In some embodiments, various modules and/or subsystems may be implemented on different programming computer systems. For example, modules and/or subsystems associated with reasoning module 605 and memory graph 607 may be implemented on a server and/or using a server-side implementation and speech recognition module 601 may be implemented on the local autonomous robotic system using a client-side implementation. In some embodiments, one or more subsystems and/or modules may exist on both the client and server side implementations.

In some embodiments, speech recognition (SR) module 601 is used at 101 and/or 103 of FIG. 1 and/or 201 of FIG. 2. In some embodiments, natural language understanding (NLU) module 603 is used at 103 of FIG. 1 and/or 203 of FIG. 2. In some embodiments, reasoner module 605 is used at 105 of FIG. 1 and/or 205 of FIG. 2. In some embodiments, reasoner module 605 is used to perform the processes of FIGS. 3 and 4. In some embodiments, memory graph 607 is utilized by the processes of FIGS. 1-4 including at 105 of FIG. 1; 205 of FIG. 2; 305 and/or 307 of FIG. 3; and/or 405, 407, 409 and/or 411 of FIG. 4. In some embodiments, FIGS. 5A-E are examples illustrating the contents of different states of memory graph 607. In some embodiments, problem generator 609 is used at 107 of FIG. 1 and/or 207 of FIG. 2. In some embodiments, artificial intelligence (AI) planner 611 and/or case based reasoning (CBR) module 613 are used at 107 of FIG. 1 and/or 209 of FIG. 2. In some embodiments, executor module 615 is used at 109 of FIG. 1 and/or 211 of FIG. 2. In some embodiments, natural language generator (NLG) module 617 is used at 109 of FIG. 1 and/or 213 of FIG. 2.

The functional block diagram of an autonomous robotic system shown in FIG. 6 is but an example of a system suitable for use with the various embodiments disclosed herein. Other autonomous robotic systems suitable for such use can include additional or fewer subsystems. For example, motion detection, vision input processing modules, inter-agent communication modules, etc. are not displayed in FIG. 6 but may be included in the disclosed autonomous robotic systems. As another example, motor control subsystems are not shown in FIG. 6 but may be utilized by the disclosed invention. Other systems having different functional configurations of subsystems can also be utilized.

Figure 7:
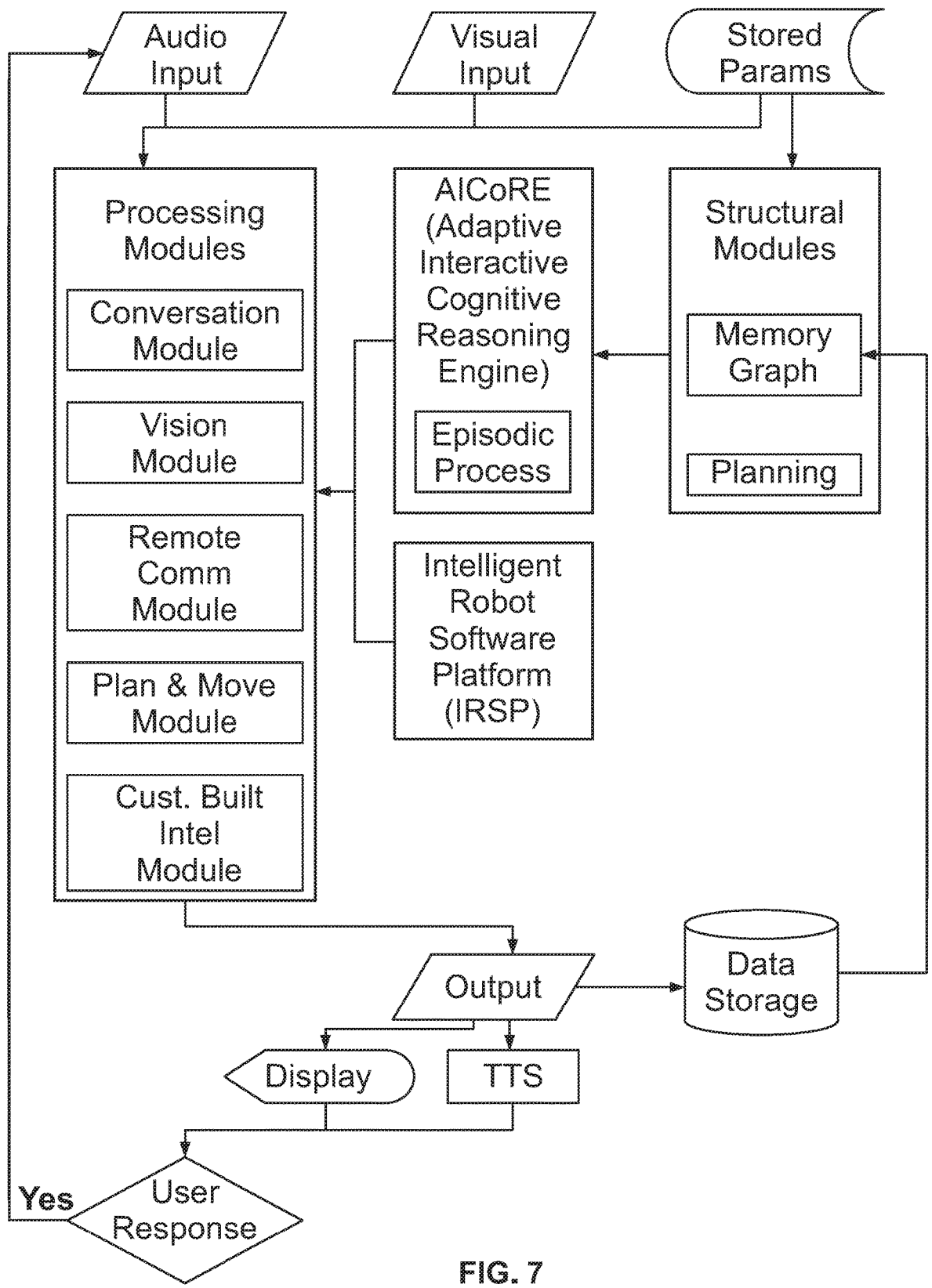
FIG. 7 is a block diagram of an embodiment of an artificial intelligence (AI) robotic system.

FIG. 7 is a block diagram of an embodiment of an artificial intelligence (AI) robotic system. FIG. 7 shows an embodiment of processing modules and components included in an artificial intelligence (AI) robotic system. In some embodiments, the AI robotic system of FIG. 7 performs the processes of FIGS. 1-4. In some embodiments, the components of FIG. 7, in particular the conversation module, the Adaptive Interactive Cognitive Reasoning Engine (AICoRE), and structural modules (memory graph and planning) correspond to functional components of FIG. 6.

Building and operating an intelligent smartphone robot based on domain-independent reactive planning with deep convolutional neural networks is disclosed. The artificial intelligence (AI) robot that talks, listens, thinks and reasons to plan and solve tasks. The system brings educational and entertaining experience to the users by creating an atmosphere that promotes learning, socializing, and playing to enhance imagination and creativity of users. In an embodiment, a plurality of Android applications are executed.

In some embodiments, the system allows users to innovate and add capabilities via custom built intelligence.
Modules of the system may include but are not limited to:
Conversation Module
Vision Module
Remote Communication Module
Plan & Move Module
Custom Built Intelligence Module
The benefits include:
Human-like intelligence (vision and conversation):
sees (processes visual data using computer vision technologies)
listens (processes audio data using speech recognition technology for human voice recognition and natural language understanding)
thinks (analyzes the given data in data structures based on artificial intelligence technologies)
responds (visualizes graphical objects on a mobile phone based on computer graphics, generates speech segments, and mechanically operates the artificially-manufactured physical arms and electric motors)
remembers (stores the relevant episodic data in a database) physical objects and user interactions, while imitating the sensory and cognitive processes of human beings.
provides an intelligent social companionship to the users through these artificially designed sensory and cognitive processes
Educational: Through visual and verbal programming, users can build new skills. Intelligent Robot Software Platform (hereinafter iRSP) allows users to be engaged in an advanced level of programming
Fun: identify and follow certain physical objects like ball, and markers. The system can move around predefined paths using plan and move algorithms.
Remote communication: communicate with other mobile device such as a mobile phone, and the mobile device can be utilized to remotely control the system.
Additional benefits include:
Interaction steps with the users, in which the users can be helped to enhance their cognitive skills based on repetitive verbal training.
Follow ball, read marker capabilities
Customizable avatar
Conversational AI
Cognitive Vision
BLE
Collision avoidance system
Computer vision In some embodiments, an artificial intelligence (AI) robot is designed to provide intelligent way of enhancing IQ, an intelligent way of learning English, and a guide to easy robot programming. An exemplary embodiment may include a robot body in a form of a car and a mobile phone as the brain/engine that drives the robot. The communication between the robot body and the AI applications can be performed via a Bluetooth communication. AI Applications are available for Android and iOS systems, developed from highly sophisticated artificial intelligence techniques including natural language processing, machine learning, and computer vision.

AI Applications

The following exemplary artificial intelligence (AI) applications may be utilized to provide additional functionality.

Conversation module: This is an exemplary application that enables the user to communicate with the system in a natural way using the natural human language. This app uses a core technology, called the adaptive interactive cognitive reasoner (AICoRE). This core engine runs on the cloud and the client side of it connects through an API. In various embodiments, this module uses a speech recognition module that allows the user to communicate with the system in natural language.

Memory graph (MG): In some embodiments, a memory graph module is an additional technique to the AICoRE that enables a user to mark and retrieve past events and conversations. For example, conversations in English can be carried out with an intelligent companion using a MG module trained using the beginner level of the Cambridge English Text Book.

Vision apps module: This exemplary app uses a phone camera and processor to implement a number of vision tasks including face detection, face recognition, face tracking, marker/ball detection, and tracking. The view of a face, ball, or marker, while the system is processing functions in one of these vision modes, may be used to trigger an action or movement of the robotic body.

Custom built intelligence module: This exemplary module is also known as a build your own intelligence (BYOI) app. This exemplary app enables users to customize and control robotic actions in an easy way. Visual and verbal programming is also possible through BYOI app. In some embodiments, the BYOI uses an intelligent robot software platform (iRSP). The iRSP can be used to expand the components and functionality of the system.

Plan & Move module: This exemplary module enables the system to navigate a path that is sketched by the user that avoids collisions and obstacles. In some embodiments, this module includes a second mode of Go & Back that can move the robotic system to a destination and back to the origin with a snap taken at the destination.

Remote communication module: This exemplary a module can be used to control the robot body to navigate around.

Hardware and Firmware

In some embodiments, the system includes firmware. Future upgrades may come as updates whenever such are available. Both hardware and firmware are utilized in data communication between the robot body and the smart phone device. Notable components include one or more motors RPM/PWM, accessories (LED and ultrasonic sensor), and general mechanical parts assembly. The included motors allow movements for left, right, backward, and forward direction (e.g., precise movement performed by detecting the encoder data). The motors should operate with minimum noise.

Testing Operation Using Android App

In some embodiments, an app such as an Android app, can be used to independently test the operations of the system. The test is performed over various functions of components including an ultrasonic sensor, encoder board, motor, and LED. The exemplary testing steps for the app can be designed as follows:
 1. Install the BluetoothTest apk file on the smart phone
 2. Turn on the system
 3. Execute "BluetoothTest" app on the smart phone
 4. Follow the rest of the steps instructed in the app
 5. If the connection is successful, a textview can be indicated as "Connected".
 6. The last step is to control the system by touching the buttons to move and switch on/off the LED.
 7. The status of the system can be seen on the top-right marked in red showing
   a. H: Headlight (LED) status whether it is ON or OFF
   b. B: Battery charge status in percentage
   c. D: Ultrasonic Sensor distance to the detected obstacle in cm.

AI Application Test Apps

In some embodiments, the system differentiates, recognizes, and remembers humans. The system processes a user's interaction in order to respond to the human's conversational dialog. One major goal of parents is to help children develop their intellectual capabilities whether they are at home or not. In some embodiments, the system may be utilized as an artificial intelligence companion for children to aid them in spending their time is the most fun and yet productive manner with respect to social and psychological aspects. An AI robot exhibits human-like cognitive intelligence such as understanding and reasoning, planning and problem solving, learning and remembering, and has the ability to take simple actions.

AI apps may be available from a publicly shared software repository, such as Google Play and Apple Store. In some embodiments, the system supports Android OS and iOS. In some embodiments, a Wi-Fi connection is necessary to perform some of its functions. In some embodiments, the system may communicate with the smart device via Bluetooth. Examples of AI apps may include:
  AI 1. Dialog system—Talk to the system. It will understand and respond to you.
  AI 2. Video analytics—Visually recognizes, differentiates, and remembers different people.
  AI 3. Plan and move module—Navigate along the drafted path.
  AI 4. Remote access module—Communicate with the system remotely
  AI 5. Build your own intelligence module—Personalize and customize the system Remote Communication Application In some embodiments, the system is able to connect to a mobile device via a communication service such as the Bluetooth service. In some embodiments, the system can also connect to two mobile devices: one as a controller and the other can be docked on the robot body. The movements of the system can be tested after the connection. For example, the system can move forward, backward, right, and left. The speed can be adjusted by using the buttons on the controls.

Adaptive Interactive Cognitive Reasoning Engine (AICoRE)

In various embodiments, one source of the power of our practical AI agent comes from two central components: a reasoning engine called the AICoRE and a human-like memory called the memory graph (MG). In some embodiments, the adaptive interactive cognitive reasoner (AICoRE) is a cognitive reasoning engine that unifies problem solving and learning. In various embodiments, AICoRe fully automates the reasoning process from end to end. In some embodiments, the AICoRE is incremental holistic human-like reasoner, covering the full spectrum of reasoning from sensing, reasoning, discovering, planning, learning, remembering until responding and performing.

In some embodiments, a central part of the problem solving mechanism is the planner. In various embodiments, the planner is an advanced multi-agent cognitive planner capable of addressing real-world problems among multiple agents.

Unlike most classical planners, which deal with physical actions only, the disclosed cognitive multi-agent planner (CMAP) is capable of dealing with both physical and cognitive (speech) actions. In various embodiments, it may be implemented in a major planning languages called planning domain definition language (PDDL).

In some embodiments, the CMAP is highly practical dealing with real world problems while interacting with multiple agents and humans. In addition, various embodiments also integrate with an incremental case-based reasoner over time. The AICoRE receives and provides data using natural language format with user but changes data structure (triple or PDDL) when processing the data.

Figure 8:
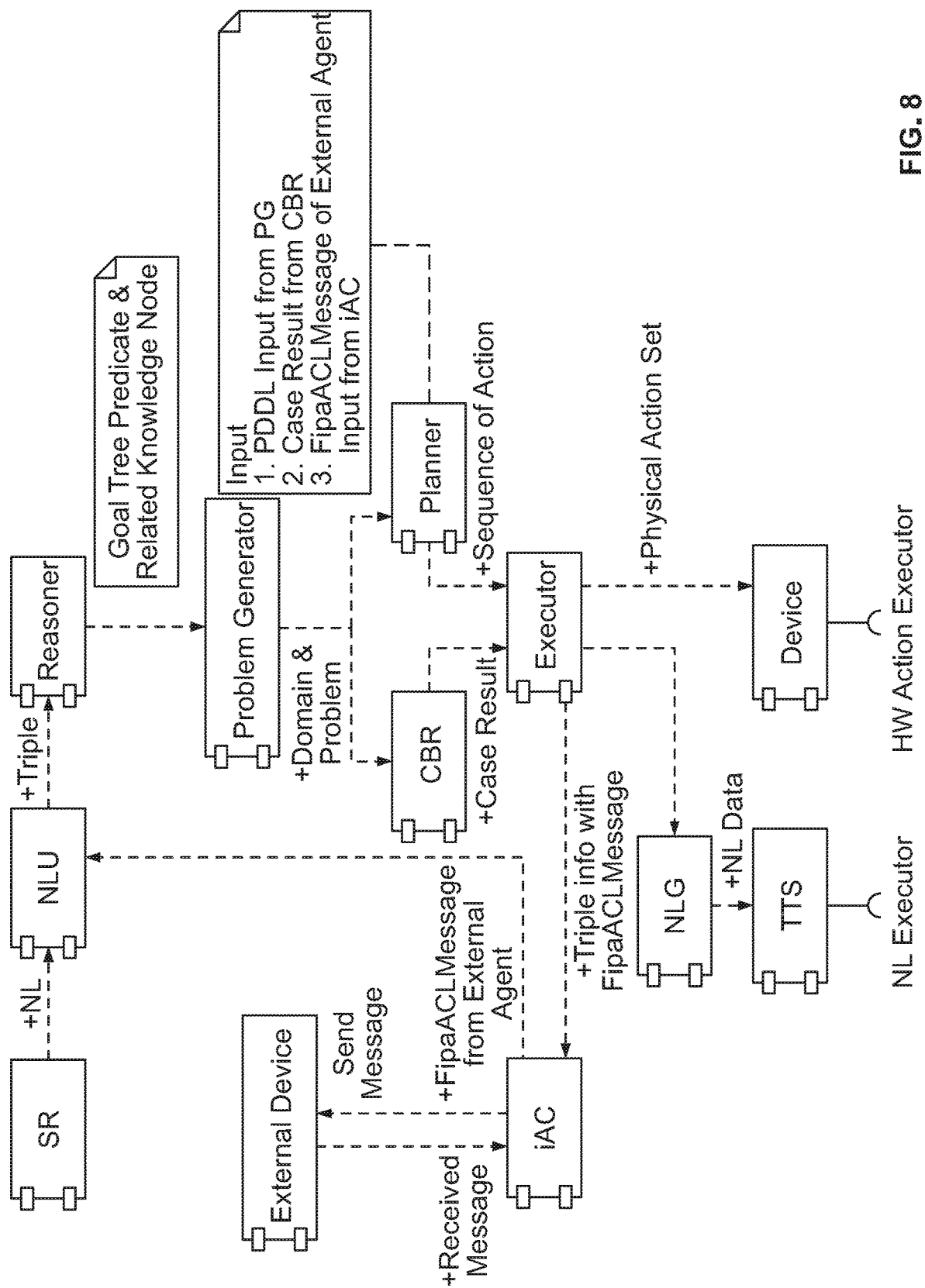
FIG. 8 is a block diagram illustrating an adaptive, interactive, and cognitive reasoner.

FIG. 8 is a block diagram illustrating an adaptive, interactive, and cognitive reasoner. FIG. 8 shows an example of the whole architecture of the AICoRE that includes speech recognition (SR) module or devices. In the example shown in FIG. 8, many modules constitute the AICoRE and are closely related on each other. In various embodiments, the modules and/or devices of FIG. 8 perform the processes of FIGS. 1-4. In some embodiments, one or more modules of FIG. 8 are functional components of FIG. 6.

(1) Natural Language Understating (NLU)

Natural language understating (NLU) is about language processing by computers, and is related to the field of human-computer interaction. NLU enables computers to derive meaning from human or natural language input.

In some embodiments, our natural language understanding module attempts to find triples from a sentence. First, the system uses a natural language processing tool to parse a sentence. Using a parsed sentence, the module extracts triples. The system uses labeled-link, so that it is easier to find an appropriate modifier from an element. The system also uses reification to further annotate about the sentence.

Figure 9:
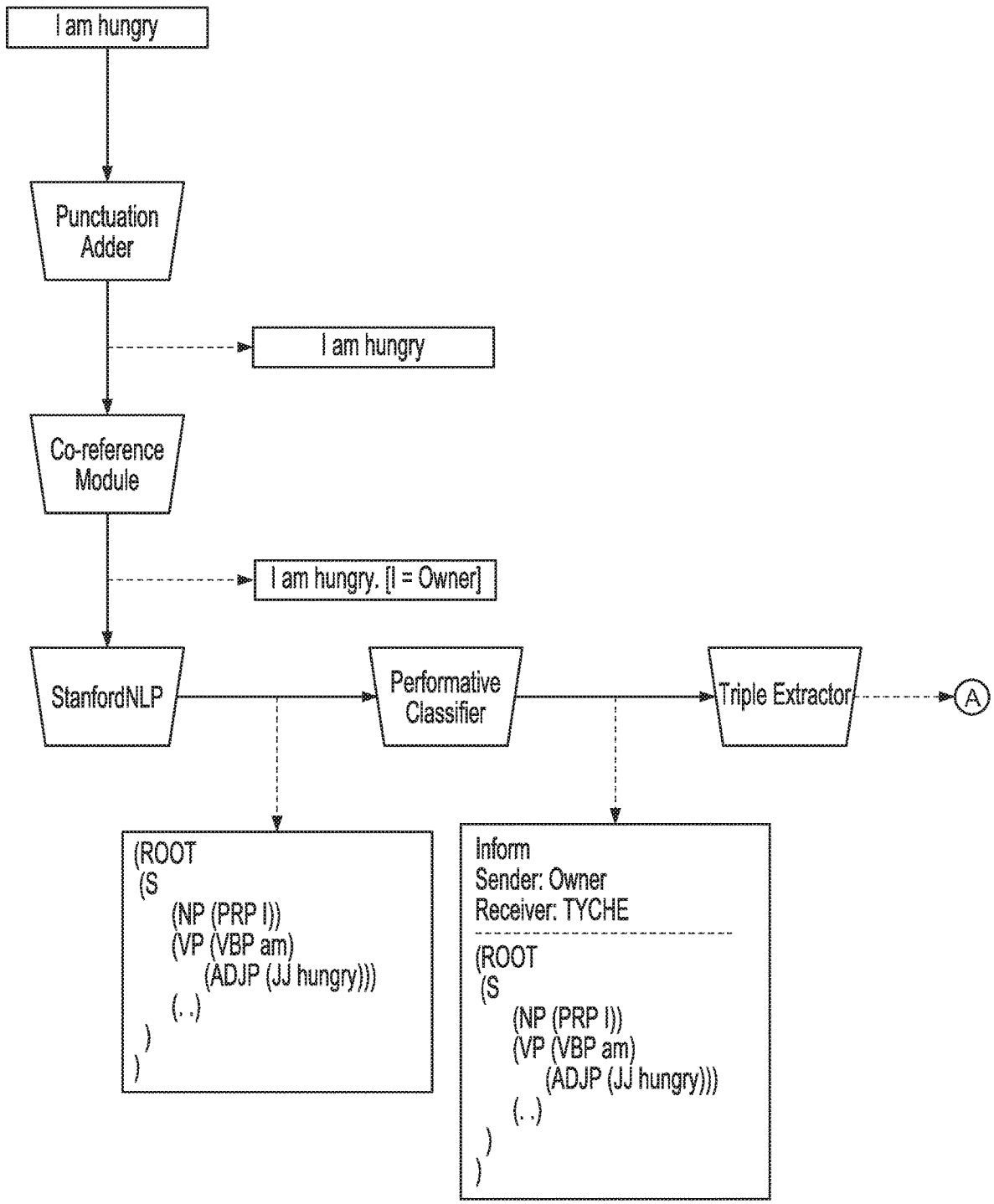
FIG. 9 is a diagram illustrating an embodiment of a process for natural language understanding (NLU).
Figure 9:
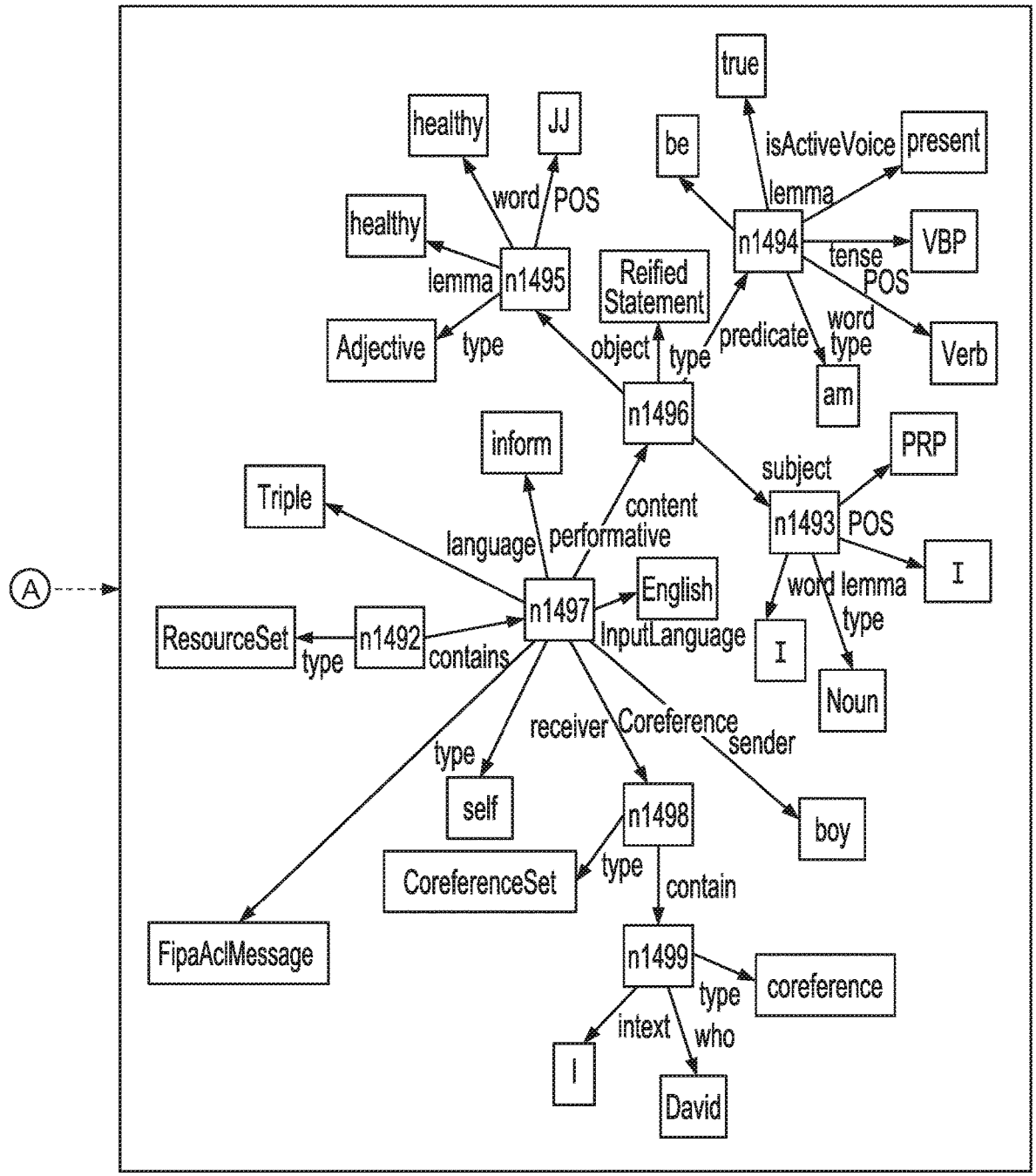

FIG. 9 is a diagram illustrating an embodiment of a process for natural language understanding (NLU). FIG. 9 shows exemplary architecture and processes of natural language understanding (NLU) including input and output of each part. In some embodiments, the process of FIG. 9 is performed at 103 of FIG. 1 and/or 203 of FIG. 2. In some embodiments, natural language understanding module 603 of FIG. 6 performs the process of FIG. 9.

In some embodiment, the first step of the NLU process is to add a missing punctuation. This may be done by analyzing the first few words of the sentence and their POS tags. This first step can improve the result of the syntactic parser. The second step is co-referencing. Co-referencing finds referents of certain words. The next step is to make a parse tree using a natural language processing tool. If there is a wrong parse tree made by the natural language processing tool, the NLU corrects it with a set of pre-defined rules. The next step is to classify the performative of the sentence. The NLU represents the sentence with additional information in a format that is similar to a FIPA ACL message, that is a language for agent communications, and the performative defines a type of the sentence, and it is used to determine what action to take by the planner. The last step is to extract triples using the parse tree. The parse tree itself is consisted of triples, but the triple extractor extracts one reified triple from a sentence and adds more triples to it including the parse tree itself.

The NLU module is different from other parsers, because it adds more information than any other parsers do. Usually parsers are divided into two categories: one is dependency-based parser and the other is constituency-based parser. The NLU module parses based on constituency first, and then adds more information like what is a subject, verb, and object, which is similar to a dependency parser. The NLU module not only finds grammatical structure of the sentence, but also analyzes which performative and language the sentence is. Performative denotes the type of the communicative act, and the system uses performatives defined in FIPA-ACL.

In various embodiments, the coreference module in NLU can handle conversational data that is a list of speakers and sentences. All sentences in conversation can have different speakers and receivers. Thus, the coreference module checks not only objects in sentences, but also relationships between the speakers and the objects. The coreference module can extract direct co-reference information by using its database.

(2) Reasoner

Figure 10:
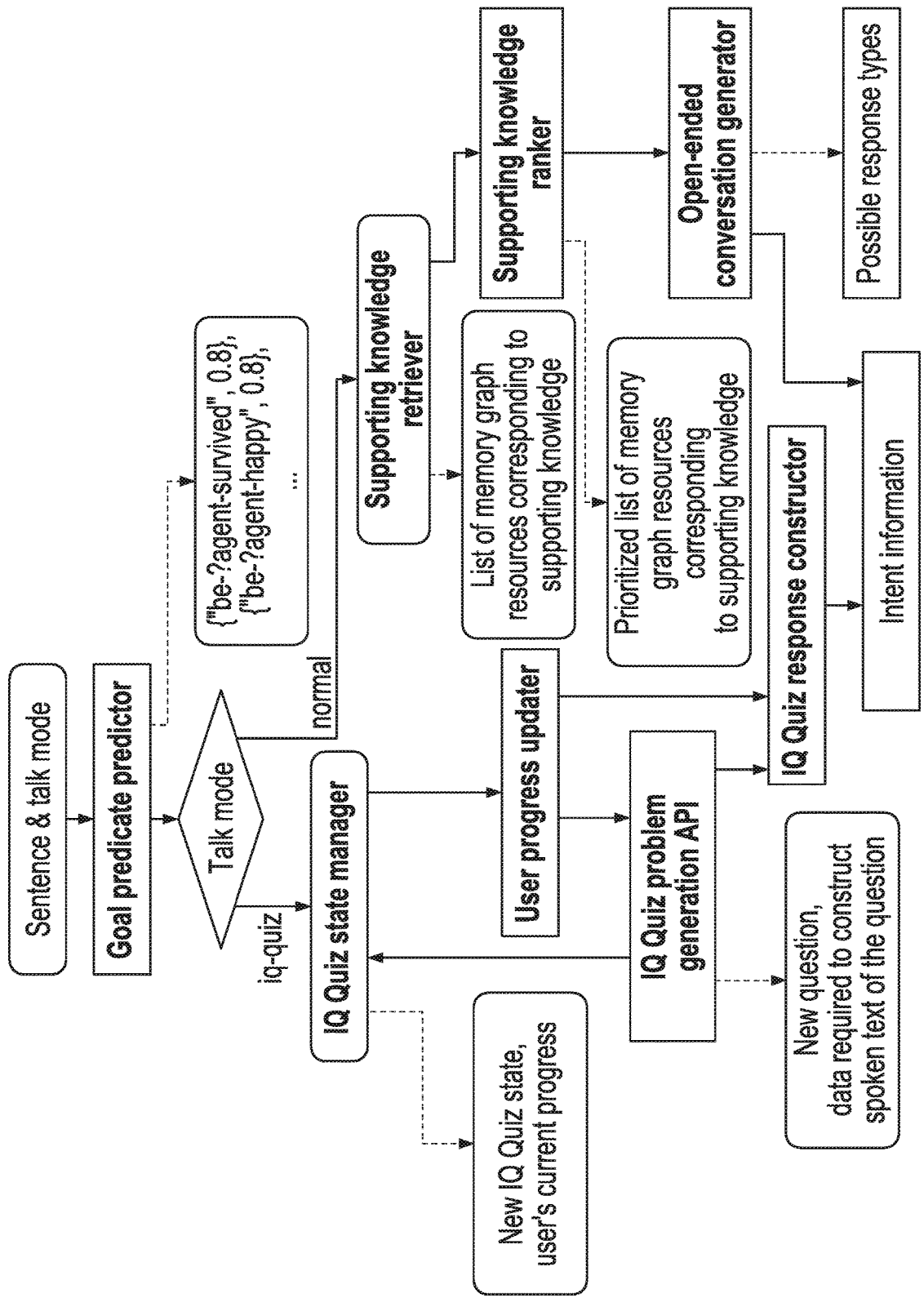
FIG. 10 is a flow diagram illustrating an embodiment of a process for performing reasoning.

FIG. 10 is a flow diagram illustrating an embodiment of a process for performing reasoning. FIG. 10 shows the overall exemplary processes of the reasoner module. Given an input sentence and talk mode, the reasoner module invokes several sub-functions in order to append various information to an 'IntentInformation' class object as its output. In some embodiments, the process of FIG. 10 is performed at 105 of FIG. 1 and/or 205 of FIG. 2. In some embodiments, the process of FIG. 10 describes in further detail the processes of FIGS. 3 and 4. In some embodiments, component of FIG. 6, including reasoner module 605 and memory graph 607, are used to perform the process of FIG. 10.

The first information the reasoner module outputs is goal predicate information, representing which 'goals' of the speaker the module will aim to satisfy. With the basic goal of 'making the speaker happy', the module predicts the needs of the speaker based on the input sentence and outputs a sub-tree of the goal hierarchy that corresponds to the needs. Each goal within the sub-tree is also assigned a score based on how urgent the goal needs to be satisfied.

From here, the reasoner module operates differently depending on the given talk mode, [normal] and [iq-quiz]. The [normal] and [iq-quiz] are predefined in AICoRE as static variable. The talk mode [normal] corresponds to general conversation, while [iq-quiz] stands for the speaker having an IQ quiz session.

If the given talk mode is [normal], the reasoner module will retrieve information that will help the next module (the planner) generate a response fit for general conversation. First, it calls the supporting knowledge retriever sub-function in order to gather a list of memory graph resources corresponding to knowledge (previously uttered speech) that are related to the given input. The reasoner module then ranks these resources in order of importance. Finally, the module calls the open-ended conversation generator sub-module in order to get possible response types (greetings, ask-where, etc.) that will serve as templates for generating more natural responses.

If the given talk mode is [iq-quiz], the reasoner module will retrieve information fit for administering an IQ quiz session. First, the IQ quiz state manager sub-function determines what the speaker's input means depending on the current IQ quiz state. Depending on the output state, the reasoner module can also update the current speaker's IQ quiz progress and generate a new problem for the speaker.

Figure 11:
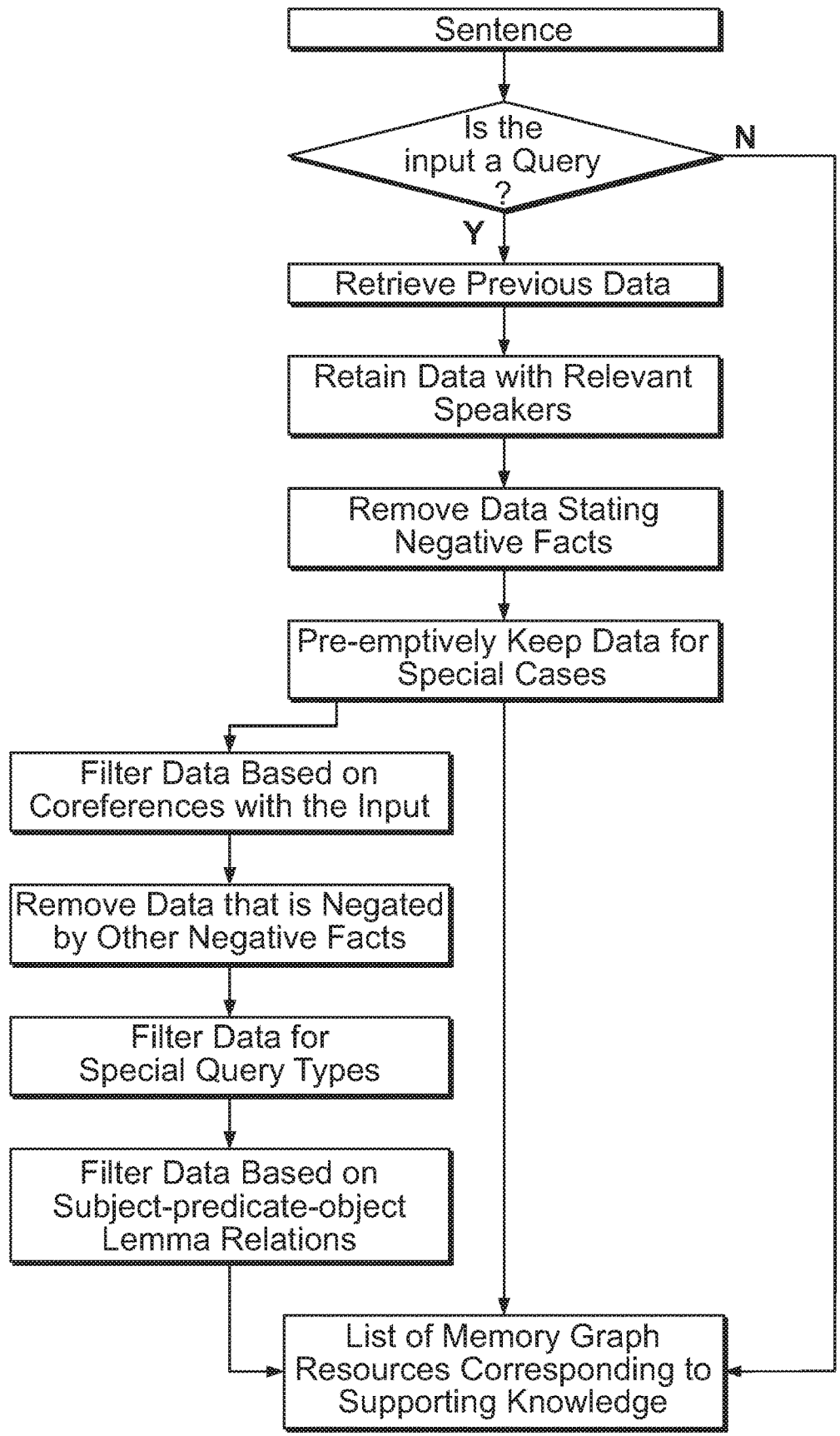
FIG. 11 is a flow diagram illustrating an embodiment of a process for identifying supporting knowledge.

FIG. 11 is a flow diagram illustrating an embodiment of a process for identifying supporting knowledge. FIG. 11 shows the process of the supporting knowledge retriever sub-function of the reasoner module. The sub-function first checks the input's performative in order to determine whether it is a query. If the input is a query, the sub-function determines which previous data (previously spoken data sentences) are related to the given input. This is accomplished via a series of filters that filter the whole set of previous data based on various criteria. In some embodiments, the process of FIG. 11 is performed at 105 of FIG. 1, 205 of FIG. 2, 305 of FIG. 3, and FIG. 4. In some embodiments, components of FIG. 6, including reasoner module 605 and memory graph 607, implement the process of FIG. 11.

(3) Problem Generator and Planner

Planning is a key ability for intelligent systems, increasing their autonomy and flexibility through the construction of sequences of actions to achieve their goals. Planning technique has been applied in a variety of tasks including robotics, process planning, web-based information gathering, autonomous agents and spacecraft mission control.

In various embodiments, the planner of the AICoRE support functions of an artificial intelligence planning language such as Planning Domain Definition Language (PDDL) specification 3.1 and multi-agent PDDL. The 'PDDL domain and problem' are necessary to solve the 'problem'. The AICoRE uses predefined 'PDDL domain', and there are many actions in the 'PDDL domain'. Each action is defined based on FIPA-ACL performative such as inform, query-ref, query-if, and request. In various embodiments, the performative denotes the type of the communicative act. The planner also decides a sequence of actions through comparing communicative act with performative, structure, meaning and intent of recent sentence or data.

In FIG. 8, the problem generator receives data from reasoner, changes the data from triple to PDDL, and generates 'PDDL problem in PDDL format so that the planner solves the problem. Originally, the problem has to include current status and a goal, so that there are user's recent sentence and data related on recent one in 'init' part of 'PDDL problem' to represent the current state.

The AICoRE has the 'GoalTree' that also predefines human's goals from upper step to lower in derived actions of domain to generate goal part in problem. Problem generator can select a goal for the solution in 'GoalTree' and uses the goal when it generates 'PDDL problem.' In addition, the 'PDDL domain and problem' are used by the Case Based Reasoning (CBR) to find same solution.

(4) Case Based Reasoning (CBR)

The CBR is the process of solving new problems based on the solutions of similar past problems. It is not only a powerful method for computer reasoning, but also models a behavior in human problem solving. Much of reasoning is based on past cases personally experienced. In some embodiments, the CBR module checks every conversation and saves all reasoning and action information.

In some embodiments, when a user generates a previously unknown conversation, the CBR module makes a case using a 'PDDL problem' generated by a reasoner and an action plan created by a planner. If the user generates a conversation that is similar to a previous conversation, the CBR module searches for this conversation in the case database. If the CBR module finds a similar case, then the CBR module makes an output by action plan of case. The AICoRE can reduce the response time and processing time by using this CBR module. When the CBR module gets a new problem, the CBR module checks the reasoning information with the new problem compared to saved cases. If there is a matching case, then the CBR module uses its action plans. By reusing solved cases, the CBR module reduces AICoRE's duplication of existing plans.

Figure 12:
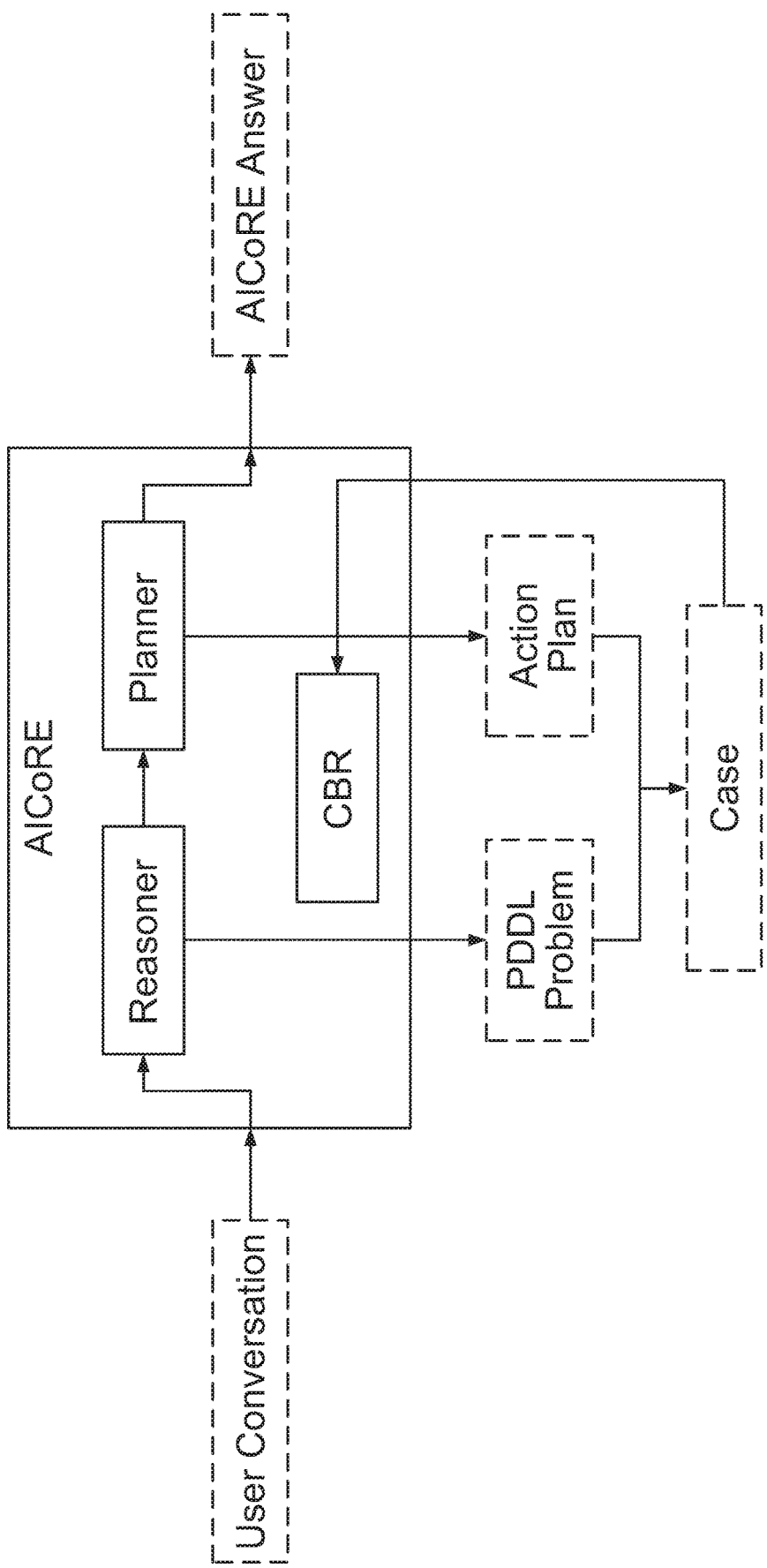
FIG. 12 is a functional block diagram illustrating an embodiment of a retrieve process for processing a case for a new artificial intelligence problem.

FIG. 12 is a functional block diagram illustrating an embodiment of a retrieve process for processing a case for a new artificial intelligence problem. FIG. 12 shows the process of retrieving case. In some embodiments, the process of FIG. 12 is performed at 107 and/or 109 of FIG. 1 as well as 209 and/or 211 of FIG. 2. In some embodiments, the process of FIG. 12 is performed using case based reasoning module 613 of FIG. 6. When a user talks with the AICoRE and user's conversation is translated to previously unknown 'PDDL problem' in Reasoner, and then the AICoRE runs retrieve process. First, the AICoRE makes a CBR case and puts this problem in a case. After the AICoRE makes action plan and executes this plan, CBR modules save this plan to the CBR case. The AICoRE saves this created CBR case as triple set in a triplestore.

Figure 13:
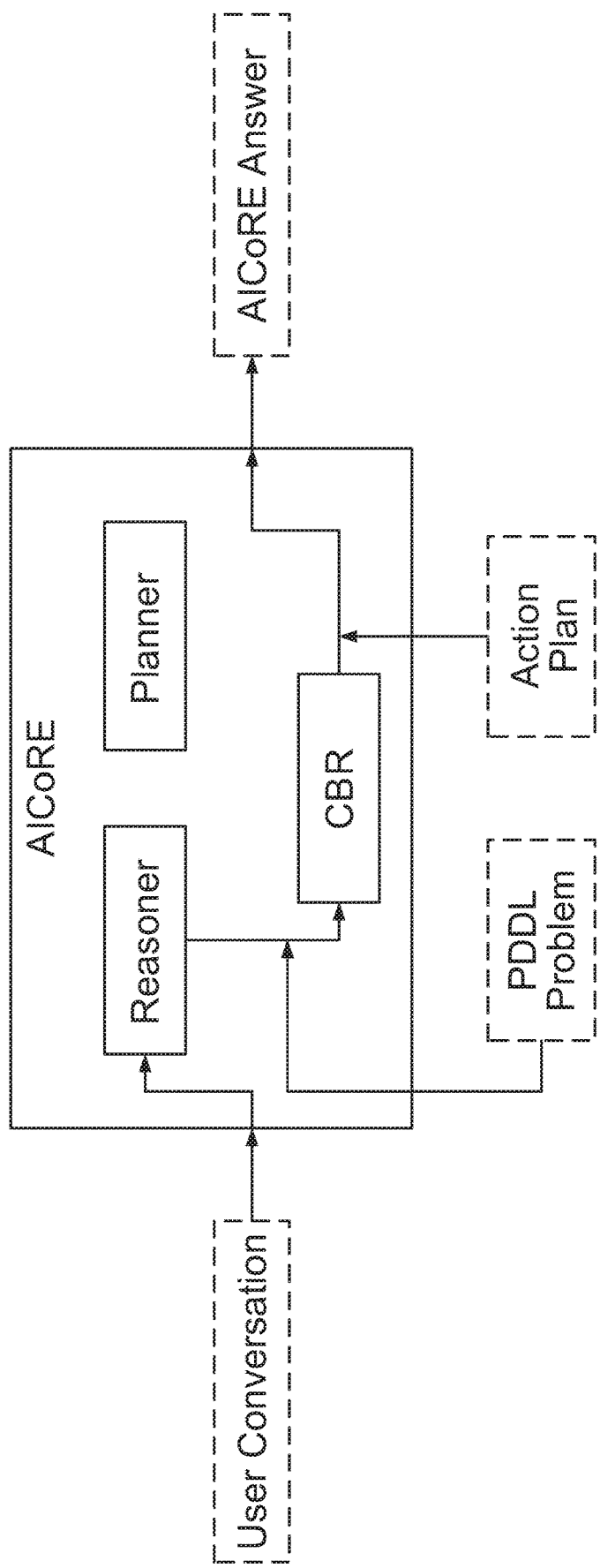
FIG. 13 is a functional block diagram illustrating an embodiment of a process for identifying and reusing a saved case.

FIG. 13 is a functional block diagram illustrating an embodiment of a process for identifying and reusing a saved case. FIG. 13 shows the process of reusing case. In some embodiments, the process of FIG. 13 is performed at 107 and/or 109 of FIG. 1 as well as 209 and/or 211 of FIG. 2. In some embodiments, the process of FIG. 13 is performed using case based reasoning module 613 of FIG. 6. After the AICoRE generates a 'PDDL problem' from conversation, the CBR module finds similar cases with the input case. The CBR module gets all cases in database and checks whether its problem situation is same with input case. In this step, the CBR module gets the case's 'PDDL problem' and checks information of 'PDDL problem'. If the CBR module finds similarity between the input problem and a saved case, then the CBR module will pick the saved case and use its action plan without using the planner module.

(5) Natural Language Generation (NLG)

Natural language generation (NLG) is the task of generating natural language from a machine representation system such as a knowledge base or a logical form. The NLG task may be viewed as the opposite of natural language understanding. In the AICoRE, the planner and reasoner determine what to say, what to change, and so on, so that the NLG does reconstructing, grammar fixing, and person correction.

Figure 14:
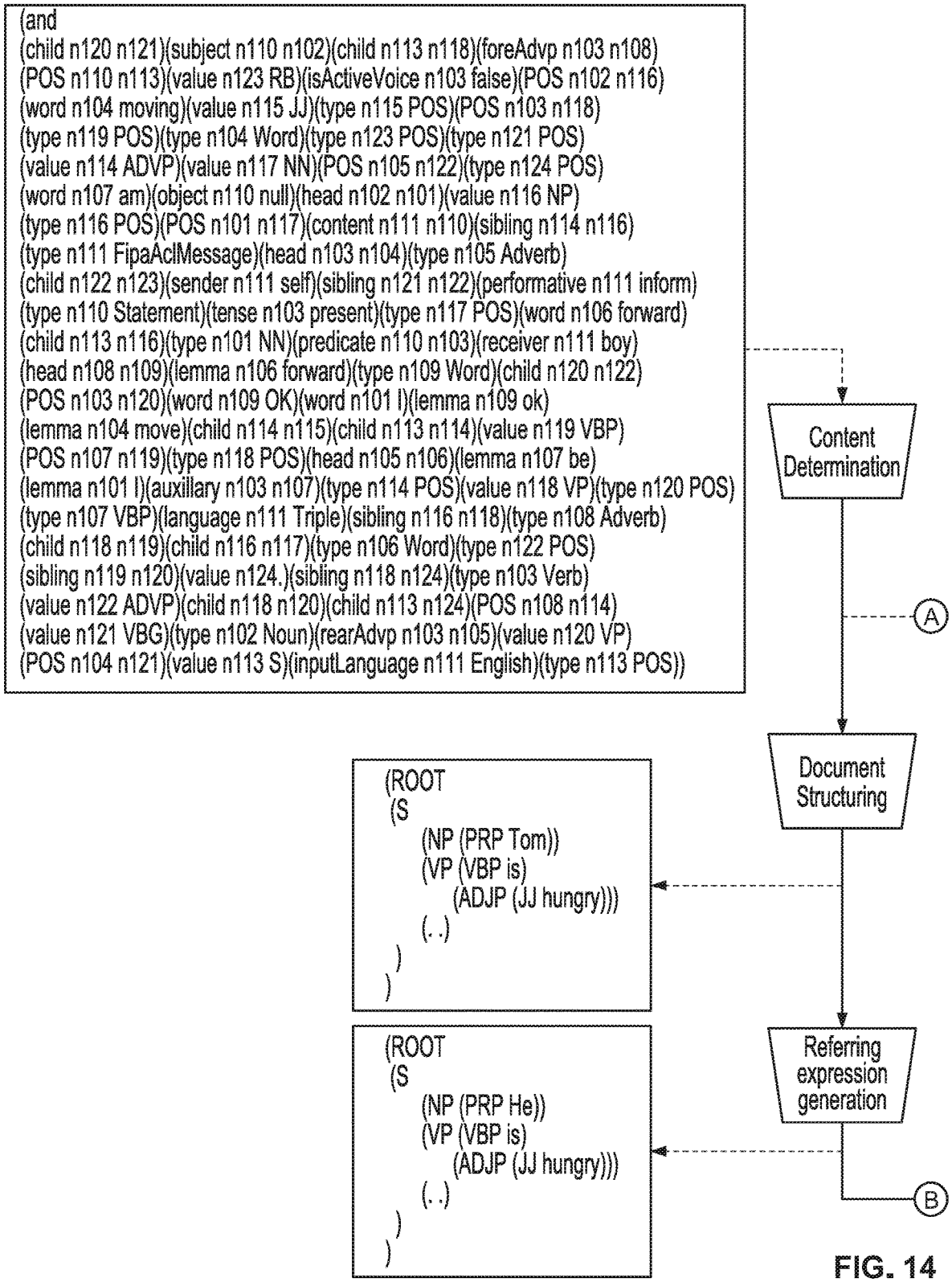
FIG. 14 is a diagram illustrating an embodiment of a process for natural language generation (NLG).
Figure 14:
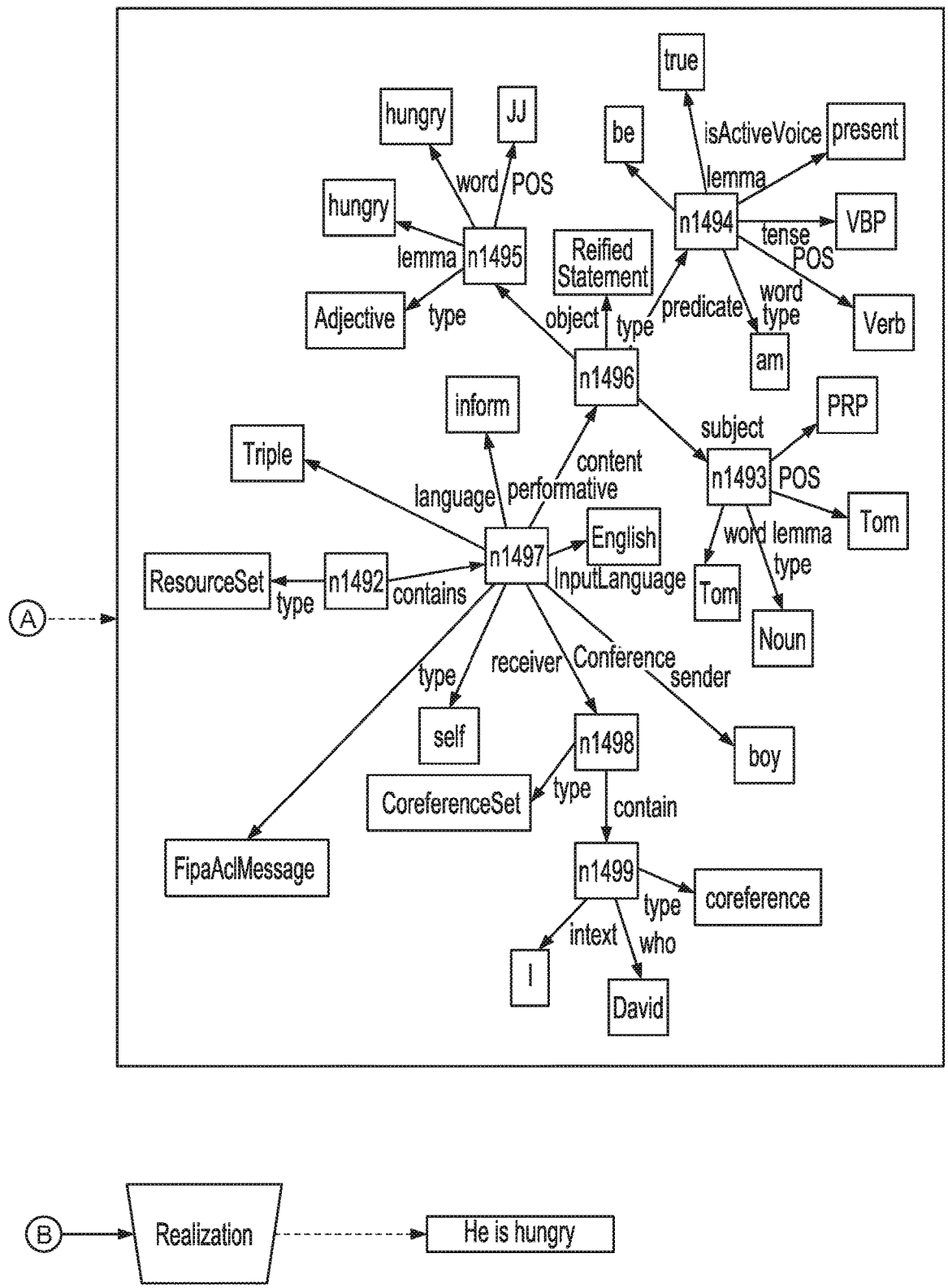

FIG. 14 is a diagram illustrating an embodiment of a process for natural language generation (NLG). FIG. 14 shows an exemplary natural language generation (NLG) architecture including input and output of each part. The first step of the NLG module is parsing strings of triples and making simple graphs for depth first search (DFS) using the result of a planner. Because the result from a planner is in PDDL format, the NLG module converts the format to a graph. Then, it makes a parsed tree by using a DFS search with the stored NLG triple and visited log at document structuring part. Through this process, it can determine the ordering and SPO structure of a sentence. Next, the referring expression generation part replaces names with personal pronouns using coreference data of the triple. Lastly, a realization module performs a process of realizing a sentence by an element of a parse tree or sentence, and NLG uses a natural language generation tool to realize it. In some embodiments, the process of FIG. 14 is performed at 109 of FIG. 1 and 213 of FIG. 2. In some embodiments, the process of FIG. 14 is performed using natural language generator module 617 of FIG. 6.

In some embodiments, the NLG module does not use concise data but instead uses a whole sentence without any omission of words or changes in grammar structure to generate natural language. Thus, there is no information loss in AICoRE.

(6) Memory

In some embodiments, the 'memory' module stores a history of conversations that the agents were engaged in, plus any other information captured by its sensors about the environment such as location, time, weather, etc. The declarative memory holds the agent's knowledge about the world and itself. The knowledge available to the agent in the declarative memory can be in at least two forms: 1) given to the agent in the form of an ontology (e.g., WordNet) or factual knowledge; or 2) inferred by the agent based on the content of its episodic memory.

Figure 15:
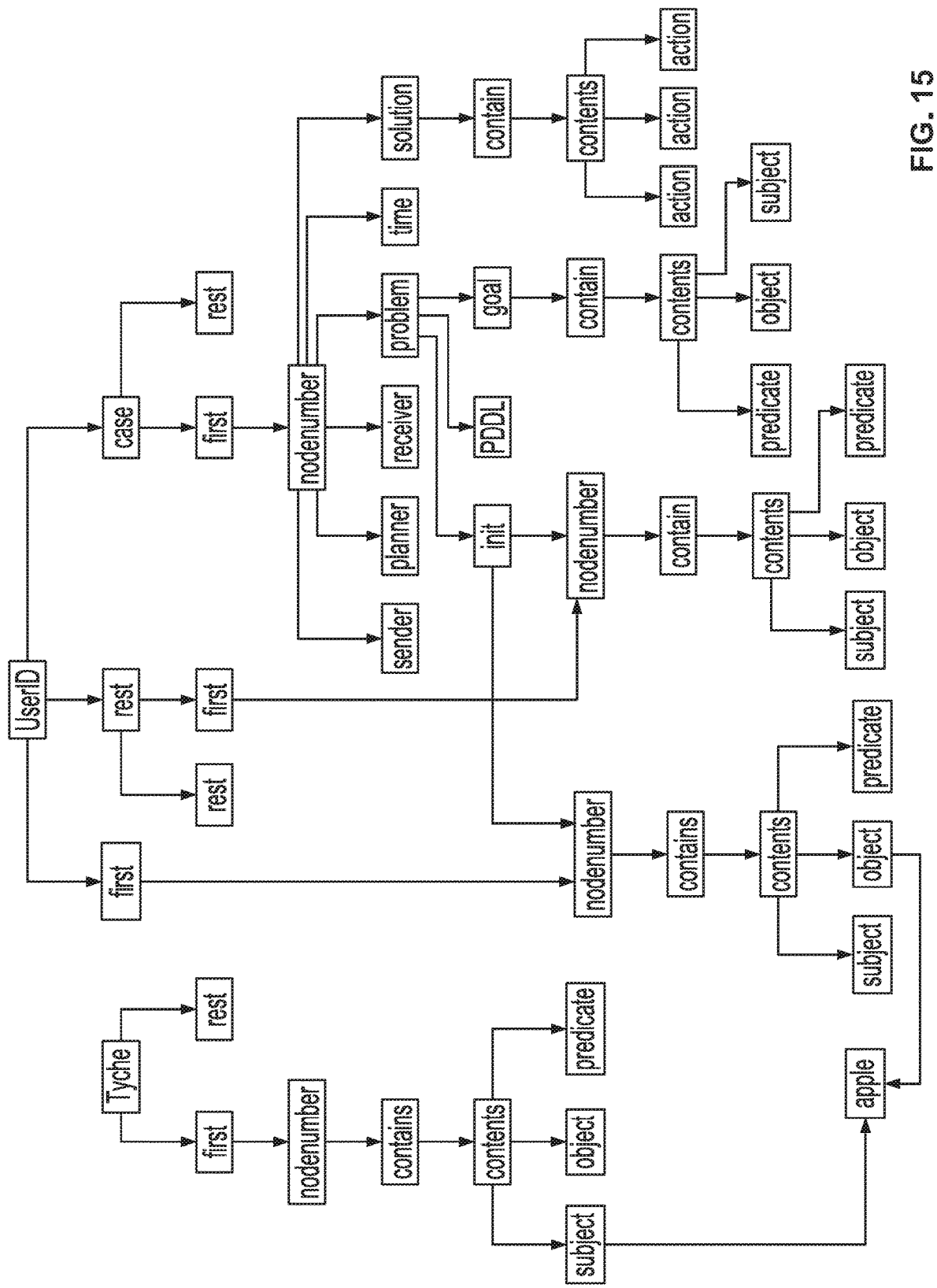
FIG. 15 is a diagram illustrating an example of a memory graph data structure.

FIG. 15 is a diagram illustrating an example of a memory graph data structure. FIG. 15 shows an exemplary memory graph in the AICoRE system. In FIG. 15, the 'memory module' consists of two parts, a user part and a robotic system part. The 'memory module' saves user's information of conversation history in the user part and data of robotic system in the robotic system part. In some embodiments, the memory graph of FIG. 15 is memory graph 607 of FIG. 6. In some embodiments, the memory graph of FIG. 15 is used at 105, 107, and 109 of FIGS. 1; 205, 207, 209, and 211 of FIGS. 2; 305 and 307 of FIG. 3; and FIG. 4.

(1) In some embodiments, the user part is classified into two sections. One section has data about the user that is generated from the user's conversation. The AICoRE saves the data under UserID sequentially. For example, the AICoRE generates a new resource that includes NLU output when a user says something about oneself and the resource connects it to the UserID using the 'first' relation.

Then, if the user says again, the AICoRE also generates a new relation 'rest' relation and connects the new node resource again. In addition, the node that is connected to the 'rest' has another 'first' and 'rest' relations. The AICoRE repeats this whenever the user says something.

(2) In some embodiments, the robotic system part uses the same architecture as that of the user part. However, under a robotic systemID, the system only saves a robotic system's data even if the user says the data and no one but the owner can change the robotic system's data.

Figure 16:
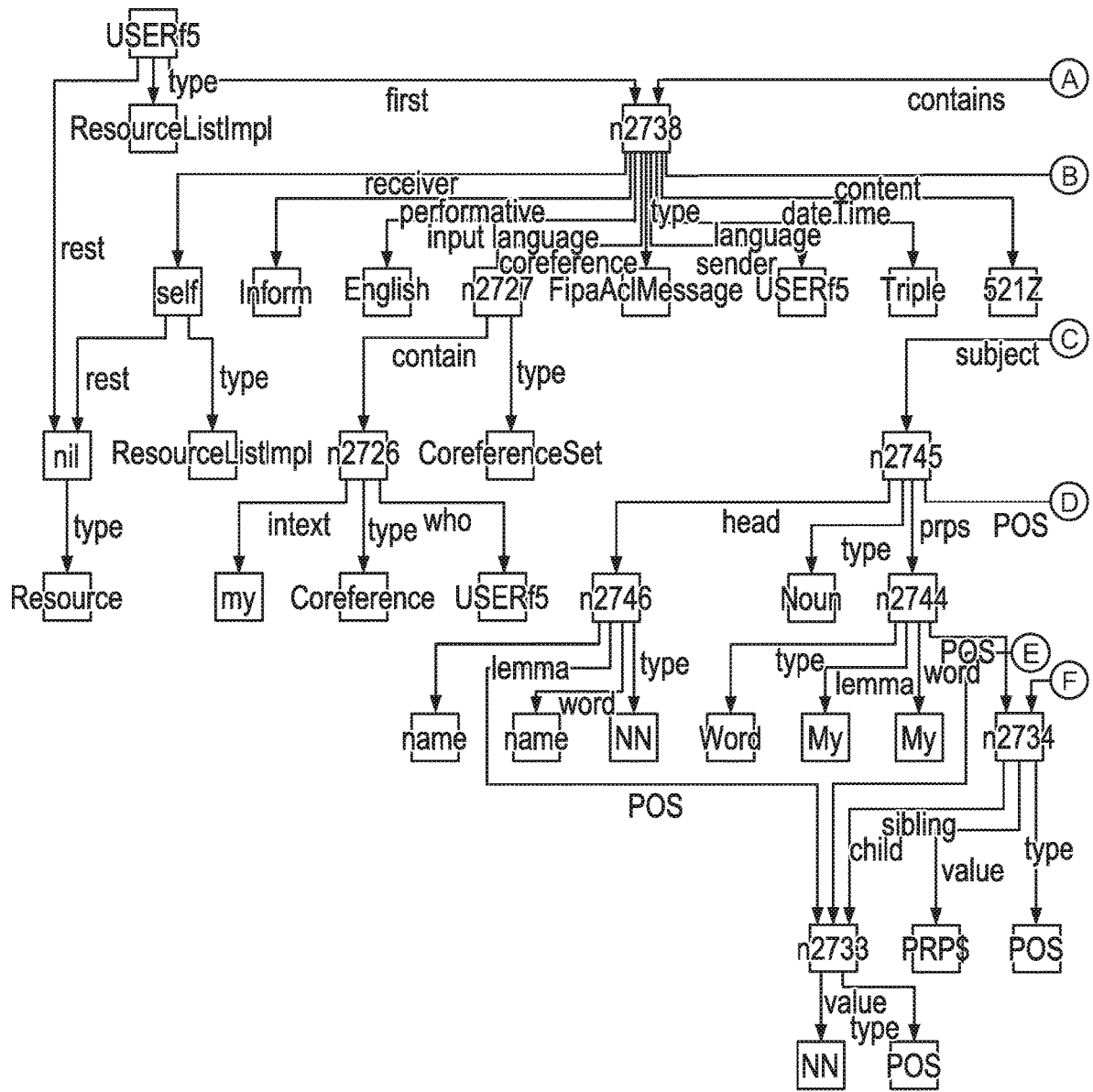
FIG. 16 is a diagram illustrating an example of a memory graph data structure.
Figure 16:
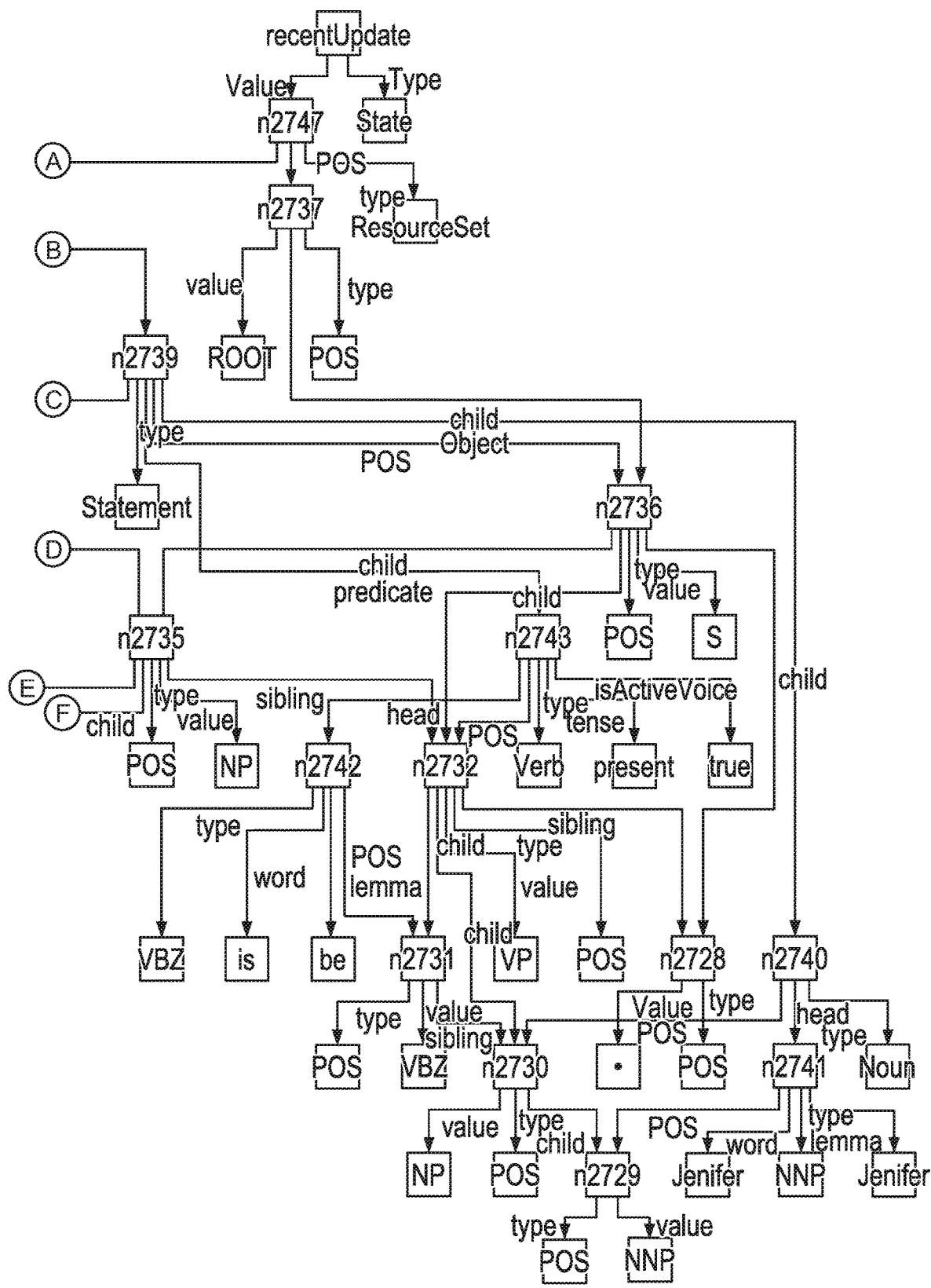

FIG. 16 is a diagram illustrating an example of a memory graph data structure. FIG. 16 shows an exemplary sentence in the memory graph. It is just one sentence processed in the user memory. The data includes many relations and nodes that are the result from NLU. The top level node of the sentence has a lot of information about the sentence, such as language, date, and time, and there is a sentence element under 'content' relation. In some embodiments, the memory graph of FIG. 16 is memory graph 607 of FIG. 6. In some embodiments, the memory graph of FIG. 16 is used at 105, 107, and 109 of FIGS. 1; 205, 207, 209, and 211 of FIGS. 2; 305 and 307 of FIG. 3; and FIG. 4.

In addition, in some embodiments, the CBR module makes the CBR case and saves it under a case node in the 'memory module'. A CBR case is made with sender, receiver, time, 'PDDL problem' and solution information. The sender and receiver information represent who or what the speaker is and the listener of the conversation that is generating a 'PDDL problem'. The time information records the date of conversation. The planner represents what kind of planner the AICoRE uses to solve this conversation problem. The 'problem' is constructed using a 'PDDL problem' and the goaltree's goal. The solution is an action plan of the selected planner. The AICoRE database saves the CBR case under a user node and makes the CBR case list. When the AICoRE makes a new CBR case, the AICoRE database adds this CBR case to the last of the CBR case list. When the CBR module wants to find a similar case, the CBR searches in the CBR's case list. In various embodiments, every user memory structure has its own CBR case list in a database. Thus, the CBR module can reduce the time to search for a similar case in a list.

(7) Inter-Agent Communication (iAC)

The iAC stands for inter-agent communication. It is a communication module for agents that uses, in some embodiments, the JADE and FIPA-ACL message structure. The iAC is may be composed of two projects: iACManager and iACServer.

In some embodiments, the iACManager is a client side management module of iAC. In some embodiments, the iACManager generates ACLMessages that is based on the FIPA-ACL structure and sends messages via the JADE Platform. In some embodiments, the iACServer runs a JADE Platform so that clients can send and receive ACLMessages. It manages whether messages should be sent by checking whether a receiver exists.

Figure 17:
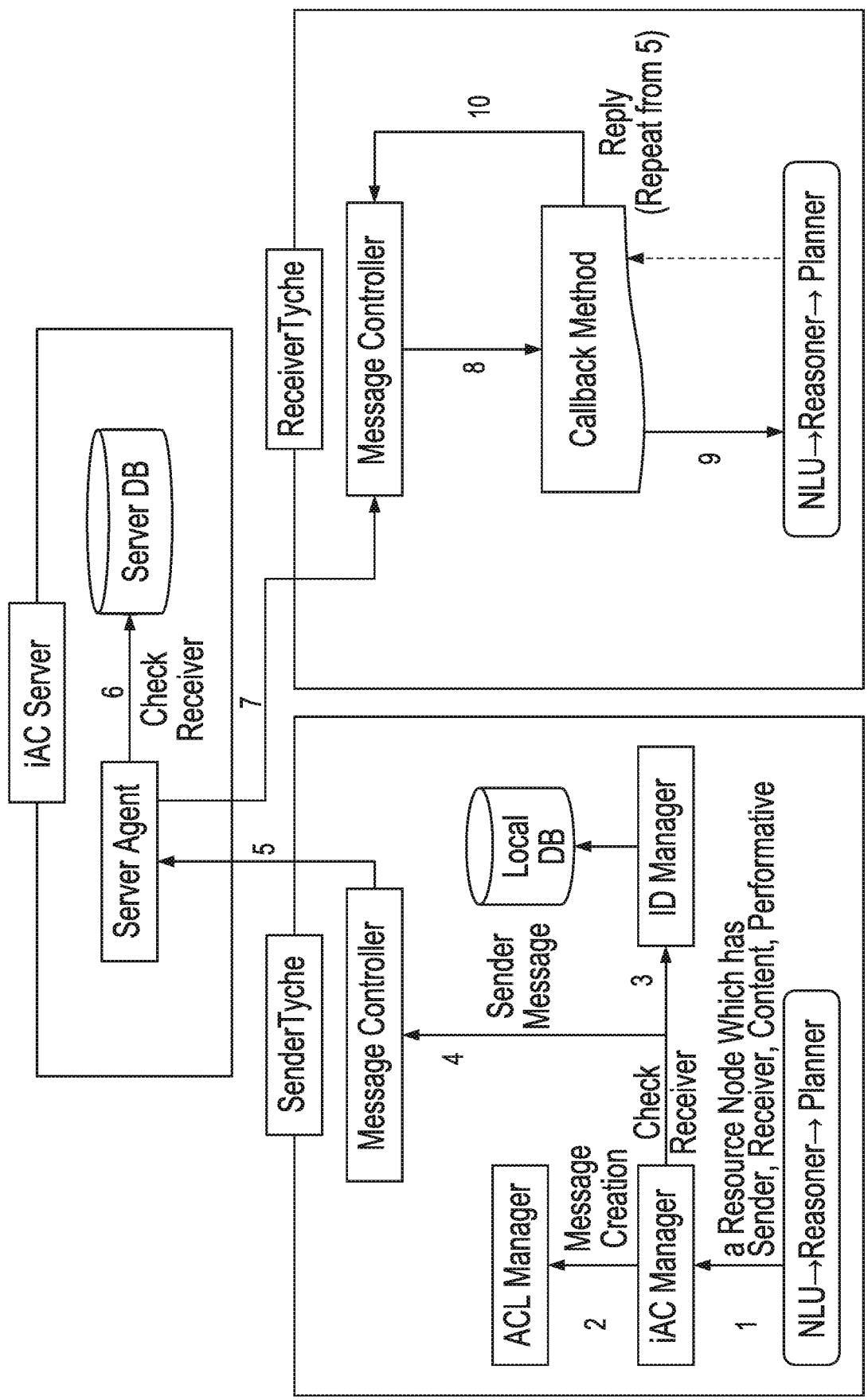
FIG. 17 is a functional block diagram illustrating an embodiment of a process for inter-agent communication.

FIG. 17 is a functional block diagram illustrating an embodiment of a process for inter-agent communication. FIG. 17 shows exemplary processes of the iAC module. In some embodiments, the planner or dialogue manager determines a sender, receiver, content, and performative of a message. The iAC manager receives this message and generates an ACL message using an ACL Manager. When the ACL Manager makes an ACL message, the receiver information is changed into an internal ID using an ID Manager. The ACL message is passed to message controller, and it sends the message to an iAC Server. The server agent in the iAC Server receives the message and checks whether the receiver exists. If the receiver exists, then it sends the message to the receiver module of a robotic system. The planner and dialogue manager can register callback methods to the message controller. The message controller uses the callback methods when it receives messages.

In some embodiments, there are two possible types of ACL messages that can be processed. One is a request. When an iAC manager receives a request, it passes it to a NLU, so that the NLU can start to process the message through the AICoRE. For the other type of the message, the iAC manager outputs the message to the target user.

Communication between agents allows the agents to share information and to command each other. For example, a user can ask an agent about someone's hobby. If there is no information about it, the agent may ask someone else's agent and provide the answer to the user. In various embodiments, personal information can be protected and an agent can decide whether it sends requested information or not to an asking agent.

The iAC module can be used in many ways. For example, agents can share the owner's schedule to come up with a meeting time. The iAC module can also be used to share the price of the used goods of the owner and to suggest fine goods to the user.

In some embodiments, the process of FIG. 17 is performed in part at 101 and/or 109 of FIG. 1 to receive and send inter-agent communication. In some embodiments, the process of FIG. 17 is performed at 105 and/or 107 of FIG.

1 to retrieve supporting knowledge and/or to identify and/or solve an artificial intelligence problem.

The AICoRE Processes

FIG. 18 is a pseudo-code description illustrating an embodiment of a process for solving an artificial intelligence problem using adaptive, interactive, and cognitive reasoning. An example of a process and execution of the system are shown in FIG. 18, i.e. an exemplary pseudo code of the AICoRE process. FIG. 18 shows the BDI aspect by retrieving the beliefs from the agent's personal memory, executing the plan from reasoning out, and finally arriving at the set goals. In FIG. 18, the execution architecture is represented in five sequences: initialization, getting new events, setting new plans, executing plans, and processing the rest of the job. The executing sequence, depicted in FIG. 18, resembles an embodiment of an architecture of a BDI agent. In some embodiments, the pseudo-code description of FIG. 18 describes the processes of FIGS. 1 and 2. In some embodiments, the system described by the functional block diagram of FIG. 6 performs the process described in FIG. 18.

In some embodiments, a BDI agent stands for an agent based on the three main concepts: Belief, Desire and Intention. The Belief is the knowledge of what the agent has, including environmental information and data from other agents that is saved in an agent's belief-base. The Desire is what the agent wants to accomplish. The desire that the agent wants to accomplish may also be called the goal of the agent. Specifically, an agent executes and determines an active goal that is more profitable for the current input data or changes. The Intention represents the methods to achieve the goal. The intention may also be called the plan of the agent. The plan is composed of actions that perform a single job. Additionally, the inducer of the processes of an agent is called an event.

When an event occurs to a BDI agent, a belief is updated in the belief-base, and the BDI agent interoperates the belief with goals and plans to invoke them. When the available goal and plans are activated within the BDI agent, the reasoner within the BDI agent executes the proper actions to accomplish this goal, and the result is executed within the BDI agent in the form of actions. This sequence of actions updates the belief-base of the BDI agent. If there are no more goals to be accomplished for the belief, the BDI agent finishes the job.

This process may be used by some embodiments of an AICoRE. After an AICoRE is initialized, an AICoRE receives new external events in the form of triples as input. These events are triggered whenever a user says a verbal utterance. Normally an AICoRE may process these events sequentially using a time-priority queue storing verbal utterances. However, if a high-priority event such as fire emergencies happens, then the event's priority within the queue of an AICoRE is changed to accommodate the high-priority event.

A brief example of a process of the AICoRE is as follows: The chosen event, represented in natural language format, gets transferred into the natural language understanding module of the AICoRE, and it gets appended with various optional parameters from the option-generator from the event queue of the AICoRE. Next, the planner module of the AICoRE uses a set of internal rules to set the most proper goal and plan to get the best solution for the given event. This phase is analogous with the 'update-intention' process of a BDI agent. However, in the AICoRE, there are not only rules of the planner module, but also rules from other modules within the system, so an iterative sequence may be used within the main repeat sequence in order to account for all the various rules. Examples of rules not from the planner module include rules from the reasoner module that are used to map data to the event, based on various characteristics of the event. Whenever a plan is set for executing a solution for a given event, the AICoRE executes the plan with the executor module. Finally, using the steps generated by the execution of the plan, the AICoRE can generate responses in the form of natural language that satisfies the actions required to accomplish the goal set by the inputted event.

Memory Graph Data Structure

In some embodiments, the adaptive interactive cognitive reasoning engine (AICoRE) utilizes a memory graph (MG) data structure that has different types of memory for advanced artificial intelligence problem solving. Similar to human memory, the memory of the MG may include sensory memory, short-term memory, and long-term memory. Sensory memory buffers for stimuli received, for example, stimuli received through the senses. For a human, sensory memory corresponds to stimuli received through the five senses. Short-term memory may also be called working memory. In some embodiments, short-term memory may hold readily available information but may only include a small amount of information. In some embodiments, information that is likely to be used in the future is kept in short-term memory. Long-term memory may contain all information. In some embodiments, long-term memory includes information gathered both consciously and unconsciously and has an almost indefinite size. In some embodiments, additional memory such as semantic memory is utilized. In various embodiments, an external ontology, such as WordNet, is utilized as semantic memory and may be used to generate answers based on the general knowledge retrieved from semantic memory. In various embodiments, short-term memory and long-term memory closely interact with each other to respond to what a user needs as quickly as possible.

Figure 19:
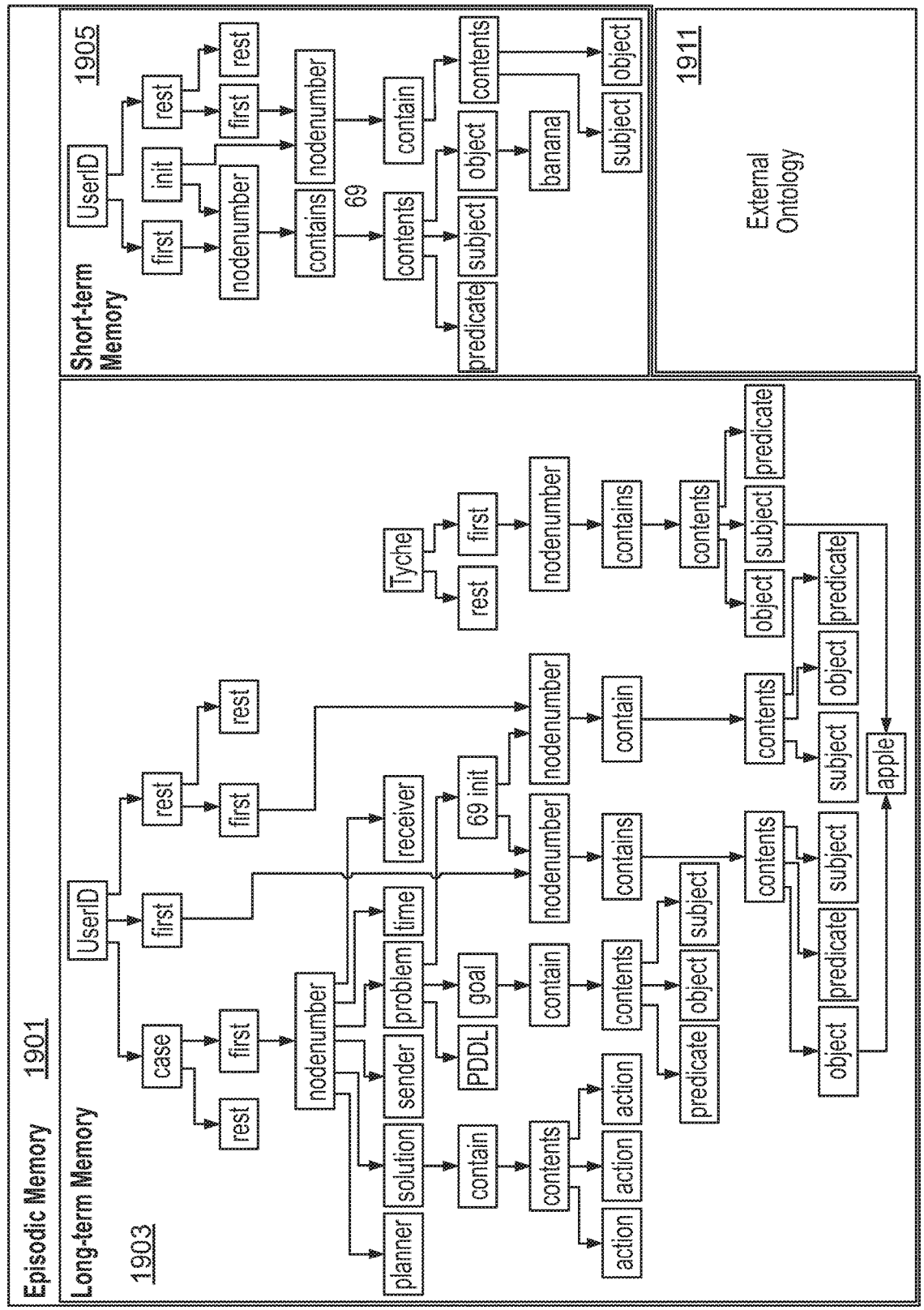
FIG. 19 is a diagram illustrating an example of a memory graph data structure.

FIG. 19 is a diagram illustrating an example of a memory graph data structure. The diagram of FIG. 19 includes episodic memory 1901, long-term memory 1903, short-term memory 1905, and external ontology memory 1911. Episodic memory 1901 includes both long-term memory 1903 and short-term memory 1905. External ontology memory 1911 is separate of episodic memory 1901. In some embodiments, the memory graph data structure of FIG. 19 is memory graph 607 of FIG. 6. In some embodiments, the memory graph data structure of FIG. 19 is used by the processes of FIGS. 1, 2, 3, 4, 20, and/or 21. In various embodiments, the information data stored in episodic memory 1901, including in short-term memory 1905 and/or long-term memory 1903, uses a format shown and/or described by the examples of FIGS. 5A-E, FIG. 15, and/or FIG. 16.

In some embodiments, the memory of a memory graph for advanced artificial intelligence (AI) problem solving, such as the memory graph data structure of FIG. 19, can include episodic memory 1901 and external ontology memory 1911 for storing and retrieving information. In some embodiments, external ontology memory 1911 is also used as semantic memory. In various embodiments, when a user talks to a device using AICoRE, every sentence received is stored into episodic memory 1901 and words in the sentence are linked using external ontology memory 1911.

In some embodiments, long-term memory 1903 is used to store information received via sensors, similar to how humans remember information that is seen, heard, spoken, or felt. How quickly information can be recalled from memory can vary depending on numerous factors such as the degree of impact felt as a result of the information and the amount of time that has passed. Much like how the human brain retains all information it has experienced, in some embodiments, long-term memory 1903 in AICoRE retains all information that has been experienced. The information may be organized based on users to better allow the essential portions of information to be accessed and to avoid accessing unnecessary information that may also increase response time. In some embodiments, long-term memory 1903 is stored remotely. For example, information stored in long-term memory may rely on a remote database.

In some embodiments, short-term memory 1905 is used for information that must be retrieved quickly. In various embodiments, short-term memory 1905 is used for information that should be retrieved more quickly such as information based on recent experiences. For example, short-term memory 1905 may be used to store information related to recent events and long-term memory 1903 may be used to store information related to events that occurred further in the past. In some embodiments, short-term memory 1905 includes facts or concepts pinned to recent memory. AICoRE may include short-term memory to support sudden associations. In some embodiments, short-term memory 1905 stores the information most necessary to improve the responsiveness associated with accessing the information. In some embodiments, short-term memory 1905 utilizes hardware memory such as dynamic random access memory (DRAM) and long-term memory 1903 utilizes a slower medium such as long-term storage.

In some embodiments, information stored in short-term memory 1905 is transferred to long-term memory 1903 when the storage for short-term memory 1905 is full. In some embodiments, the transferred information is based on the least recently used information. For example, in some embodiments, information stored in short-term memory 1905 includes a last accessed and/or creation time, which may be used to determine which information to remove from short-term memory 1905. In some embodiments, the information is stored into short-term memory 1905 and long-term memory 1903 at or near the same time (e.g., in parallel) and the removal of information from short-term memory 1905 does not require transferring the information to long-term memory 1903. For example, when a natural sentence is captured, the components of the processed sentence are stored in both short-term and long-term memory. The components then remain in short-term memory only as long as the information is recent and/or related to recent events.

In various embodiments, information stored in episodic memory 1901 is read-only information in the sense that the contents of the information does not and may not change. For example, once information is captured and saved in episodic memory 1901, such as in long-term memory 1903 and/or short-term memory 1905, the information is not changed but in some scenarios may be removed or deleted. By preserving the information in a read-only state, the memory captured by the robotic system is saved. New information captured that may modify or expire saved information is stored as new information. Although newly stored information may require expiring the older saved data, the contents associated with the older saved data is never modified or updated.

In some embodiments, episodic memory 1901 is utilized to interact with a user based on interaction history including specific past experiences and events with the user. For example, episodic memory 1901 can be utilized to answer questions such as "Where did I go yesterday?" and "Who was the girl I went with to the restaurant yesterday?" In various embodiments, AICoRE manages memory of autobiographical events in episodic memory 1901.

In some embodiments, external ontology memory 1911 includes external memory that may be used as an external ontology to determine an answer to a question based on general knowledge. For example, external ontology memory 1911 may include resources such as WordNet. Questions such as "Who is Obama?" and "What is an apple?" relate to answers that can be determined without specific knowledge unique to an individual experience but rather depend on general knowledge. In various embodiments, AIcoRE can answer these types of questions without user specific information. In addition, external ontology memory 1911 may be used for understanding a user's request. For example, the reasoner of AICoRE analyzes the meaning of sentences and retrieves the data related to the user from memory. External ontology memory 1911 may be used to determine a definition for a word, a similar meaning for a word, and/or the hierarchical relationships between words. For example, external ontology memory 1911 may be used to determine that an apple and an orange are both fruit. As another example, external ontology memory 1911 may be used to determine that an automobile has the same meaning as a car.

In some embodiments, the memory graph data structure associates information based on various related factors when interacting with a user. For example, information may be based on factors such as a person's name, the verb of the sentence, an object of the sentence, etc.

In some embodiments, AICoRE performs reasoning based on past memory. For example, an input sentence (e.g., a question or query) is parsed and processed before accessing memory. In the event the analysis of the input sentence determines a response would benefit from supporting knowledge, short-term memory 1905 may be the initial search source for the targeted information. In the event the information retrieved from short-term memory 1905 is not sufficient, long-term memory may be searched for the desired supporting information. In some embodiments, both long-term memory and short-term memory are searched initially, for example, in parallel. In some embodiments, long-term memory is the initial search source in the event there is a high likelihood or probability the desired information resides only in long-term memory 1903. For example, in the event a query asks to retrieve information from an event in the distant past, there is a high likelihood the supporting knowledge is stored only in long-term memory 1903 and not short-term memory 1905.

Figure 20:
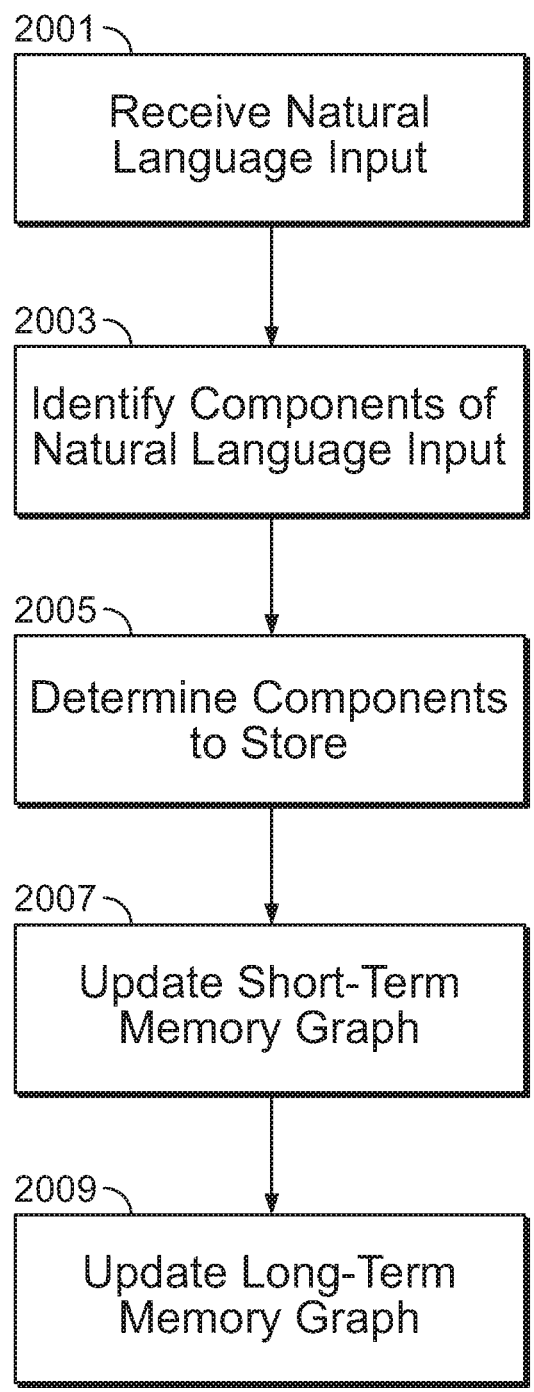
FIG. 20 is a flow diagram illustrating an embodiment of a process for responding to a natural language input using an adaptive, interactive, and cognitive reasoner that utilizes an advanced memory graph structure.

FIG. 20 is a flow diagram illustrating an embodiment of a process for responding to a natural language input using an adaptive, interactive, and cognitive reasoner that utilizes an advanced memory graph structure. In some embodiments, the input may be a sentence spoken by a user. For example, a user speaks to a robot system saying "My name is Alice." In this example, the input sentence is not a query but rather information local to the user and the robotic system. In some embodiments, the input sentence is processed and stored in an advanced memory graph data structure. In some embodiments, the process of FIG. 20 is utilized by the processes of FIGS. 1, 2, 3, and/or 4. In some embodiments, the advanced memory graph data structure is memory graph 607 of FIG. 6. In various embodiments, the advanced memory graph data structure includes a short-term memory graph and a long-term memory graph similar to FIG. 19. In some embodiments, the process of FIG. 20 is performed using the autonomous robotic system of FIG. 6.

At 2001, a natural language input is received. In some embodiments, an input sentence is captured by a robot microphone hardware such as the microphone of a smartphone device mounted to a motorized robot base. As another example, the input may be visually detected, for example, by recognizing sign language captured using a camera such as the camera of a smartphone device. As yet another example, the natural language input may be received in text form, for example, via a text message or other appropriate digital form.

At 2003, components of the natural language input are identified. For example, word components of the natural language input are identified. In some embodiments, the analysis is performed by an input processing module and/or a natural language understanding module.

At 2005, a determination is made regarding the storage of components. For example, in some embodiments, the memory graph is configured to store identified components first in short-term memory and then the components are only transferred to long-term memory when there is insufficient storage space in short-term memory. In some embodiments, the components are stored in both short-term and long-term memory once identified. This scenario is configured to allow long-term memory to have the entire information set of a robot's memory for a particular user. In some embodiments, some components may be stored directly in long-term memory bypassing short-term memory.

In some embodiments, long-term memory utilizes a remote store such as a remote database. In various embodiments, the stored information may include metadata such as a creation time and/or a last accessed time. In some embodiments, the stored information is unchangeable information and is stored as read-only data. For example, the components corresponding to "My name is Alice" are never updated to change the name of the user from Alice to another name. In the event the user's name changes, a new collection of components are stored to reflect the new name. The old memory corresponding to the old name may be expired and/or deleted but is not changed to reflect the new name. In some embodiments, the old memory is retained and may be utilized in query responses. For example, the old memory may be used to answer the query, "What is my original name?," "What was my name previously?," or "What are all the names I have been known as?"

In various embodiments, reading and writing to memory requires the proper security authorization. For example, a token-based authorization scheme may be utilized to enforce that the appropriate user has permission to access a particular memory graph or subset of a memory graph. In some embodiments, the determination at 2005 confirms the correct user token(s) are present.

At 2007, a short-term memory graph data structure is updated. In some embodiments, components identified at 2003 are stored in short-term memory. In various embodiments, the components may be stored using a node structure similar to the memory graph examples of FIGS. 5A-E and/or FIGS. 15-16. In some embodiments, data stored in short-term memory may cause older data to be removed. For example, given a limited amount of short-term memory, components corresponding to a recent event are stored in short-term memory while older components are removed. In some embodiments, the removed components are transferred to long-term memory, for example, if they do not already exist in long-term memory.

In some embodiments, information from short-term memory is removed based on a least recently used metric. For example, a last accessed time may be used to determine the oldest accessed memory, which is then marked as a candidate for removal. In some embodiments, information is removed when it is determined that it is no longer relevant. For example, information may be expired based on an elapsed time threshold. For example, once a week, information may be removed from short-term memory in the event the information has not been accessed.

At 2009, a long-term memory graph data structure is updated. In some embodiments, components identified at 2003 are stored in long-term memory and/or components removed from short-term memory are transferred to long-term memory. In various embodiments, the components may be stored using a node structure similar to the memory graph examples of FIGS. 5A-E and/or FIGS. 15-16. In some embodiments, data stored in long-term memory corresponds to older data that may no longer exist in short-term memory. In some embodiments, long-term memory utilizes a remote database for storage and connectivity of different nodes of the saved components.

Figure 21:
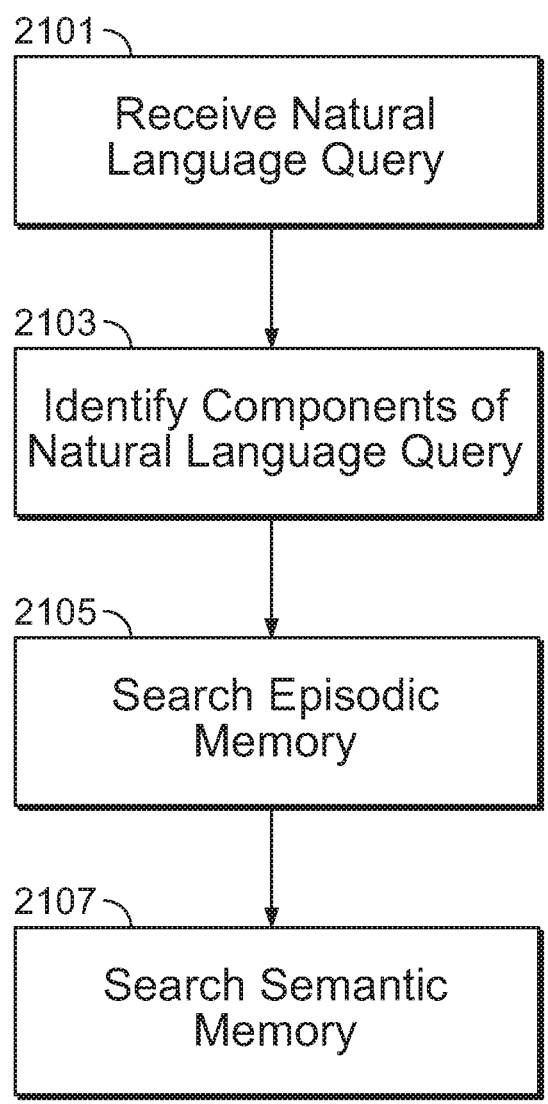
FIG. 21 is a flow diagram illustrating an embodiment of a process for responding to a natural language query using an adaptive, interactive, and cognitive reasoner that utilizes an advanced memory graph structure.

FIG. 21 is a flow diagram illustrating an embodiment of a process for responding to a natural language query using an adaptive, interactive, and cognitive reasoner that utilizes an advanced memory graph structure. In some embodiments, the process of FIG. 21 is used for searching an advanced memory graph data structure that includes episodic and/or semantic memory to generate a response to a user query. For example, a user may ask a robot system "What fruit do I like?" The input query is processed and relevant supporting knowledge including potential supporting semantic information is retrieved from an advanced memory graph data structure for generating a response such as a natural language response. In some embodiments, the process of FIG. 21 is utilized by the processes of FIGS. 1, 2, 3, and/or 4. In some embodiments, the advanced memory graph data structure is memory graph 607 of FIG. 6. In various embodiments, the advanced memory graph data structure includes a short-term memory graph, a long-term memory graph, and an external ontology memory similar to FIG. 19. In some embodiments, the process of FIG. 21 is performed using the autonomous robotic system of FIG. 6. In some embodiments, the supporting knowledge retrieved from the memory graph includes the knowledge stored using the process of FIG. 20.

At 2101, a natural language query is received. For example, a query sentence spoken using natural language such as "What is my name?," "What is a lion?," or "What fruit do I like?" is received. In some embodiments, the query is captured by a robot microphone hardware such as the microphone of a smartphone device mounted to a motorized robot base. As another example, the query may be visually detected, for example, by recognizing sign language using a camera such as the camera of a smartphone device. As yet another example, the query may be received in text form, for example, via a text message or other appropriate digital form.

At 2103, the components of the natural language query are identified. For example, word components of the query are identified. In some embodiments, the analysis is performed by an input processing module and/or a natural language understanding module.

At 2105, episodic memory is searched. In some embodiments, episodic memory includes both a short-term memory and a long-term memory. In various embodiments, short-term and long-term memory each have their own respective memory graph data structures. In some embodiments, both short-term and long-term memory graph data structures are searched, for example, either sequentially or in parallel. In some embodiments, short-term memory is first searched and is the memory with a quicker retrieval time. In the event no relevant information is found in short-term memory, long-term memory is then searched. In some embodiments, an initial determination is made whether there is a high probability that the information resides only in long-term memory. For example, dated information is often only found in long-term memory since it likely has long since expired from short-term memory. In the case of very old information, there is often a high probability or likelihood the information is only in long-term memory. In that case, long-term memory is first searched instead of short-term memory. If the supporting knowledge is not found in long-term memory, then short-term memory is searched. In some embodiments, both long-term memory and short-term memory are searched initially, for example, in parallel. The searches can be initiated to both short-term and long-term memory and in the event that supporting knowledge is found in short-term memory, the long-term memory search may be cancelled or used to supplement the supporting knowledge retrieved from short-term memory. In various embodiments, long-term memory includes a record of all memory. For example, in some embodiments, any information in short-term memory is also in long-term memory.

At 2107, semantic memory is searched. In some embodiments, semantic memory is searched based on the identified components. Semantic memory may be used to further inform the response to the query. For example, a semantic search may return a result that states a "car" is a synonym for an "automobile." In some embodiments, the semantic search results are used to modify the episodic memory searches. In some embodiments, an additional episodic memory search is performed after the results of a semantic memory search (not shown). In some embodiments, the semantic memory search at 2107 is performed in advance of the episodic memory search at 2105 (not shown). In some embodiments, no semantic memory search is necessary and the semantic search at 2107 is optional.

In some embodiments, the semantic search relies on an external data source such as an external ontology. The semantic search may utilize one or more different data sources. For example, an external ontology may exist for the English language and another for the Korean language. In some embodiments, the data sources are delineated by subject matter such as using different data sources for chemistry and physics.

In some embodiments, unauthorized access to the data of the memory graph data structure(s) is prevented at 2105 and/or 2107. For example, in some embodiments, the access to a memory graph data structure for a particular user is managed using a user token. The user token includes a unique identifier that is generated by using a token-based authentication library. In some embodiments, an Open Authorization (OAuth) library is used to generate user tokens. In various embodiments, a user's token may be tied to a user identifier such as the user's email address, voice, and/or biometric feature(s). In various embodiments, a memory graph data structure separates different users' stored information based on a user token and only with the appropriate user token can a user's stored information be accessed. In some embodiments, the information is stored and/or retrieved using the user token from a database, such as a remote database. A user who cannot provide the appropriate token cannot access the corresponding data protected by the token. In various embodiments, AICoRE manages users' personal information to increase the safety of personalized information and to prevent unauthorized access.

FIG. 22 is a pseudo-code description illustrating an embodiment of a process for accessing a memory graph data structure. In the example pseudo-code description, some embodiments of AICoRE determine whether to search long-term and/or short-term memory based on the probability that information is in one or the other memory. For example, in the event there is a high probability or likelihood information is in long-term memory, only long-term memory is searched. In the event there is not a high probability or likelihood information is in long-term memory, short-term memory is first searched. If no supporting knowledge is retrieved from short-term memory, then long-term memory is searched. In some embodiments, the short-term and long-term memories are short-term memory 1905 and/or long-term memory 1903 of FIG. 19. In some embodiments, the short-term and long-term memories are memories of a memory graph data structure such as memory graph 607 of FIG. 6. In some embodiments, the process of FIG. 22 is used by the processes of FIGS. 1, 2, 3, 4, 20, and/or 21.

In various embodiments, as AICoRE interacts with users and/or its environment, its memory of the surrounding events grows and expands. The increase in supporting knowledge as well as access to one or more semantic memories allows the intelligence of AICoRE to increase. In various embodiments, different robotic systems will have different supporting knowledge and/or information stored in their respective memory graph data structures. As a result of different memories, each AICoRE develops uniquely. The result of unique memory is that each AICoRE may be a different and unique artificial intelligence robotic system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
receiving a natural language input;
processing the natural language input to identify components of the natural language input;
storing at least a portion of the components of the natural language input in a short-term artificial intelligence memory graph data structure, wherein a long-term artificial intelligence memory graph data structure includes data that was previously stored in the short-term artificial intelligence memory graph data structure but is no longer stored in the short-term artificial intelligence memory graph data structure;
receiving a natural language query;
analyzing the natural language query to classify components of the natural language query;
searching the short-term artificial intelligence memory graph data structure for one or more supporting knowledge data nodes associated with the classified components;
determining whether the search was successful; and
based on the determination of whether the search was successful, determining to search the long-term artificial intelligence memory graph data structure for the one or more supporting knowledge data nodes associated with the classified components.

2. The method of claim 1, wherein the natural language query is a "what," "where," "who," or "is" query.

3. The method of claim 1, further comprising:
identifying an artificial intelligence problem; and
solving the artificial intelligence problem using the one or more supporting knowledge data nodes.

4. The method of claim 3, wherein the artificial intelligence problem is solved using a case based reasoning module or an artificial intelligence planner.

5. The method of claim 4, wherein the case-based reasoning module matches the artificial intelligence problem to a case stored in the short-term artificial intelligence memory graph data structure.

6. The method of claim 1, further comprising filtering the one or more supporting knowledge data nodes using negative facts and negated facts.

7. The method of claim 1, wherein the one or more supporting knowledge data nodes are searched for by comparing subject-predicate-object lemma, parts of speech, and coreference results between the classified components and one or more data nodes of the short-term artificial intelligence memory graph data structure or the long-term artificial intelligence memory graph data structure.

8. The method of claim 1, wherein a semantic artificial intelligence memory graph data structure is utilized to identify a relationship between one of the classified components and at least one of the one or more supporting knowledge data nodes.

9. The method of claim 8, wherein the semantic artificial intelligence memory graph data structure utilizes an external ontology memory.

10. The method of claim 1, wherein searching the short-term artificial intelligence memory graph data structure or the long-term artificial intelligence memory graph data structure requires presenting an appropriate user access token.

11. The method of claim 1, wherein the identified components of the natural language input include a subject-predicate-object triple.

12. The method of claim 1, further comprising identifying a speaker responsible for the natural language input, wherein a user identifier of the identified speaker is used to select a starting node of the short-term artificial intelligence memory graph data structure.

13. The method of claim 1, wherein the long-term artificial intelligence memory graph data structure utilizes a remote database for storing the identified components of the natural language input.

14. The method of claim 1, wherein the components of the natural language input are stored as read-only information.

15. The method of claim 1, wherein each of the components stored in the short-term artificial intelligence memory graph data structure are stored in parallel in the long-term artificial intelligence memory graph data structure.

16. The method of claim 1, wherein the data that was previously stored in the short-term artificial intelligence memory graph data structure was removed based on a least recently used metric.

17. The method of claim 1, wherein the components of the natural language input are stored with a last accessed time metric.

18. A method comprising:
receiving a natural language input;
processing the natural language input to classify components of the natural language input;
selecting a user node of an artificial intelligence memory graph data structure based on a user associated with the natural language input, wherein the artificial intelligence memory graph data structure comprises one or more data nodes; and
storing a set of new data nodes associated with the classified components in the artificial intelligence memory graph data structure using the selected user node.

19. The method of claim 18, wherein selecting the user node of the artificial intelligence memory graph data structure based on the user associated with the natural language input includes identifying a speaker responsible for the natural language input and selecting the user node based on the identifier speaker.

20. A system for solving an artificial intelligence problem, comprising:
a processor; and
a memory coupled with the processor, wherein the memory is configured to provide the processor with instructions which when executed cause the processor to:
receive a natural language input;
process the natural language input to identify components of the natural language input;
store at least a portion of the components of the natural language input in a short-term artificial intelligence memory graph data structure, wherein a long-term artificial intelligence memory graph data structure includes data that was previously stored in the short-term artificial intelligence memory graph data structure but is no longer stored in the short-term artificial intelligence memory graph data structure;
receive a natural language query;
analyze the natural language query to classify components of the natural language query;
search the short-term artificial intelligence memory graph data structure for one or more supporting knowledge data nodes associated with the classified components;
determine whether the search was successful; and
based on the determination of whether the search was successful, determine to search the long-term artificial intelligence memory graph data structure for the one or more supporting knowledge data nodes associated with the classified components.

\* \* \* \* \*